United States Patent
Watanabe et al.

(10) Patent No.: US 8,911,903 B2
(45) Date of Patent: *Dec. 16, 2014

(54) CATHODE ACTIVE MATERIAL, ITS MANUFACTURING METHOD, AND NON-AQUEOUS ELECTROLYTE SECONDARY BATTERY

(75) Inventors: Haruo Watanabe, Kanagawa (JP); Tomoyo Ooyama, Fukushima (JP); Masanori Soma, Fukushima (JP); Kenji Ogisu, Tokyo (JP)

(73) Assignee: Sony Corporation, Tokyo (JP)

( * ) Notice: Subject to any disclaimer, the term of this patent is extended or adjusted under 35 U.S.C. 154(b) by 1517 days.

This patent is subject to a terminal disclaimer.

(21) Appl. No.: 11/772,695

(22) Filed: Jul. 2, 2007

(65) Prior Publication Data
US 2008/0131778 A1    Jun. 5, 2008

(30) Foreign Application Priority Data

| Jul. 3, 2006 | (JP) | ................................. | 2006-183854 |
|---|---|---|---|
| Jul. 3, 2006 | (JP) | ................................. | 2006-183855 |
| Jul. 3, 2006 | (JP) | ................................. | 2006-183856 |
| Jul. 3, 2006 | (JP) | ................................. | 2006-183857 |
| Jul. 3, 2006 | (JP) | ................................. | 2006-183858 |
| Jul. 4, 2006 | (JP) | ................................. | 2006-184167 |
| Jul. 4, 2006 | (JP) | ................................. | 2006-184168 |
| Aug. 9, 2006 | (JP) | ................................. | 2006-217449 |

(51) Int. Cl.
| $H01M\ 4/52$ | (2010.01) |
| $H01M\ 4/485$ | (2010.01) |
| $H01M\ 4/36$ | (2006.01) |
| $H01M\ 4/1391$ | (2010.01) |
| $H01M\ 4/525$ | (2010.01) |
| $H01M\ 4/131$ | (2010.01) |
| $H01M\ 10/052$ | (2010.01) |
| $H01M\ 4/505$ | (2010.01) |
| $H01M\ 4/02$ | (2006.01) |

(52) U.S. Cl.
CPC .............. $H01M\ 4/131$ (2013.01); $H01M\ 4/485$ (2013.01); $H01M\ 4/366$ (2013.01); $H01M\ 10/052$ (2013.01); $H01M\ 4/1391$ (2013.01); $H01M\ 4/505$ (2013.01); $H01M\ 4/525$ (2013.01); $Y02E\ 60/122$ (2013.01); $H01M\ 4/02$ (2013.01)
USPC ...... 429/231.3; 429/223; 429/224; 429/231.1

(58) Field of Classification Search
USPC ................................................. 429/121–347
See application file for complete search history.

(56) References Cited

U.S. PATENT DOCUMENTS

| 7,727,673 B2 * | 6/2010 | Ooyama et al. | ............ | 429/231.3 |
| 2002/0071991 A1 * | 6/2002 | Kweon et al. | ............. | 429/231.1 |

(Continued)

FOREIGN PATENT DOCUMENTS

| JP | 62-90863 | 4/1987 |
| JP | 4-24831 | 4/1992 |

(Continued)

OTHER PUBLICATIONS

Japanese Patent Office, Notification of reasons for refusal issued in connection with Japanese Patent Application No. 2006-183857, dated May 15, 2012. (3 pages).

(Continued)

*Primary Examiner* — Kenneth Douyette
*Assistant Examiner* — James Lee
(74) *Attorney, Agent, or Firm* — K&L Gates LLP

(57) ABSTRACT

A cathode active material is provided. The cathode active material includes: a composite oxide particle including at least lithium and cobalt; a coating layer which is provided in at least a part of the composite oxide particle and includes an oxide including lithium and a coating element of at least one of nickel and manganese; and a surface layer which is provided in at least a part of the coating layer and includes at least one element selected from the group consisting of silicon, tin, phosphorus, magnesium, boron, zinc, tungsten, aluminum, titanium, and zirconium.

5 Claims, 5 Drawing Sheets

(56) References Cited

U.S. PATENT DOCUMENTS

| | | | |
|---|---|---|---|
| 2002/0076613 A1* | 6/2002 | Lee et al. ............ | 429/231.1 |
| 2003/0082448 A1 | 5/2003 | Cho et al. | |
| 2005/0196674 A1 | 9/2005 | Chiga et al. | |

FOREIGN PATENT DOCUMENTS

| | | |
|---|---|---|
| JP | 08-138670 | 5/1996 |
| JP | 2586747 | 12/1996 |
| JP | 09-265984 | 10/1997 |
| JP | 9-265985 | 10/1997 |
| JP | 10-236826 | 9/1998 |
| JP | 11-016566 | 1/1999 |
| JP | 11-067209 | 3/1999 |
| JP | 11-71114 | 3/1999 |
| JP | 2000-231919 | 8/2000 |
| JP | 3111324 | 9/2000 |
| JP | 2000-294252 | 10/2000 |
| JP | 2001-202960 | 7/2001 |
| JP | 2001-313034 | 11/2001 |
| JP | 2002-75367 | 3/2002 |
| JP | 2002-124262 | 4/2002 |
| JP | 2002-164053 | 6/2002 |
| JP | 2002-279991 | 9/2002 |
| JP | 2003-7299 | 1/2003 |
| JP | 2003-17052 | 1/2003 |
| JP | 2003-017053 | 1/2003 |
| JP | 2003-86182 | 3/2003 |
| JP | 2003-178759 | 6/2003 |
| JP | 2003-217572 | 7/2003 |
| JP | 3451602 | 7/2003 |
| JP | 2003-221234 | 8/2003 |
| JP | 2003-234102 | 8/2003 |
| JP | 2004-002066 | 1/2004 |
| JP | 2004-014405 | 1/2004 |
| JP | 3536944 | 3/2004 |
| JP | 3543437 | 4/2004 |
| JP | 2004-175609 | 6/2004 |
| JP | 2004-519082 | 6/2004 |
| JP | 2005-216651 | 8/2005 |
| JP | 2005-243301 | 9/2005 |
| JP | 3721598 | 9/2005 |
| JP | 2005-276454 | 10/2005 |
| JP | 2006-503789 | 2/2006 |
| JP | 2006-073482 | 3/2006 |
| JP | 2006-173099 | 6/2006 |
| JP | 2007-066839 | 3/2007 |
| JP | 2007-258095 | 10/2007 |
| JP | 2008-514534 | 5/2008 |
| WO | 2006/018921 A1 | 2/2006 |
| WO | 2006/054604 A1 | 5/2006 |

OTHER PUBLICATIONS

Japanese Patent Office, Notification of reasons for refusal issued in connection with Japanese Patent Application No. 2006-183858, dated Jun. 5, 2012. (3 pages).

Japanese Patent Office, Decision of refusal issued in connection with Japanese Patent Application No. 2006-184167, dated May 29, 2012. (2 pages).

Japanese Patent Office, Decision of refusal issued in connection with Japanese Patent Application No. 2006-183855, dated Jul. 3, 2012. (2 pages).

Japanese Patent Office, Notification of reasons for refusal issued in connection with Japanese Patent Application No. 2006-183856, dated May 15, 2012. (3 pages).

Japanese Patent Office, Notification of reasons for refusal issued in connection with Japanese Patent Application No. 2006-183854, dated May 15, 2012. (3 pages).

Japanese Office Action issued Feb. 21, 2012, for corresponding Japanese Appln. No. 2006-183856.

Japanese Office Action issued Feb. 21, 2012, for corresponding Japanese Appln. No. 2006-183854.

Japanese Office Action issued Feb. 21, 2012, for corresponding Japanese Appln. No. 2006-183855.

Japanese Office Action issued Feb. 21, 2012, for corresponding Japanese Appln. No. 2006-183857.

Japanese Office Action issued Mar. 13, 2012, for corresponding Japanese Appln. No. 2006-217449.

Japanese Office Action issued Mach 13, 2012, for corresponding Japanese Appln. No. 2006-183858.

Japanese Office Action issued Mar. 13, 2012, for corresponding Japanese Appln. No. 2006-184168.

* cited by examiner

CATHODE ACTIVE MATERIAL, ITS MANUFACTURING METHOD, AND NON-AQUEOUS ELECTROLYTE SECONDARY BATTERY

CROSS REFERENCES TO RELATED APPLICATIONS

The present application claims priority to Japanese Patent Application No. 2006-183854 filed on Jul. 3, 2006, Japanese Patent Application No. 2006-183855 filed on Jul. 3, 2006, Japanese Patent Application No. 2006-183857 filed on Jul. 3, 2006, Japanese Patent Application No. 2006-184167 filed on Jul. 4, 2006, Japanese Patent Application No. 2006-183858 filed on Jul. 3, 2006, Japanese Patent Application No. 2006-184168 filed on Jul. 4, 2006, Japanese Patent Application No. 2006-183856 filed on Jul. 3, 2006, Japanese Patent Application No. 2006-217449 filed on Aug. 9, 2006, the entire contents of which being incorporated herein by reference.

BACKGROUND

The present disclosure relates to a cathode active material, its manufacturing method, and a non-aqueous electrolyte secondary battery. More particularly, the invention relates to a cathode active material containing a composite oxide containing lithium Li and cobalt Co, a manufacturing method of such a cathode active material, and a non-aqueous electrolyte secondary battery using the cathode active material.

In recent years, a demand for a small secondary battery having a high capacitance is increasing associated with the spread of portable apparatuses such as video camera, notebook-sized personal computer, and the like. Among the secondary batteries which are used at present, there is a nickel-cadmium battery using an alkali electrolytic solution. However, its battery voltage is low to be equal to about 1.2V and it is difficult to improve an energy density. Therefore, there has been examined a lithium metal secondary battery using a lithium metal in which a specific gravity is smallest to be equal to 0.534 among those of simple substances of solids, an electric potential is extremely low, and a current capacitance per unit weight is largest among those of metal anode materials.

However, in the secondary battery using the lithium metal for an anode, dendroid lithium (dendrite) is precipitated on the surface of the anode upon charging and grows by charge/discharge cycles. The growth of dendrite causes such a problem that cycle characteristics of the secondary battery deteriorate and, further, the dendrite pierces through a partition film (separator) arranged so that a cathode is not come into contact with the anode and an internal short-circuit is caused, or the like.

For example, as disclosed in JP-A-1987(Showa 62)-90863, a secondary battery in which a carbonaceous material such as cokes or the like is used for the anode and alkali metal ions are doped and dedoped, thereby repeating charging and discharging has been proposed. It has, consequently, been found that a problem of deterioration of the anode due to the repetition of the charging and discharging as mentioned above can be avoided.

As a cathode active material in which the battery voltage of about 4V can be obtained, inorganic compounds such as transition metal oxide containing an alkali metal, transition metal chalcogen, and the like have been known. Among them, a lithium composite oxide such as lithium cobalt acid, lithium nickel acid, or the like is most desirable from viewpoints of a high electric potential, stability, and a long life.

Particularly, the cathode active material mainly containing the lithium cobalt acid is a cathode active material which shows the high electric potential and it is expected to increase the energy density by raising a charge voltage. There is, however, such a problem that if the charge voltage is raised, the cycle characteristics deteriorate. Therefore, in the related art, a method of modifying the cathode active material by mixing a small amount of $LiMn_{1/3}Co_{1/3}Ni_{1/3}O_2$ or the like into the cathode active material and using the material or by coating its surface with another material is used.

In the foregoing technique for modifying the cathode active material by coating the surface of the cathode active material, it is requested to accomplish the high coating performance. Various methods have been proposed to satisfy such a request. For example, it has been confirmed that the method of coating with a metal hydroxide has the excellent coating performance. As such a method, for example, such a technique that the surface of a lithium nickel acid ($LiNiO_2$) particle is coated with cobalt Co and manganese Mn through the hydroxide coating step has been disclosed in JP-A-1997 (Heisei 9)-265985. For example, such a technique that the surface of a lithium manganese composite oxide is coated with a non-manganese metal through the hydroxide coating step has been disclosed in JP-A-1999 (Heisci 11)-71114.

Further, such a technique that tin is used as a cathode material mainly containing a lithium nickel acid has been disclosed in JP-A-2003-123750. Such a technique that tin is used as a cathode material mainly containing a lithium manganese acid has been disclosed in JP-A-2001-185139.

Further, with respect to adsorption of a tungsten acid, for example, a cathode active material having a surface layer containing tungsten and/or molybdenum and lithium is well known in JP-A-2002-75367.

However, if a heating process is executed after the composite oxide particle was coated with the metal hydroxide, there is such a problem that sintering between the particles is liable to progress and the particles are liable to be bound. Thus, if the particles are mixed together with a conductive material or the like when the cathode is manufactured, the bound portion and particles are broken, a crack occurs, the coating layer is peeled off, and a damaged surface of the particle is exposed. In such a damaged surface, an activity is fairly higher than that of the surface formed upon baking and a deterioration reaction of an electrolytic solution and the cathode active material is liable to occur.

It is, therefore, desirable to provide a cathode active material in which chemical stability can be improved by suppressing binding of particles, a manufacturing method of such a cathode active material, and a non-aqueous electrolyte secondary battery which uses such a cathode active material and is excellent in a high capacitance and charge/discharge cycle characteristics.

SUMMARY

According to an embodiment, there is provided a cathode active material comprising a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains at least one selected from the group consisting of silicon Si, tin Sn, phosphorus P, magnesium Mg, boron B, zinc Zn, tungsten W, aluminum Al, titanium, and zirconium Zr.

According to another embodiment, there is provided a cathode active material comprising a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains silicon Si.

According to the embodiment, mean compositions of the composite oxide particle are expressed by Formula 1, $$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \le x \le 0.10$; y indicates a value within a range of $0 \le y \le 0.50$; and z indicates a value within a range of $-0.10 \le z \le 0.20$.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, and tungsten W.

According to the embodiment, an amount of coating layer ranges from 0.5 weight % to 50 weight % of the composite oxide particle.

According to the embodiment, a mean diameter ranges from 2.0 μm to 50 μm.

According to another embodiment, there is provided a manufacturing method of a cathode active material, comprising forming a layer made of a hydroxide containing nickel Ni and/or manganese Mn into at least a part of a composite oxide particle including at least lithium Li and cobalt Co and, thereafter, coating at least a part of the composite oxide particle with a silicic acid; and executing a heating process after coating with the silicic acid, thereby forming a coating layer made of an oxide containing lithium Li and a coating element of at least one of nickel Ni and manganese Mn and a surface layer containing silicon Si into at least a part of the composite oxide particle.

According to the embodiment, it is preferable that mean compositions of the composite oxide particle are expressed by Formula 1, $$Li_{(1+x)}Co_{(1-y)}M_yO_{(2-z)} \quad \text{(Formula 1)}$$

where, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \le x \le 0.10$; y indicates a value within a range of $0 \le y \le 0.50$; and z indicates a value within a range of $-0.10 \le z \le 0.20$.

According to the embodiment, it is preferable that the hydroxide containing nickel Ni and/or manganese Mn is formed by dispersing the composite oxide particle into a solvent constructed mainly by water whose pH is equal to 12 or more and, thereafter, adding a compound of nickel Ni and/or a compound of manganese Mn.

Further, according to the embodiment, it is preferable that the solvent constructed mainly by the water contains lithium hydroxide.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, and tungsten W.

According to the embodiment, an amount of coating layer ranges from 0.5 weight % to 50 weight % of the composite oxide particle.

According to the embodiment, a mean diameter of the particle in the cathode active material ranges from 2.0 μm to 50 μm.

According to another embodiment, there is provided a non-aqueous electrolyte secondary battery comprising a cathode having a cathode active material, an anode, and an electrolyte, wherein the cathode active material includes a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains silicon Si.

According to another embodiment, there is provided a cathode active material comprising a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains tin Sn.

According to the embodiment, it is preferable that mean compositions of the composite oxide particle are expressed by Formula 1, $$Li_{(1+x)}Co_{(1-y)}M_yO_{(2-z)} \quad \text{(Formula 1)}$$

where, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \le x \le 0.10$; y indicates a value within a range of $0 \le y \le 0.50$; and z indicates a value within a range of $-0.10 \le z \le 0.20$.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, and tungsten W.

According to the embodiment, an amount of coating layer ranges from 0.5 weight % to 50 weight % of the composite oxide particle.

According to the embodiment, a mean diameter ranges from 2.0 μm to 50 μm.

According to another embodiment, there is provided a manufacturing method of a cathode active material, comprising forming a layer made of a hydroxide containing nickel Ni and/or manganese Mn into at least a part of a composite oxide particle including at least lithium Li and cobalt Co and, thereafter, coating at least a part of the composite oxide particle with a stannic acid; and executing a heating process after coating with the stannic acid, thereby forming a coating layer made of an oxide containing lithium Li and a coating element of at least one of nickel Ni and manganese Mn and a surface layer containing tin Sn into at least a part of the composite oxide particle.

According to the embodiment, mean compositions of the composite oxide particle are expressed by Formula 1, $$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, the hydroxide containing nickel Ni and/or manganese Mn is formed by dispersing the composite oxide particle into a solvent constructed mainly by water whose pH is equal to 12 or more and, thereafter, adding a compound of nickel Ni and/or a compound of manganese Mn.

Further, according to the embodiment, the solvent constructed mainly by the water contains lithium hydroxide.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, and tungsten W.

According to the embodiment, an amount of coating layer ranges from 0.5 weight % to 50 weight % of the composite oxide particle.

According to the embodiment, a mean diameter of the particle in the cathode active material ranges from 2.0 µm to 50 µm.

According to another embodiment, there is provided a non-aqueous electrolyte secondary battery comprising a cathode having a cathode active material, an anode, and an electrolyte, wherein the cathode active material includes a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains tin Sn.

According to another embodiment, there is provided a cathode active material comprising a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains phosphorus P.

According to the embodiment, mean compositions of the composite oxide particle are expressed by Formula 1, $$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, it is preferable that a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, and tungsten W.

According to the embodiment, an amount of coating layer ranges from 0.5 weight % to 50 weight % of the composite oxide particle.

According to the embodiment, a mean diameter a ranges from 2.0 µm to 50 µm.

According to another embodiment, there is provided a manufacturing method of a cathode active material, comprising: forming a layer made of a hydroxide containing nickel Ni and/or manganese Mn into at least a part of a composite oxide particle including at least lithium Li and cobalt Co and, thereafter, coating at least a part of the composite oxide particle with a phosphoric acid; and executing a heating process after coating with the phosphoric acid, thereby forming a coating layer made of an oxide containing lithium Li and a coating element of at least one of nickel Ni and manganese Mn and a surface layer containing phosphorus P into at least a part of the composite oxide particle.

According to the embodiment, mean compositions of the composite oxide particle are expressed by Formula 1, $$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, the hydroxide containing nickel Ni and/or manganese Mn is formed by dispersing the composite oxide particle into a solvent constructed mainly by water whose pH is equal to 12 or more and, thereafter, adding a compound of nickel Ni and/or a compound of manganese Mn.

Further, according to the embodiment, the solvent constructed mainly by the water contains lithium hydroxide.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, and tungsten W.

According to the embodiment, an amount of coating layer ranges from 0.5 weight % to 50 weight % of the composite oxide particle.

According to the embodiment, a mean diameter of the particle in the cathode active material ranges from 2.0 μm to 50 μm.

According to another embodiment, there is provided a non-aqueous electrolyte secondary battery comprising a cathode having a cathode active material, an anode, and an electrolyte, wherein the cathode active material includes a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains phosphorus P.

According to another embodiment, there is provided a cathode active material comprising a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and includes an oxide containing magnesium Mg.

According to the embodiment, mean compositions of the composite oxide particle are expressed by Formula 1, $$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, calcium Ca, strontium Sr, tungsten W, yttrium Y, and zirconium Zr; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

According to the embodiment, the oxide in the surface layer is an oxide obtained by replacing 20 mol % or less of a total amount of magnesium Mg with a metal element of at least one kind selected from a group containing cobalt Co, aluminum Al, nickel Ni, manganese Mn, yttrium Y, boron B, titanium, vanadium V, chromium Cr, iron Fe, copper Cu, zinc Zn, molybdenum Mo, tin Sn, calcium Ca, strontium Sr, tungsten W, and zirconium Zr.

According to the embodiment, an amount of coating layer ranges from 0.5 weight % to 50 weight % of the composite oxide particle.

According to the embodiment, an amount of magnesium Mg contained in the surface layer ranges from 0.01 weight % to 1.0 weight % of the cathode active material on the assumption that the amount of magnesium Mg is calculated as a weight in a magnesium oxide MgO.

According to the embodiment, a mean diameter ranges from 2.0 μm to 50 μm.

According to another embodiment, there is provided a manufacturing method of a cathode active material, comprising forming a layer made of a hydroxide containing nickel Ni and/or manganese Mn into at least a part of a composite oxide particle including at least lithium Li and cobalt Co and, thereafter, forming a hydroxide containing magnesium Mg into at least a part of the composite oxide particle; and executing a heating process after forming the hydroxide containing magnesium Mg, thereby forming a coating layer made of an oxide containing lithium Li and a coating element of at least one of nickel Ni and manganese Mn and a surface layer made of an oxide containing magnesium Mg into at least a part of the composite oxide particle.

According to the embodiment, mean compositions of the composite oxide particle are expressed by Formula 1, $$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, calcium Ca, strontium Sr, tungsten W, yttrium Y, and zirconium Zr; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, the coating of the hydroxide containing nickel Ni and/or manganese Mn is performed by dispersing the composite oxide particle into a solvent constructed mainly by water whose pH is equal to 12 or more and, thereafter, adding a compound of nickel Ni and/or a compound of manganese Mn.

Further, according to the embodiment, the solvent constructed mainly by the water contains lithium hydroxide.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

According to the embodiment, the oxide in the surface layer is an oxide obtained by replacing 20 mol % or less of a total amount of magnesium Mg with a metal element of at least one kind selected from a group containing cobalt Co, aluminum Al, nickel Ni, manganese Mn, yttrium Y, boron B, titanium, vanadium V, chromium Cr, iron Fe, copper Cu, zinc Zn, molybdenum Mo, tin Sn, calcium Ca, strontium Sr, tungsten W, and zirconium Zr.

According to the embodiment, an amount of coating layer ranges from 0.5 weight % to 50 weight % of the composite oxide particle.

According to the embodiment, an amount of magnesium Mg contained in the surface layer ranges from 0.01 weight % to 1.0 weight % of the cathode active material on the assumption that the amount of magnesium Mg is calculated as a weight in a magnesium oxide MgO.

According to the embodiment, a mean diameter of the particle in the cathode active material ranges from 2.0 μm to 50 μm.

According to another embodiment, there is provided a non-aqueous electrolyte secondary battery comprising a cathode having a cathode active material, an anode, and an electrolyte, wherein the cathode active material includes a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and includes an oxide containing magnesium Mg.

According to another embodiment, there is provided a cathode active material comprising a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains boron B.

According to the embodiment of the invention, it is preferable that mean compositions of the composite oxide particle are expressed by Formula 1, $$Li_{(1+x)}Co_{(1-y)}M_yO_{(2-z)} \quad \text{(Formula 1)}$$

where, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum MO, tin Sn, and tungsten W.

According to the embodiment, an amount of coating layer ranges from 0.5 weight % to 50 weight % of the composite oxide particle.

According to the embodiment, a mean diameter ranges from 2.0 μm to 50 μm.

According to another embodiment, there is provided a manufacturing method of a cathode active material, comprising forming a layer made of a hydroxide containing nickel Ni and/or manganese Mn into at least a part of a composite oxide particle including at least lithium Li and cobalt Co and, thereafter, coating at least a part of the composite oxide particle with a boric acid; and executing a heating process after coating with the boric acid, thereby forming a coating layer made of an oxide containing lithium Li and a coating element of at least one of nickel Ni and manganese Mn and a surface layer containing boron B into at least a part of the composite oxide particle.

According to the embodiment, mean compositions of the composite oxide particle are expressed by Formula 1, $$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, it is preferable that the hydroxide containing nickel Ni and/or manganese Mn is formed by dispersing the composite oxide particle into a solvent constructed mainly by water whose pH is equal to 12 or more and, thereafter, adding a compound of nickel Ni and/or a compound of manganese Mn.

Further, according to the embodiment, the solvent constructed mainly by the water contains lithium hydroxide.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, and tungsten W.

According to the embodiment, an amount of coating layer ranges from 0.5 weight % to 50 weight % of the composite oxide particle.

According to the embodiment, a mean diameter of the particle in the cathode active material ranges from 2.0 μm to 50 μm.

According to another embodiment, there is provided a non-aqueous electrolyte secondary battery comprising a cathode having a cathode active material, an anode, and an electrolyte, wherein the cathode active material includes a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains boron B.

According to another embodiment, there is provided a cathode active material comprising a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and includes an oxide containing zinc Zn.

According to the embodiment, mean compositions of the composite oxide particle are expressed by Formula 1, $$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, calcium Ca, strontium Sr, tungsten W, yttrium Y, and zirconium Zr; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

According to the embodiment, the oxide in the surface layer is an oxide obtained by replacing 20 mol % or less of a total amount of zinc Zn with a metal element of at least one kind selected from a group containing cobalt Co, aluminum Al, nickel Ni, manganese Mn, yttrium Y, boron B, titanium, vanadium V, chromium Cr, iron Fe, copper Cu, zinc Zn, molybdenum Mo, tin Sn, calcium Ca, strontium Sr, tungsten W, and zirconium Zr.

According to the embodiment, an amount of coating layer ranges from 0.5 weight % to 50 weight % of the composite oxide particle.

According to the embodiment, an amount of zinc Zn contained in the surface layer ranges from 0.02 weight % to 2.0 weight % of the cathode active material on the assumption that the amount of zinc Zn is calculated as a weight in a zinc oxide ZnO.

According to the embodiment, a mean diameter ranges from 2.0 μm to 50 μm.

According to still another embodiment, there is provided a manufacturing method of a cathode active material, comprising the steps of forming a layer made of a hydroxide containing nickel Ni and/or manganese Mn into at least a part of a composite oxide particle including at least lithium Li and cobalt Co and, thereafter, forming a hydroxide containing zinc Zn into at least a part of the composite oxide particle; and executing a heating process after forming the hydroxide containing zinc Zn, thereby forming a coating layer made of an oxide containing lithium Li and a coating element of at least one of nickel Ni and manganese Mn and a surface layer made of an oxide containing zinc Zn into at least a part of the composite oxide particle.

According to the embodiment, mean compositions of the composite oxide particle are expressed by Formula 1, $$Li_{(1+x)}Co_{(1-y)}M_yO_{(2-z)} \qquad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, calcium Ca, strontium Sr, tungsten W, yttrium Y, and zirconium Zr; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, the coating of the hydroxide containing nickel Ni and/or manganese Mn is performed by dispersing the composite oxide particle into a solvent constructed mainly by water whose pH is equal to 12 or more and, thereafter, adding a compound of nickel Ni and/or a compound of manganese Mn.

Further, according to the embodiment, the solvent constructed mainly by the water contains lithium hydroxide.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

According to the embodiment, the oxide in the surface layer is an oxide obtained by replacing 20 mol % or less of a total amount of zinc Zn with a metal element of at least one kind selected from a group containing cobalt Co, aluminum Al, nickel Ni, manganese Mn, yttrium Y, boron B, titanium, vanadium V, chromium Cr, iron Fe, copper Cu, zinc Zn, molybdenum Mo, tin Sn, calcium Ca, strontium Sr, tungsten W, and zirconium Zr.

According to the embodiment, an amount of coating layer ranges from 0.5 weight % to 50 weight % of the composite oxide particle.

According to the embodiment, an amount of zinc Zn contained in the surface layer ranges from 0.02 weight % to 2.0 weight % of the cathode active material on the assumption that the amount of zinc Zn is calculated as a weight in a zinc oxide ZnO.

According to the embodiment, a mean diameter of the particle in the cathode active material ranges from 2.0 μm to 50 μm.

According to another embodiment, there is provided a non-aqueous electrolyte secondary battery comprising a cathode having a cathode active material, an anode, and an electrolyte, wherein the cathode active material includes a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and includes an oxide containing zinc Zn.

According to another embodiment, there is provided a cathode active material comprising a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains tungsten W.

According to the embodiment, mean compositions of the composite oxide particle are expressed by Formula 1, $$Li_{(1+x)}Co_{(1-y)}M_yO_{(2-z)} \qquad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, and tungsten W.

According to the embodiment, an amount of coating layer ranges from 0.5 weight % to 50 weight % of the composite oxide particle.

According to the embodiment, a mean diameter ranges from 2.0 μm to 50 μm.

According to another embodiment, there is provided a manufacturing method of a cathode active material, comprising forming a layer made of a hydroxide containing nickel Ni and/or manganese Mn into at least a part of a composite oxide particle including at least lithium Li and cobalt Co and, thereafter, coating at least a part of the composite oxide particle with a tungstic acid; and executing a heating process after coating with the tungstic acid, thereby forming a coating layer made of an oxide containing lithium Li and a coating element of at least one of nickel Ni and manganese Mn and a surface layer containing tungsten W into at least a part of the composite oxide particle.

According to the embodiment, mean compositions of the composite oxide particle are expressed by Formula 1, $$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.10$; y indicates a value within a range of $0 \leq y \leq 0.50$; and z indicates a value within a range of $-0.10 \leq z \leq 0.20$.

According to the embodiment, the hydroxide containing nickel Ni and/or manganese Mn is formed by dispersing the composite oxide particle into a solvent constructed mainly by water whose pH is equal to 12 or more and, thereafter, adding a compound of nickel Ni and/or a compound of manganese Mn.

Further, according to the embodiment, the solvent constructed mainly by the water contains lithium hydroxide.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, and tungsten W.

According to the embodiment, an amount of coating layer ranges from 0.5 weight % to 50 weight % of the composite oxide particle.

According to the embodiment, a mean diameter of the particle in the cathode active material ranges from 2.0 µm to 50 µm.

According to another embodiment, there is provided a non-aqueous electrolyte secondary battery comprising a cathode having a cathode active material, an anode, and an electrolyte, wherein the cathode active material includes a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and contains tungsten W.

According to another embodiment, there is provided a cathode active material for a non-aqueous electrolyte secondary battery, comprising a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and includes an oxide of an element of at least one kind of silicon Si, aluminum Al, titanium, and zirconium Zr.

According to the embodiment, mean compositions of the composite oxide particle are expressed by Formula 2 or 3, $$Li_{(1+w)}Co_{(1-x-y)}Ma_xMb_yO_{(2-z)} \quad \text{(Formula 2)}$$

in Formula 2, Ma denotes an element of at least one kind selected from a group containing bismuth Bi and gallium Ga; Mb denotes an element of at least one kind selected from a group containing vanadium V, chromium Cr, boron B, manganese Mn, iron Fe, nickel Ni, copper Cu, zinc Zn, aluminum Al, magnesium Mg, titanium, zirconium Zr, molybdenum Mo, tin Sn, calcium Ca, strontium Sr, yttrium Y, and tungsten W; w indicates a value within a range of $-0.10 \leq w \leq 0.10$; x indicates a value within a range of $0.001 \leq x \leq 0.10$; y indicates a value within a range of $0 \leq y \leq 0.40$; and z indicates a value within a range of $-0.10 \leq z \leq 0.20$, and $$Li_{(1+w)}Co_{(1-x-y)}Mc_xMd_yO_{(2-z)} \quad \text{(Formula 3)}$$

in Formula 3, Mc denotes an element of at least one kind selected from a group containing magnesium Mg, aluminum Al, titanium, and zirconium Zr; Md denotes an element of at least one kind selected from a group containing vanadium V, chromium Cr, boron B, manganese Mn, iron Fe, nickel Ni, copper Cu, zinc Zn, molybdenum Mo, tin Sn, calcium Ca, strontium Sr, yttrium Y, and tungsten W; w indicates a value within a range of $-0.10 \leq w \leq 0.10$; x indicates a value within a range of $0.001 \leq x \leq 0.10$; y indicates a value within a range of $0 \leq y \leq 0.40$; and z indicates a value within a range of $-0.10 \leq z \leq 0.20$.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

According to the embodiment, an amount of coating element in the coating layer ranges from 0.5 mol % or more to 50 mol % or less for the number of moles of the composite oxide particle.

According to the embodiment, a primary mean diameter of the metal oxide particle forming the coating layer ranges from 1.0 m or more to 100 nm or less.

According to the embodiment, the metal oxide particle forming the coating layer ranges from 0.01 mol % or more to 10 mol % or less for the metal element of the composite oxide particle.

According to the embodiment, a mean diameter of the particle in the cathode active material for the non-aqueous electrolyte secondary battery ranges from 2.0 µm or more to 50 µm or less.

According to another embodiment, there is provided a manufacturing method of a cathode active material for a non-aqueous electrolyte secondary battery, comprising forming a layer made of a hydroxide containing nickel Ni and/or manganese Mn into at least a part of a composite oxide particle including at least lithium Li and cobalt Co and, thereafter, forming a hydroxide of at least one kind of silicon Si, aluminum Al, titanium, and zirconium Zr into at least a part of the composite oxide particle; and executing a heating process after forming the hydroxide of at least one kind of silicon Si, aluminum Al, titanium, and zirconium Zr, thereby forming a coating layer made of an oxide containing lithium Li and a coating element of at least one of nickel Ni and manganese Mn and a surface layer made of an oxide of an element of at least one kind of silicon Si, aluminum Al, titanium, and zirconium Zr into at least a part of the composite oxide particle.

According to the embodiment, mean compositions of the composite oxide particle are expressed by Formula 2 or 3, $$Li_{(1+w)}Co_{(1-x-y)}Ma_xMb_yO_{(2-z)} \quad \text{(Formula 2)}$$

in Formula 2, Ma denotes an element of at least one kind selected from a group containing bismuth Bi and gallium Ga; Mb denotes an element of at least one kind selected from a group containing vanadium V, chromium Cr, boron B, manganese Mn, iron Fe, nickel Ni, copper Cu, zinc Zn, aluminum Al, magnesium Mg, titanium, zirconium Zr, molybdenum Mo, tin Sn, calcium Ca, strontium Sr, yttrium Y, and tungsten W; w indicates a value within a range of $-0.10 \leq w \leq 0.10$; x indicates a value within a range of $0.001 \leq x \leq 0.10$; y indicates a value within a range of $0 \leq y \leq 0.40$; and z indicates a value within a range of $-0.10 \leq z \leq 0.20$, and $$Li_{(1+w)}Co_{(1-x-y)}Mc_xMd_yO_{(2-z)} \quad \text{(Formula 3)}$$

in Formula 3, Mc denotes an element of at least one kind selected from a group containing magnesium Mg, aluminum Al, titanium, and zirconium Zr; Md denotes an element of at least one kind selected from a group containing vanadium V, chromium Cr, boron B, manganese Mn, iron Fe, nickel Ni, copper Cu, zinc Zn, molybdenum Mo, tin Sn, calcium Ca, strontium Sr, yttrium Y, and tungsten W; w indicates a value within a range of $-0.10 \leq w \leq 0.10$; x indicates a value within a range of $0.001 \leq x \leq 0.10$; y indicates a value within a range of $0 \leq y \leq 0.40$; and z indicates a value within a range of $-0.10 \leq z \leq 0.20$.

According to the embodiment, the coating of the hydroxide containing nickel Ni and/or manganese Mn is performed by dispersing the composite oxide particle into a solvent constructed mainly by water whose pH is equal to 12 or more and, thereafter, adding a compound of nickel Ni and/or a compound of manganese Mn.

Further, according to the embodiment, the solvent constructed mainly by the water contains lithium hydroxide.

According to the embodiment, a construction ratio of nickel Ni and manganese Mn in the coating layer ranges from 100:0 to 30:70 as a mole ratio.

According to the embodiment, the oxide in the coating layer is an oxide obtained by replacing 40 mol % or less of a total amount of nickel Ni and manganese Mn with a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

According to the embodiment, an amount of coating element in the coating layer ranges from 0.5 mol % or more to 50 mol % or less for the number of moles of the composite oxide particle.

According to the embodiment, a primary mean diameter of the metal oxide particle forming the coating layer ranges from 1.0 nm or more to 100 μm or less.

According to the embodiment, the metal oxide particle forming the coating layer ranges from 0.01 mol % or more to 10 mol % or less for the metal element of the composite oxide particle.

According to the embodiment, a mean diameter of the particle in cathode active material for the non-aqueous electrolyte secondary battery ranges from 2.0 μm or more to 50 μm or less.

According to another embodiment, there is provided a manufacturing method of a cathode active material for a non-aqueous electrolyte secondary battery, comprising forming a layer made of a hydroxide containing nickel Ni and/or manganese Mn into at least a part of a composite oxide particle including at least lithium Li and cobalt Co; and coating a surface of the composite oxide particle with an oxide of an element of at least one kind of silicon Si, aluminum Al, titanium, and zirconium Zr and, thereafter, executing a heating process, thereby forming a coating layer made of an oxide containing lithium Li and a coating element of at least one of nickel Ni and manganese Mn and a surface layer made of an oxide of an element of at least one kind of silicon Si, aluminum Al, titanium, and zirconium Zr into at least a part of the composite oxide particle.

According to still another embodiment, there is provided a non-aqueous electrolyte secondary battery comprising a cathode having a cathode active material for the non-aqueous electrolyte secondary battery, an anode, and an electrolyte, wherein the cathode active material for the non-aqueous electrolyte secondary battery has a composite oxide particle including at least lithium Li and cobalt Co; a coating layer which is provided in at least a part of the composite oxide particle and includes an oxide containing lithium Li and a coating element of at least one of nickel Ni and manganese Mn; and a surface layer which is provided in at least a part of the coating layer and includes an oxide of an element of at least one kind of silicon Si, aluminum Al, titanium, and zirconium Zr.

According to the embodiment, since the coating layer made of the oxide containing lithium Li and the coating element of at least one of nickel Ni and manganese Mn is provided in at least a part of the composite oxide particle, the high charge voltage performance and the high energy density performance associated therewith can be realized and the battery has the excellent charge/discharge cycle characteristics under the high charge voltage condition.

According to the embodiments, since the composite oxide particle provided with the hydroxide containing at least one of nickel Ni and manganese Mn is coated with the silicic acid, the binding of the particles can be suppressed.

According to the embodiments, since the composite oxide particle provided with the hydroxide containing at least one of nickel Ni and manganese Mn is coated with the stannic acid, the binding of the particles can be suppressed.

According to the embodiments, since the composite oxide particle provided with the hydroxide containing at least one of nickel Ni and manganese Mn is coated with the phosphoric acid, the binding of the particles can be suppressed.

According to the embodiments, since the hydroxide containing magnesium Mg is formed on the composite oxide particle provided with the hydroxide containing at least one of nickel Ni and manganese Mn, the binding of the particles can be suppressed.

According to the embodiments, since the composite oxide particle provided with the hydroxide containing at least one of nickel Ni and manganese Mn is coated with the boric acid, the binding of the particles can be suppressed.

According to the embodiments, since the hydroxide containing zinc Zn is formed on the composite oxide particle provided with the hydroxide containing at least one of nickel Ni and manganese Mn, the binding of the particles can be suppressed.

According to the embodiments of the invention, since the composite oxide particle provided with the hydroxide containing at least one of nickel Ni and manganese Mn is coated with the tungstic acid, the binding of the particles can be suppressed.

According to the embodiments, since the hydroxide containing at least one kind of silicon Si, aluminum Al, titanium, and zirconium Zr is formed on the composite oxide particle provided with the hydroxide containing at least one of nickel Ni and manganese Mn, the binding of the particles can be suppressed.

According to the embodiments, the chemical stability of the cathode active material can be further improved. According to the battery using such a cathode active material, the high capacitance can be obtained and the charge/discharge efficiency can be improved.

Other features and advantages will be apparent from the following description taken in conjunction with the accompanying drawings, in which like reference characters designate the same or similar parts throughout the figures thereof.

Additional features and advantages are described herein, and will be apparent from, the following Detailed Description and the figures.

DETAILED DESCRIPTION

First Embodiment

Figure 1:
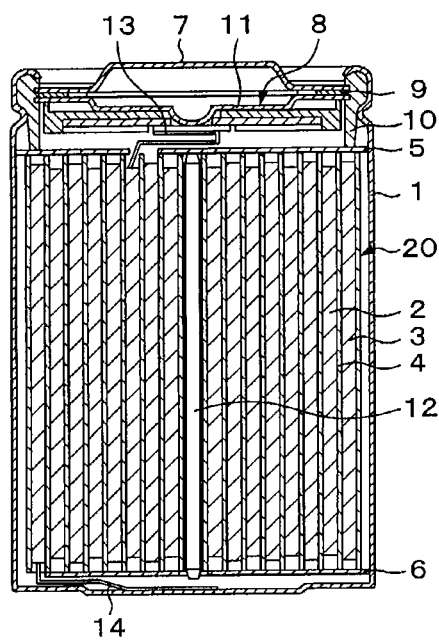
FIG. 1 is a schematic cross sectional view of a first example of a non-aqueous electrolyte secondary battery using a cathode active material according to an embodiment.

Embodiments are described below with reference to the drawings. A cathode active material according to the first embodiment is constructed in such a manner that a coating layer made of an oxide containing lithium Li and a coating element of at least one of nickel Ni and manganese Mn is provided in at least a part of a composite oxide particle and a surface layer containing silicon Si is provided in at least a part of the coating layer.

First, the reason why the cathode active material includes the above construction will be described. Although the cathode active material constructed mainly by a lithium cobalt acid $LiCoO_2$ can realize the high charge voltage performance and the high energy density performance associated therewith, if the charge/discharge cycles at a high capacitance are repeated at the high charge voltage, the capacitance decreases largely. Since a cause for it depends on the surface of the cathode active material particle, necessity of a surface process of the cathode active material is pointed out.

Therefore, although various surface processes have been proposed, from a viewpoint of eliminating the decrease in capacitance per volume or weight or minimizing the decrease in capacitance, by executing the surface process by a material which can suppress the decrease in capacitance or contribute to the capacitance, the cathode active material in which the high charge voltage performance and the high energy density performance associated therewith can be realized and which is excellent in the charge/discharge cycle characteristics at the high charge voltage can be obtained.

By providing a coating layer made of an oxide containing lithium Li and a coating element of at least one of nickel Ni and manganese Mn for the cathode active material constructed mainly by the lithium cobalt acid $LiCoO_2$, the cathode active material which has the high charge voltage performance and the high energy density performance associated therewith and is excellent in the charge/discharge cycle characteristics at the high capacitance under the high charge voltage condition can be obtained although it is slightly poor in the high charge voltage performance and the high energy density performance associated therewith.

As a method of providing the coating layer for the composite oxide particle, the following methods can be proposed: a method whereby a compound of lithium Li and a compound of nickel Ni and/or a compound of manganese Mn are mixed in a dry manner as micro-pulverized particles with the composite oxide particle, the particle is coated and baked, and the coating layer made of the oxide containing lithium Li and the coating element of at least one of nickel Ni and manganese Mn is formed on the surface of the composite oxide particle; and a method whereby the compound of lithium Li and the compound of nickel Ni and/or the compound of manganese Mn are dissolved or mixed into a solvent, the particle is coated and baked in a wet manner and the coating layer made of the oxide containing lithium Li and the coating element of at least one of nickel Ni and manganese Mn is formed on the surface of the composite oxide particle. However, according to those methods, such a result that it is difficult to accomplish the coating of high uniformity is obtained.

By coating the surface of the particle with nickel Ni and/or manganese Mn as a hydroxide, heat-dehydrating it, and forming the coating layer, the coating of high uniformity can be realized. According to such a coating process, the compound of nickel Ni and/or the compound of manganese Mn is dissolved into a solvent system constructed mainly by the water. Thereafter, the composite oxide particle is dispersed into the solvent system. A basicity of a dispersing system is raised by adding a base to such a dispersing system or by another method. The hydroxide containing nickel Ni and/or manganese Mn is precipitated to the surface of the composite oxide particle.

The uniformity of the coating onto the composite oxide particle can be further improved by executing the coating process in the solvent system constructed mainly by the water whose pH is equal to 12 or more. In other words, the metal composite oxide particle is preliminarily dispersed into the solvent system constructed mainly by the water whose pH is equal to 12 or more. The compound of nickel Ni and/or the compound of manganese Mn is added to the solvent system. The surface of the metal composite oxide particle is coated with the hydroxide containing nickel Ni and/or manganese Mn.

The composite oxide particle coated with the hydroxide containing nickel Ni and/or manganese Mn by the coating process is heat-dehydrated, thereby forming the coating layer onto the surface of the composite oxide particle. Thus, the uniformity of the coating onto the surface of the composite oxide particle can be improved.

In the steps of coating the surface of the composite oxide particle with the hydroxide containing nickel Ni and/or manganese Mn and cleaning, dehydrating, and drying the composite oxide particle in order to bake it, the particles are bound through the hydroxide containing nickel Ni and/or manganese Mn on the surface. If the particles are broken, a peel-off of an interference of the hydroxide containing nickel Ni and/or manganese Mn whose adhesion is relatively weak and the composite oxide particle occurs or a cohesive failure of the hydroxide containing nickel Ni and/or manganese Mn whose cohesion is weak occurs. In association with it, the improvement of the characteristics of the cathode active material is deteriorated due to the creation of the coating layer.

If the baking in which lithium Li has been added is progressed while keeping the binding of the particles as it is or in the state where the particles having the hydroxide containing nickel Ni and/or manganese Mn are come into contact with the surface, there is such a tendency that the sintering between the particles is liable to be progressed.

If the sintering between the particles is progressed, there is a problem as will be described hereinbelow. Upon creation of the cathode, it is necessary to increase an amount of mechanical energy which is applied in the breakage of the particles that is performed to uniformly mix the composite oxide particle with the binder and the carbon particle serving as a conductive material. In association with it, the cathode active material formed by the composite oxide particles having the coating layer is damaged or broken, so that a total defect amount as powder increases.

The damage or breakdown occurs in a form of a disconnection of a coupling portion of the sintered particles, a creation of a crack in the particle, a crushing of the particle itself, a peel-off of the coating layer, or the like. Particularly, in the composite oxide particle having the coating layer, as compared with the particle of the cathode active material or the like constructed mainly by the lithium cobalt acid $LiCoO_2$, there is such a tendency that the surface shape of the particle is not smooth and it has the coarse surface. Therefore, when the particle receives an external force, it is considered that a slip between the particles is not smooth, the external force is easily concentrated on a local position, and the cathode active material is easily damaged or broken.

Thus, the surface to which the coating layer is not provided is exposed. That is, the surface which does not contribute to the improvement of the charge/discharge cycle characteristics and to which the coating layer is not provided and the active new surface are exposed. Therefore, the charge/discharge cycle characteristics of the high capacitance under the high charge voltage condition deteriorate. As is well known, the exposed surface is active and has a high surface energy. Thus, a decomposition reaction of the electrolytic solution and the activity of the elution of the surface are extremely higher than those of the surface formed by the ordinary baking.

Through examination, it has been determined that the surface of the composite oxide particle coated with the hydroxide containing nickel Ni and/or manganese Mn is further coated with a silicic acid, thereby enabling the progress of the sintering to be improved. The damage or breakdown of the particle can be decreased in association with it. The composite oxide particle, coating layer, and surface layer will now be described.

[Composite Oxide]

The composite oxide particle contains at least lithium Li and cobalt Co and it is preferable that its mean compositions are expressed by, for example, Formula 1. By using such a composite oxide particle, the high capacitance and high discharge electric potential can be obtained.

$$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.10$; y indicates a value within a range of $0 \leq y \leq 0.50$; and z indicates a value within a range of $-0.10 \leq z \leq 0.20$.

In Formula 1, the range of x is, for example, $-0.10 \leq x \leq 0.10$, preferably, $-0.08 \leq x \leq 0.08$, and more preferably, $-0.06 \leq x \leq 0.06$. If x decreases to a value under such a range, the discharge capacitance decreases. If x increases to a value over such a range, the elements are diffused out of the particle, become an obstacle to control of basicity in a next processing step, and finally, become a cause of obstructing the promotion of a gel creation during the kneading of a cathode paste.

The range of y is, for example, $0 \leq y \leq 0.50$, preferably, $0 \leq y \leq 0.40$, and more preferably, $0 \leq y \leq 0.30$. If y increases to a value over such a range, the high charge voltage performance held by $LiCoO_2$ and the high energy density performance associated therewith are deteriorated.

The range of z is, for example, $-0.10 \leq z \leq 0.20$, preferably, $-0.08 \leq z \leq 0.18$, and more preferably, $-0.06 \leq z \leq 0.16$. If z decreases to a value under such a range and if z increases to a value over such a range, there is such a tendency that the discharge capacitance decreases.

As for the composite oxide particle, a material which can be ordinarily obtained as a cathode active material can be used as a starting raw material. However, according to circumstances, after a secondary particle was broken by using a ball mill, a grinding machine, or the like, it can be used.

[Coating Layer]

A coating layer is provided in at least a part of the composite oxide particle and includes an oxide containing lithium Li and a coating element of at least one of nickel Ni and manganese Mn. By providing the coating layer, the high charge voltage performance and the high energy density performance associated therewith can be realized and the charge/discharge cycle characteristics at the high capacitance under the high charge voltage condition can be improved.

It is preferable that a construction ratio of nickel Ni and manganese Mn in the coating layer ranges from 100:0 to 30:70 as a mole ratio. It is more preferable that it ranges from 100:0 to 40:60. This is because if an amount of manganese Mn increases to a value over such a range, doping performance of lithium Li deteriorates and, finally, it becomes a factor of a decrease in capacitance of the cathode active material and an increase in electric resistance when such a material is used for a battery. The range of the construction ratio of nickel Ni and manganese Mn is a range showing a larger validity adapted to suppress the progress of sintering between the particles in the baking of a precursor added with lithium Li.

Nickel Ni and manganese Mn in the oxide of the coating layer can be replaced by a metal element of at least one kind selected from a group containing magnesium Mg, aluminum Al, boron B, titanium, vanadium V, chromium Cr, iron Fe, cobalt Co, copper Cu, zinc Zn, tin Sn, and tungsten W.

Thus, stability of the cathode active material can be improved and diffusibility of lithium ions can be improved. A replacement amount of the selected metal element is, for example, equal to or less than 40 mol % of a total amount of nickel Ni and manganese Mn in the oxide of the coating layer, preferably, 30 mol % or less and, more preferably, 20 mol % or less. This is because if the replacement amount of the selected metal element increases to a value over such a range, the doping performance of lithium Li deteriorates and the capacitance of the cathode active material decreases.

An amount of coating layer lies, for example, within a range from 0.5 weight % to 50 weight % of the composite oxide particle, preferably, a range from 1.0 weight % to 40 weight %, more preferably, a range from 2.0 weight % to 35 weight %. This is because if the coating weight of the metal oxide increases to a value over such a range, the capacitance of the cathode active material decreases. This is also because if the coating weight of the metal oxide decreases to a value under such a range, the stability of the cathode active material deteriorates.

[Surface Layer]

The surface layer is provided in at least a part of the coating layer and contains silicon Si.

A mean diameter of the particle in the cathode active material preferably ranges from 2.0 μm to 50 μm. This is because if the mean diameter is less than 2.0 μm, when the cathode active material is pressed upon manufacturing of the cathode, it is peeled off and a surface area of the active material increases, so that it is necessary to increase addition amounts of a conductive material and a binder, and there is such a tendency that an energy density per unit weight decreases. This is also because if the mean diameter exceeds 50 μm, the particle pierces a separator and there is such a tendency that a short-circuit is caused.

[Manufacturing Method of Cathode Active Material]

Subsequently, a manufacturing method of the cathode active material according to the first embodiment is described. The manufacturing method of the cathode active material according to the first embodiment of the invention can be roughly classified into: a first step of forming a layer made of a hydroxide containing nickel Ni and/or manganese Mn into at least a part of the composite oxide particle and, thereafter, coating at least a part of the composite oxide particle with a silicic acid; and a second step of executing a heating process after coating with the silicic acid, thereby forming a coating layer made of an oxide containing lithium Li and a coating element of at least one of nickel Ni and manganese Mn and a surface layer containing silicon Si into at least a part of the composite oxide particle.

(First Step)

In the first step, a coating process of the hydroxide containing nickel Ni and/or manganese Mn and the silicic acid is executed. In the first step, for example, first, the composite oxide particle is dispersed into a solvent system constructed mainly by water in which a compound of nickel Ni and/or a compound of manganese Mn have been dissolved, a basicity of the dispersing system is raised by adding a base into the dispersing system, or the like, and the hydroxide containing nickel Ni and/or manganese Mn is precipitated to the surface of the composite oxide particle. It is also possible to use a method whereby the composite oxide particle is dispersed into the solvent constructed mainly by basic water, subsequently, the compound of nickel Ni and/or the compound of manganese Mn is added to the aqueous solution, and the hydroxide containing nickel Ni and/or manganese Mn is precipitated.

As for a raw material of the coating process of the hydroxide containing nickel Ni, as a nickel compound, for example, it is possible to use: an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate, nickel thiocyanate, or the like; or an organic compound such as nickel oxalate, nickel acetate, or the like. One, two, or more kinds of them may be used.

As for a raw material of the coating process of the hydroxide containing manganese Mn, as a manganese compound, for example, it is possible to use: an inorganic compound such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrogensulfide, manganese sulfate, manganese hydrogensulfate, manganese thiocyanate, manganese nitrite, manganese phosphate, manganese dihydrogenphosphate, manganese hydrogencarbonate, or the like; or an organic compound such as manganese oxalate, manganese acetate, or the like. One, two, or more kinds of them may be used.

A value of pH of the solvent system constructed mainly by the water mentioned above is, for example, equal to 12 or more, preferably, 13 or more, and more preferably, 14 or more. The larger the value of pH of the solvent system constructed mainly by the water mentioned above is, the better the uniformity of the coating of the hydroxide containing nickel Ni and/or manganese Mn is and a reaction precision is also high. There are such advantages that the productivity is improved owing to the reduction in processing time and the quality is improved. The pH of the solvent system constructed mainly by the water is determined in consideration of the costs of alkali which is used or the like.

A temperature of the process dispersing system is, for example, equal to 40° C. or more, preferably, 60° C. or more, and more preferably, 80° C. or more. The larger the value of the temperature of the process dispersing system is, the better the uniformity of the coating of the hydroxide containing nickel Ni and/or manganese Mn is and a reaction speed is also high. There are such advantages that the productivity is improved owing to the reduction in processing time and the quality is improved. The value of the temperature of the process dispersing system is determined in consideration of the costs of the apparatus and the productivity. However, it is also possible to recommend to execute the processes at 10° C. or more by using an autoclave from a viewpoint of the productivity due to the reduction in processing time owing to the improvement of the coating uniformity and the improvement of the reaction speed.

Further, the pH of the solvent system constructed mainly by the water can be accomplished by dissolving alkali into the solvent system constructed mainly by the water. As alkali, for example, lithium hydroxide, sodium hydroxide, potassium hydroxide, and their mixture can be mentioned. Although the solvent system can be embodied by properly using those alkali, it is excellent to use lithium hydroxide from viewpoints of purity and performance of the cathode active material according to the first embodiment which is finally obtained. This is because if lithium hydroxide is used, the following advantages are obtained. When the composite oxide particle formed with the hydroxide containing nickel Ni and/or manganese Mn is taken out of the solvent system constructed mainly by the water, by controlling a deposition amount of the dispersing medium made of the solvent constructed mainly by the water, an amount of lithium of the cathode active material according to the first embodiment which is finally obtained can be controlled.

Subsequently, at least a part of the composite oxide particle formed with a layer made of the hydroxide containing nickel Ni and/or manganese Mn is coated with a silicic acid. It is effective to execute the coating process of the silicic acid in the state where the silicic acid has been suspended into the solvent system constructed mainly by the water in which the hydroxide containing nickel Ni and/or manganese Mn had been coating-processed. Thus, at a stage of dehydrating and drying the composite oxide particle formed with the layer made of the hydroxide containing nickel Ni and/or manganese Mn, such a situation that the particles are bound through the hydroxide containing nickel Ni and/or manganese Mn on the surface can be suppressed.

It is effective to execute the coating process of the silicic acid at a cleaning stage after the coating process of the hydroxide containing nickel Ni and/or manganese Mn. Thus, a leakage of the silicic acid added to the suspending system can be prevented and adsorption can be improved. Further, by executing the coating process of the silicic acid, a particle cohesion promoting effect which is not accompanied with the binding of the particles can be obtained in the suspending system. The cleaning operation and the collecting operation of the particles from the dispersing medium can be easily executed.

As a silicic acid, for example, orthosilicate, metasilicate, metadisilicate, metatrisilicate, and the like exist and they can be used. As a raw material of the silicate compound which can be used for the coating process, for example, the following compounds can be mentioned: a silicic acid; aluminum silicate; calcium orthosilicate; calcium metasilicate; lithium orthosilicate; lithium metasilicate; magnesium silicate; magnesium trisilicate; sodium silicate; sodium orthosilicate; sodium metasilicate; zirconium silicate; 12-molybdosilicic acid; 12-tungsto(VI)silicic acid; sodium 12-tungsto(VI)silicic acid; and the like. One, two, or more kinds of them may be used.

A coating weight of the silicic acid ranges, for example, from 0.00001 weight % to 1.0 weight % for a weight of the composite oxide particle, preferably, it ranges from 0.0001 weight % to 0.1 weight %. If the coating weight of the silicic acid increases to a value over such a range, the capacitance of the cathode active material decreases. If the coating weight of the silicic acid decreases to a value under such a range, the stability of the cathode active material deteriorates.

(Second Step)

In the second step, the composite oxide particle which has been coating-processed in the first step is separated from the solvent system constructed mainly by the water and, thereafter, heating-processed, thereby dehydrating the hydroxide. A coating layer made of an oxide containing lithium Li and a coating element of at least one of nickel Ni and manganese Mn and a surface layer containing silicon Si are formed on the surface of the composite oxide particle. It is preferable that the heating process is executed in an oxidation atmosphere such as air, pure oxygen, or the like at temperatures of, for example, about 300° C. to 1000° C. In this instance, since the hydroxide containing nickel Ni and/or manganese Mn has been coated with the silicic acid, the sintering between the particles is suppressed and the binding of the particles is suppressed.

After the composite oxide particle which has been coating-processed in the first step was separated from the solvent system, if necessary, in order to adjust the lithium amount, it is also possible to impregnate an aqueous solution of the lithium compound into the composite oxide particle and, thereafter, execute the heating process.

As a lithium compound, for example, it is possible to use: an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate, lithium hydrogencarbonate, or the like; or an organic compound such as methyllithium, vinyllithium, isopropyl lithium, butyllithium, phenyllithium, lithium oxalate, lithium acetate, or the like. One, two, or more kinds of them may be used.

After the baking, a particle size can be also adjusted as necessary by light pulverization, the classifying operation, or the like.

A non-aqueous electrolyte secondary battery using the cathode active material according to the first embodiment as mentioned above is described below.

(1) First Example of Non-Aqueous Electrolyte Secondary Battery (1-1) Construction of Non-Aqueous Electrolyte Secondary Battery FIG. 1 shows a cross sectional structure of a non-aqueous electrolyte secondary battery using the cathode active material according to the first embodiment.

In the secondary battery, an open circuit voltage in a perfect charging state per pair of cathode and anode ranges, for example, from 4.25V or more to 4.65V or less.

The secondary battery is what is called a cylindrical type and has a winded electrode member 20 in which a belt-shaped cathode 2 and a belt-shaped anode 3 have been wound through a separator 4 in an almost hollow cylindrical battery can 1.

The battery can 1 is made of iron Fe plated with, for example, nickel Ni. One end portion of the battery can is closed and the other end portion is open. A pair of insulating plates 5 and 6 are arranged in the battery can 1 so as to be perpendicular to the winded peripheral surface so as to sandwich the winded electrode member 20, respectively.

A battery cap 7 and a relief valve mechanism 8 and a thermally-sensitive resistive (PTC: Positive Temperature Coefficient) element 9 which are provided in the battery cap 7 are attached to the open end portion of the battery can 1 by being caulked through a gasket 10. The inside of the battery can 1 is sealed. The battery cap 7 is made of, for example, a material similar to that of the battery can 1. The relief valve mechanism 8 is electrically connected to the battery cap 7 through the PTC element 9. When an inner pressure of the battery rises to a predetermined value or more by an internal short-circuit, heating from the outside, or the like, a disk plate 11 is reversed, thereby disconnecting the electric connection between the battery cap 7 and the winded electrode member 20. When a temperature rises, the PTC element 9 limits a current by an increase in resistance value, thereby preventing an abnormal heat generation that is caused by the large current. The gasket 10 is made of, for example, an insulating material and its surface is coated with asphalt.

The winded electrode member 20 is wound around, for example, a center pin 12 as a center. A cathode lead 13 made of, for example, aluminum Al or the like is connected to the cathode 2 of the winded electrode member 20. An anode lead 14 made of, for example, nickel Ni or the like is connected to the anode 3. The cathode lead 13 is welded to the relief valve mechanism 8, so that it is electrically connected to the battery cap 7. The anode lead 14 is welded to the battery can 1 and is electrically connected thereto.

[Cathode]

Figure 2:
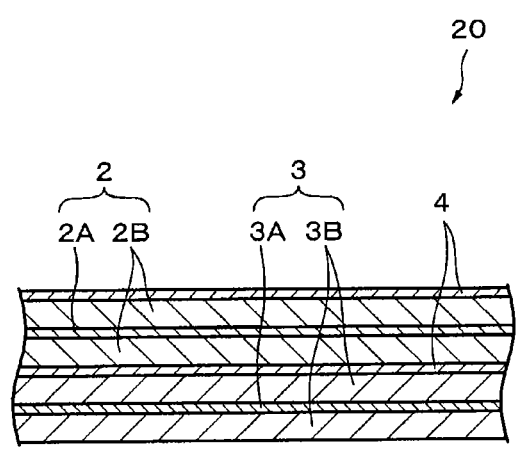
FIG. 2 is a partial enlarged cross sectional view of a winded electrode member shown in FIG. 1.

FIG. 2 enlargedly shows a part of the winded electrode member 20 shown in FIG. 1. As shown in FIG. 2, the cathode 2 has, for example, a cathode collector 2A having a pair of opposite surfaces and cathode mixture layers 2B provided for the both surfaces of the cathode collector 2A. The cathode 2 may have a region where the cathode mixture layer 2B is provided only for one surface of the cathode collector 2A. The cathode collector 2A is made of, for example, a metal foil such as an aluminum Al foil or the like. The cathode mixture layer 2B contains, for example, a cathode active material and may contain a conductive material such as graphite or the like and a binder such as polyvinylidene fluoride or the like as necessary. As a cathode active material, the cathode active material according to the foregoing first embodiment can be used.

[Anode]

As shown in FIG. 2, the anode 3 has, for example, an anode collector 3A having a pair of opposite surfaces and anode mixture layers 3B provided for the both surfaces of the anode collector 3A. The anode 3 may have a region where the anode mixture layer 3B is provided only for one surface of the anode collector 3A. The anode collector 3A is made of, for example, a metal foil such as a copper Cu foil or the like. The anode mixture layer 3B contains, for example, an anode active material and may contain a binder such as polyvinylidene fluoride or the like as necessary.

As an anode active material, an anode material which can dope and dedope lithium Li (hereinbelow, properly called an anode material which can dope and dedope lithium Li) is contained. As an anode material which can dope and dedope lithium Li, for example, a carbon material, a metal compound, an oxide, a sulfide, a lithium nitride such as $LiN_3$ or the like, a lithium metal, a metal which forms an alloy together with lithium, a high molecular material, or the like can be mentioned.

As a carbon material, for example, non-easy-graphitizable carbon, easy-graphitizable carbon, graphite, a pyrolytic carbon class, a coke class, a glassy carbon class, an organic high molecular compound baked material, carbon fiber, or activated charcoal can be mentioned. Among them, there is a pitch coke, a needle coke, a petroleum coke, or the like as a coke class. The organic high molecular compound baked material denotes a material obtained by baking the high molecular material such as phenol resin, fran resin, or the like at a proper temperature and carbonating it. A part of those materials are classified into the non-easy-graphitizable carbon or the easy-graphitizable carbon. Polyacetylene, polypyrrole, or the like can be mentioned as a high molecular material.

Among those anode materials which can dope and dedope lithium Li, a material whose charge/discharge electric potential is relatively close to that of the lithium metal is preferable. This is because the lower the charge/discharge electric potential of the anode 3 is, the more the high energy density of the battery can be easily realized. Among them, the carbon material is preferable because a change in crystal structure which is caused upon charging or discharging is very small, a high charge/discharge capacitance can be obtained, and good cycle characteristics can be obtained. Particularly, the graphite is preferable because an electrochemical equivalent is large and the high energy density can be obtained. The non-easy-graphitizable carbon is preferable because the excellent cycle characteristics can be obtained.

As an anode material which can dope and dedope lithium Li, a lithium metal simple substance or a simple substance, an alloy, or a compound of a metal element or a semimetal element which can form an alloy together with lithium Li can be mentioned. Those materials are preferable because the high energy density can be obtained. Particularly, if it is used together with a carbon material, since the high energy density can be obtained and the excellent cycle characteristics can be obtained, it is more preferable. In the specification, in addition to the alloy made of two or more kinds of metal elements, an alloy made of one or more kinds of metal elements and one or more kinds of semimetal elements is also incorporated as an alloy. As its texture, there is a solid solution, an eutectic (eutectic mixture), an intermetallic compound, or a texture in which two or more kinds coexists.

As such a metal element or a semimetal element, for example, tin Sn, lead Pb, aluminum Al, indium In, silicon Si, zinc Zn, antimony Sb, bismuth Bi, cadmium Cd, magnesium Mg, boron B, gallium Ga, germanium Ge, arsenic As, silver Ag, zirconium Zr, yttrium Y, or hafnium Hf can be mentioned. As an alloy or a compound of them, for example, an alloy or a compound expressed by Formula $Ma_s Mb_t Li_u$ or $Ma_p Mc_q Md_r$ can be mentioned. In those Formulae, Ma indicates at least one kind of metal elements and semimetal elements which can form an alloy together with lithium; Mb indicates at least one kind of the metal elements and the semimetal elements other than lithium and Ma; Mc indicates at least one kind of the nonmetal elements; and Md indicates at least one kind of the metal elements and the semimetal elements other than Ma; s indicates a value of s>0; t indicates a value of t≥0; u indicates a value of u≥0; p indicates a value of p>0; q indicates a value of q>0; and r indicates a value of r≥0.

Among them, a simple substance, an alloy, or a compound of a metal element or a semimetal element of Group 4B in a short period type periodic table is preferable. Silicon Si, tin Sn, or an alloy or a compound of them is particularly preferable. They may be either crystalline or amorphous.

Besides them, an inorganic compound such as $MnO_2$, $V_2O_5$, $V_6O_{13}$, NiS, MoS, or the like which does not contain lithium Li can be also used.

[Electrolytic Solution]

As an electrolytic solution, a non-aqueous electrolytic solution obtained by dissolving an electrolytic salt into a non-aqueous solvent can be used. As a non-aqueous solvent, it is preferable to contain at least one of, for example, ethylene carbonate and propylene carbonate. This is because the cycle characteristics can be improved. Particularly, if ethylene carbonate and propylene carbonate are mixed and contained, it is preferable because the cycle characteristics can be further improved. As a non-aqueous solvent, it is preferable to contain at least one kind selected from chain-like carbonic esters such as diethyl carbonate, dimethyl carbonate, ethylmethyl carbonate, methylpropyl carbonate, and the like. This is because the cycle characteristics can be further improved.

Further, as a non-aqueous solvent, it is preferable to contain at least one of 2,4-difluoroanisole and vinylene carbonate. This is because in the case of 2,4-difluoroanisole, the discharge capacitance can be improved and in the case of vinylene carbonate, the cycle characteristics can be further improved. Particularly, if they are mixed and contained, it is more preferable because both of the discharge capacitance and the cycle characteristics can be improved.

As a non-aqueous solvent, it is also possible to contain one, two, or more kinds of the following materials: butylene carbonate; γ-butyrolactone; Y-valerolactone; a compound in which a part or all of a hydrogen radical of those compounds has been replaced by a fluorine radical; 1,2-dimethoxy ethane; tetrahydrofuran; 2-methyl tetrahydrofuran; 1,3-dioxorane; 4-methyl-1,3-dioxorane; methyl acetate; methyl propionate; acetonitrile; glutaronitrile; adiponitrile; methoxy acetonitrile; 3-methoxy propylonitrile; N,N-dimethyl formamide; N-methylpyrrolidinone; N-methyl oxazolidinone; N,N-dimethyl imidazolidinone; nitromethane; nitroethane; sulfolan; dimethyl sulfoxide; trimethyl phosphate; and the like.

In dependence on the kind of electrode which is combined, there is also a case where by using the compound in which a part or all of hydrogen atoms of a substance contained in the above non-aqueous solvent group has been replaced by fluorine atoms, the reversibility of the electrode reaction is improved. Therefore, those substances can be also properly used.

As a lithium salt as an electrolytic salt, for example, it is proper to use $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, $LiBF_{2(ox)}$, LiBOB, or LiBr. One, two, or more kinds of them can be also mixed and used. Among them, $LiPF_6$ is preferable because the high ion conductivity can be obtained and the cycle characteristics can be improved.

[Separator]

A separator material which can be used in the first embodiment is described below. As a separator material, materials used in the battery in the related art can be used. Among them, it is particularly preferable to use a microporous film made of polyolefin which has an excellent short-circuit preventing effect and can improve the safety of the battery owing to a shut-down effect. For example, a microporous membrane made of polyethylene or polypropylene resin is preferable.

Further, as a separator material, it is more preferable to use a microporous film obtained by laminating or mixing polyethylene whose shut-down temperature is lower and polypropylene having excellent oxidation resistance from a viewpoint that both of shut-down performance and floating characteristics can be satisfied.

(1-2) Manufacturing Method of Non-Aqueous Electrolyte Secondary Battery

A manufacturing method of the non-aqueous electrolyte secondary battery is described below. A cylindrical non-aqueous electrolyte secondary battery is mentioned as an example and the manufacturing method of the non-aqueous electrolyte secondary battery is described below.

The cathode 2 is manufactured as follows. First, for example, by mixing the cathode active material, conductive material, and binder, the cathode mixture is adjusted. The cathode mixture is dispersed into the solvent such as N-methyl-2-pyrrolidone NMP or the like, thereby forming the cathode mixture slurry.

Subsequently, the cathode collector 2A is coated with the cathode mixture slurry, the solvent is dried, thereafter, the obtained collector is compression-molded by a roll pressing machine or the like, and the cathode mixture layer 2B is formed, thereby manufacturing the cathode 2.

The anode 3 is manufactured as follows. First, for example, by mixing the anode active material and binder, the anode mixture is adjusted. The anode mixture is dispersed into the solvent such as N-methyl-2-pyrrolidone NMP or the like, thereby forming the anode mixture slurry.

Subsequently, the anode collector 3A is coated with the anode mixture slurry, the solvent is dried, thereafter, the obtained collector is compression-molded by the roll pressing machine or the like, and the anode mixture layer 3B is formed, thereby manufacturing the anode 3.

The anode mixture layer 3B may be formed by, for example, a vapor phase method, a liquid phase method, or a baking method. Two or more kinds of them can be also combined. As a vapor phase method, for example, a physical depositing method or a chemical depositing method can be used. Specifically speaking, it is possible to use a vacuum evaporation depositing method, a sputtering method, an ion plating method, a laser ablation method, a thermal CVD (Chemical Vapor Deposition) method, a plasma CVD method, or the like. As a liquid phase method, a well-known method such as electroplating, an electroless plating, or the like can be used. As a baking method, a well-known method can be also used. For example, an atmosphere baking method, a reaction baking method, or a hot press baking method can be used.

Subsequently, the cathode lead 13 is attached to the cathode collector 2A by welding or the like and the anode lead 14 is attached to the anode collector 3A by welding or the like. Thereafter, the cathode 2 and the anode 3 are wound through the separator 4, a front end portion of the cathode lead 13 is welded to the relief valve mechanism 8, a front end portion of the anode lead 14 is welded to the battery can 1, and the wound cathode 2 and anode 3 are sandwiched by the pair of insulating plates 5 and 6 and enclosed in the battery can 1.

Subsequently, the electrolytic solution is injected into the battery can 1 and impregnated into the separator 4. Thereafter, the battery cap 7, relief valve mechanism 8, and PTC element 9 are caulked and fixed to the open end portion of the battery can 1 through the gasket 10. Thus, the non-aqueous electrolyte secondary battery is manufactured.

Figure 3:
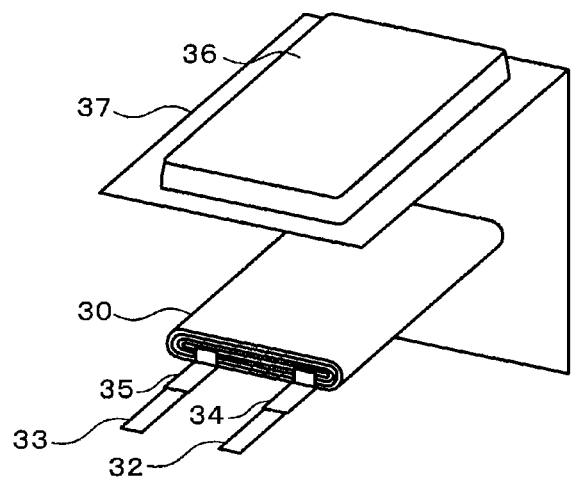
FIG. 3 is a schematic diagram of a second example of the non-aqueous electrolyte secondary battery using the cathode active material according to the embodiment.

(2) Second Example of Non-Aqueous Electrolyte Secondary Battery (2-1) Construction of Non-Aqueous Electrolyte Secondary Battery FIG. 3 shows a structure of a non-aqueous electrolyte secondary battery using the cathode active material according to the first embodiment. As shown in FIG. 3, this non-aqueous electrolyte secondary battery is formed in such a manner that a battery element 30 is enclosed into a sheathing member 37 made of a moisture-proof laminate film and a circumference of the battery element 30 is meld-bonded, thereby sealing the battery. A cathode lead 32 and an anode lead 33 are provided for the battery element 30. Those leads are sandwiched between the sheathing members 37 and are led out to the outside. Both surfaces of the cathode lead 32 are coated with resin members 34 and both surfaces of the anode lead 33 are coated with resin members 35 in order to improve adhesion with the sheathing members 37, respectively.

[Sheathing Member]

The sheathing member 37 has a laminate structure obtained by sequentially laminating, for example, an adhesive layer, a metal layer, and a surface protecting layer. The adhesive layer is made of a high molecular film. As a material constructing the high molecular film, for example, polypropylene PP, polyethylene PE, casted polypropylene (non-oriented polypropylene) CPP, linear low-density polyethylene LLDPE, low-density polyethylene LDPE, or the like can be mentioned. The metal layer is made of a metal foil. As a material constructing the metal foil, for example, aluminum Al or the like can be mentioned. As a material constructing the metal foil, a metal other than aluminum Al can be also used. As a material constructing the surface protecting layer, for example, nylon Ny, polyethylene terephthalate PET, or the like can be mentioned. The surface of the adhesive layer side becomes an enclosing surface of the side where the battery element 30 is enclosed.

[Battery Element]

Figure 4:
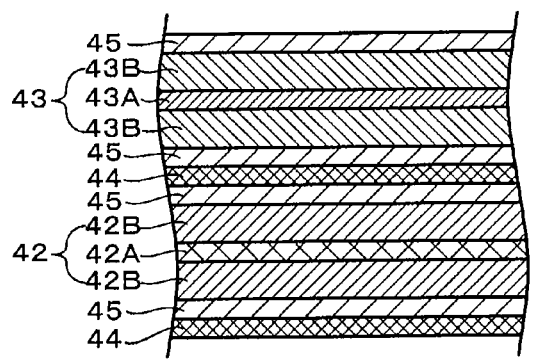
FIG. 4 is a partial enlarged cross sectional view of a battery element shown in FIG. 3.

For example, as shown in FIG. 4, the battery element 30 is a winding type battery element 30 constructed in such a manner that a belt-shaped anode 43 provided with gel electrolyte layers 45 on both sides, a separator 44, a belt-shaped cathode 42 provided with the gel electrolyte layers 45 on both sides, and the separator 44 are laminated and wound in the longitudinal direction.

The cathode 42 is constructed by a belt-shaped cathode collector 42A and cathode mixture layers 42B formed on both surfaces of the cathode collector 42A.

The cathode lead 32 connected by, for example, spot welding or ultrasonic welding is provided for one end portion in the longitudinal direction of the cathode 42. As a material of the cathode lead 32, for example, a metal such as aluminum or the like can be used.

The anode 43 is constructed by a belt-shaped anode collector 43A and anode mixture layers 43B formed on both surfaces of the anode collector 43A.

The anode lead 33 connected by, for example, the spot welding or ultrasonic welding is also provided for one end portion in the longitudinal direction of the anode 43 in a manner similar to the cathode 42. As a material of the anode lead 33, for example, copper Cu, nickel Ni, or the like can be used.

The cathode collector 42A, cathode mixture layers 42B, anode collector 43A, and anode mixture layers 43B are similar to those in the foregoing first example.

The gel electrolyte layer 45 contains an electrolytic solution and a high molecular compound serving as a holding member to hold the electrolytic solution and is in what is called a gel state. The gel electrolyte layer 45 is preferable because the high ion conductivity can be obtained and a leakage of a solution in the battery can be prevented. A construction of the electrolytic solution (that is, a liquid solvent and electrolytic salt) is similar to that in the first example.

As a high molecular compound, for example, there can be mentioned: polyacrylonitrile; polyvinylidene fluoride; copolymer of vinylidene fluoride and hexafluoro propylene; polytetrafluoro ethylene; polyhexafluoro propylene; polyethylene oxide; polypropylene oxide; polyphosphazene; polysiloxane; polyvinyl acetate; polyvinyl alcohol; polymethyl methacrylate; polyacrylic acid; polymethacrylate; styrene-butadiene rubber; nitrile-butadiene rubber; polystyrene; or polycarbonate. Particularly, from a viewpoint of electrochemical stability, polyacrylonitrile, polyvinylidene fluoride, polyhexafluoro propylene, or polyethylene oxide is preferable.

(2-2) Manufacturing Method of Non-Aqueous Electrolyte Secondary Battery

A manufacturing method of the non-aqueous electrolyte secondary battery using the cathode active material according to the first embodiment is described below. First, each of the cathode 42 and the anode 43 is coated with a presolution containing a solvent, electrolytic salt, a high molecular compound and a mixed solvent, and the mixed solvent is volatilized, thereby forming the gel electrolyte layer 45. The cathode lead 32 is preliminarily attached to an end portion of the cathode collector 42A by welding. The anode lead 33 is also preliminarily attached to an end portion of the anode collector 43A by welding.

Subsequently, the cathode 42 and anode 43 on each of which the gel electrolyte layer 45 has been formed are laminated through the separator 44, thereby obtaining a laminate. After that, this laminate is wound in its longitudinal direction, thereby forming the winding type battery element 30.

Then, a concave portion 36 is formed by deep-drawing the sheathing member 37 made of a laminate film. The battery element 30 is inserted into the concave portion 36. An unprocessed portion of the sheathing member 37 is folded to an upper portion of the concave portion 36 and an outer peripheral portion of the concave portion 36 is thermally melt-bonded, thereby sealing. In this manner, the non-aqueous electrolyte secondary battery is manufactured.

Second Embodiment

A cathode active material according to the second embodiment is constructed in such a manner that a coating layer made of an oxide containing lithium Li and a coating element of at least one of nickel Ni and manganese Mn is provided in at least a part of a composite oxide particle and a surface layer containing tin Sn is provided in at least a part of the coating layer.

First, the reason why the cathode active material includes the above construction will be described. Although the cathode active material constructed mainly by a lithium cobalt acid $LiCoO_2$ can realize the high charge voltage performance and the high energy density performance associated therewith, if the charge/discharge cycles at a high capacitance are repeated at the high charge voltage, the capacitance decreases largely. Since a cause for it depends on the surface of the cathode active material particle, necessity of a surface process of the cathode active material is pointed out.

Therefore, although various surface processes have been proposed, from a viewpoint of eliminating the decrease in capacitance per volume or weight or minimizing the decrease in capacitance, by executing the surface process by a material which can suppress the decrease in capacitance or contribute to the capacitance, the cathode active material in which the high charge voltage performance and the high energy density performance associated therewith can be realized and which is excellent in the charge/discharge cycle characteristics at the high charge voltage can be obtained.

By providing a coating layer made of an oxide containing lithium Li and a coating element of at least one of nickel Ni and manganese Mn for the cathode active material constructed mainly by the lithium cobalt acid $LiCoO_2$, the cathode active material which has the high charge voltage performance and the high energy density performance associated therewith and is excellent in the charge/discharge cycle characteristics at the high capacitance under the high charge voltage condition can be obtained although it is slightly poor in the high charge voltage performance and the high energy density performance associated therewith.

As a method of providing the coating layer for the composite oxide particle, the following methods can be proposed: a method whereby a compound of lithium Li and a compound of nickel Ni and/or a compound of manganese Mn are mixed in a dry manner as micro-pulverized particles with the composite oxide particle, the particle is coated and baked, and the coating layer made of the oxide containing lithium Li and the coating element of at least one of nickel Ni and manganese Mn is formed on the surface of the composite oxide particle; and a method whereby the compound of lithium Li and the compound of nickel Ni and/or the compound of manganese Mn are dissolved or mixed into a solvent, the particle is coated and baked in a wet manner and the coating layer made of the oxide containing lithium Li and the coating element of at least one of nickel Ni and manganese Mn is formed on the surface of the composite oxide particle. However, according to those methods, such a result that it is difficult to accomplish the coating of high uniformity is obtained.

By coating the surface of the particle with nickel Ni and/or manganese Mn as a hydroxide, heat-dehydrating it, and forming the coating layer, the coating of high uniformity can be realized. According to such a coating process, the compound of nickel Ni and/or the compound of manganese Mn is dissolved into a solvent system constructed mainly by the water.

Thereafter, the composite oxide particle is dispersed into the solvent system. A basicity of a dispersing system is raised By adding a base to such a dispersing system or by another method. The hydroxide containing nickel Ni and/or manganese Mn is precipitated to the surface of the composite oxide particle.

The uniformity of the coating onto the composite oxide particle can be further improved by executing the coating process in the solvent system constructed mainly by the water whose pH is equal to 12 or more. In other words, the metal composite oxide particle is preliminarily dispersed into the solvent system constructed mainly by the water whose pH is equal to 12 or more. The compound of nickel Ni and/or the compound of manganese Mn is added to the solvent system. The surface of the metal composite oxide particle is coated with the hydroxide containing nickel Ni and/or manganese Mn.

The composite oxide particle coated with the hydroxide containing nickel Ni and/or manganese Mn by the coating process is heat-dehydrated, thereby forming the coating layer onto the surface of the composite oxide particle. Thus, the uniformity of the coating onto the surface of the composite oxide particle can be improved.

In the steps of coating the surface of the composite oxide particle with the hydroxide containing nickel Ni and/or manganese Mn and cleaning, dehydrating, and drying the composite oxide particle in order to bake it, the particles are bound through the hydroxide containing nickel Ni and/or manganese Mn on the surface. If the particles are broken, a peel-off of an interference of the hydroxide containing nickel Ni and/or manganese Mn whose adhesion is relatively weak and the composite oxide particle occurs or a cohesive failure of the hydroxide containing nickel Ni and/or manganese Mn whose cohesion is weak occurs. In association with it, the improvement of the characteristics of the cathode active material is deteriorated due to the creation of the coating layer.

If the baking in which lithium Li has been added is progressed while keeping the binding of the particles as it is or in the state where the particles having the hydroxide containing nickel Ni and/or manganese Mn are come into contact with the surface, there is such a tendency that the sintering between the particles is liable to be progressed.

If the sintering between the particles is progressed, there is a problem as will be described hereinbelow. Upon creation of the cathode, it is necessary to increase an amount of mechanical energy which is applied in the breakage of the particles that is performed to uniformly mix the composite oxide particle with the binder and the carbon particle serving as a conductive material. In association with it, the cathode active material formed by the composite oxide particles having the coating layer is damaged or broken, so that a total defect amount as powder increases.

The damage or breakdown occurs in a form of a disconnection of a coupling portion of the sintered particles, a creation of a crack in the particle, a crushing of the particle itself, a peel-off of the coating layer, or the like. Particularly, in the composite oxide particle having the coating layer, as compared with the particle of the cathode active material or the like constructed mainly by the lithium cobalt acid $LiCoO_2$, there is such a tendency that the surface shape of the particle is not smooth and it has the coarse surface. Therefore, when the particle receives an external force, it is considered that a slip between the particles is not smooth, the external force is easily concentrated on a local position, and the cathode active material is easily damaged or broken.

Thus, the surface to which the coating layer is not provided is exposed. That is, the surface which does not contribute to the improvement of the charge/discharge cycle characteristics and to which the coating layer is not provided and the active new surface are exposed. Therefore, the charge/discharge cycle characteristics of the high capacitance under the high charge voltage condition deteriorate. As is well known, the exposed surface is active and has a high surface energy. Thus, a decomposition reaction of the electrolytic solution and the activity of the elution of the surface are extremely higher than those of the surface formed by the ordinary baking.

The surface of the composite oxide particle coated with the hydroxide containing nickel Ni and/or manganese Mn is further coated with a stannic acid, thereby enabling the progress of the sintering to be improved. The damage or breakdown of the particle can be decreased in association with it. The composite oxide particle, coating layer, and surface layer described below.

[Composite Oxide]

The composite oxide particle contains at least lithium Li and cobalt Co and it is preferable that its mean compositions are expressed by, for example, Formula 1. By using such a composite oxide particle, the high capacitance and high discharge electric potential can be obtained.

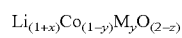
$$Li_{(1+x)}Co_{(1-y)}M_yO_{(2-z)} \qquad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.10$; y indicates a value within a range of $0 \leq y \leq 0.50$; and z indicates a value within a range of $-0.10 \leq z \leq 0.20$.

In Formula 1, the range of x is, for example, $-0.10 \leq x \leq 0.10$, preferably, $-0.08 \leq x \leq 0.08$, and more preferably, $-0.06 \leq x \leq 0.06$. If x decreases to a value under such a range, the discharge capacitance decreases. If x increases to a value over such a range, the elements are diffused out of the particle, become an obstacle to control of basicity in a next processing step, and finally, become a cause of obstructing the promotion of a gel creation during the kneading of a cathode paste.

The range of y is, for example, $0 \leq y \leq 0.50$, preferably, $0 \leq y \leq 0.40$, and more preferably, $0 \leq y \leq 0.30$. If y increases to a value over such a range, the high charge voltage performance held by $LiCoO_2$ and the high energy density performance associated therewith are deteriorated.

The range of z is, for example, $-0.10 \leq z \leq 0.20$, preferably, $-0.08 \leq z \leq 0.18$, and more preferably, $-0.06 \leq z \leq 0.16$. If z decreases to a value under such a range and if z increases to a value over such a range, there is such a tendency that the discharge capacitance decreases.

As for the composite oxide particle, a material which can be ordinarily obtained as a cathode active material can be used as a starting raw material. However, according to circumstances, after a secondary particle was broken by using a ball mill, a grinding machine, or the like, it can be used.

[Coating Layer]

A coating layer is provided in at least a part of the composite oxide particle and includes an oxide containing lithium Li and a coating element of at least one of nickel Ni and manganese Mn. By providing the coating layer, the high charge voltage performance and the high energy density performance associated therewith can be realized and the charge/discharge cycle characteristics at the high capacitance under the high charge voltage condition can be improved.

It is preferable that a construction ratio of nickel Ni and manganese Mn in the coating layer ranges from 100:0 to 30:70 as a mole ratio. It is more preferable that it ranges from 100:0 to 40:60. This is because if an amount of manganese Mn increases to a value over such a range, doping performance of lithium Li deteriorates and, finally, it becomes a factor of a decrease in capacitance of the cathode active material and an increase in electric resistance when such a material is used for a battery. The range of the construction ratio of nickel Ni and manganese Mn is a range showing a larger validity adapted to suppress the progress of sintering between the particles in the baking of a precursor added with lithium Li.

Nickel Ni and manganese Mn in the oxide of the coating layer can be replaced by a metal element (metal elements) of at least one or more kinds selected from a group containing magnesium Mg, aluminum Al, boron B, titanium, vanadium V, chromium Cr, iron Fe, cobalt Co, copper Cu, zinc Zn, tin Sn, and tungsten W.

Thus, stability of the cathode active material can be improved and diffusibility of lithium ions can be improved. A replacement amount of the selected metal element is, for example, equal to or less than 40 mol % of a total amount of nickel Ni and manganese Mn in the oxide of the coating layer, preferably, 30 mol % or less and, more preferably, 20 mol % or less. This is because if the replacement amount of the selected metal element increases to a value over such a range, the doping performance of lithium Li deteriorates and the capacitance of the cathode active material decreases.

An amount of coating layer lies, for example, within a range from 0.5 weight % to 50 weight % of the composite oxide particle, preferably, a range from 1.0 weight % to 40 weight %, more preferably, a range from 2.0 weight % to 35 weight %. This is because if the coating weight of the metal oxide increases to a value over such a range, the capacitance of the cathode active material decreases. This is also because if the coating weight of the metal oxide decreases to a value under such a range, the stability of the cathode active material deteriorates.

[Surface Layer]

The surface layer is provided in at least a part of the coating layer and contains tin Sn.

A mean diameter of the particle in the cathode active material preferably ranges from 2.0 µm to 50 µm. This is because if the mean diameter is less than 2.0 µm, when the cathode active material is pressed upon manufacturing of the cathode, it is peeled off and a surface area of the active material increases, so that it is necessary to increase addition amounts of a conductive material and a binder, and there is such a tendency that an energy density per unit weight decreases. This is also because if the mean diameter exceeds 50 µm, the particle pierces a separator and there is such a tendency that a short-circuit is caused.

[Manufacturing Method of Cathode Active Material]

Subsequently, a manufacturing method of the cathode active material according to the second embodiment is described below. The manufacturing method of the cathode active material according to the second embodiment can be roughly classified into: a first step of forming a layer made of a hydroxide containing nickel Ni and/or manganese Mn into at least a part of the composite oxide particle and, thereafter, coating at least a part of the composite oxide particle with a stannic acid; and a second step of executing a heating process after coating with the stannic acid, thereby forming a coating layer made of an oxide containing lithium Li and a coating element of at least one of nickel Ni and manganese Mn and a surface layer containing tin Sn into at least a part of the composite oxide particle.

(First Step)

In the first step, a coating process of the hydroxide containing nickel Ni and/or manganese Mn and the stannic acid is executed. In the first step, for example, first, the composite oxide particle is dispersed into a solvent system constructed mainly by the water in which a compound of nickel Ni and/or a compound of manganese Mn have been dissolved, a basicity of the dispersing system is raised by adding a base into the dispersing system, or the like, and the hydroxide containing nickel Ni and/or manganese Mn is precipitated to the surface of the composite oxide particle. It is also possible to use a method whereby the composite oxide particle is dispersed into the solvent constructed mainly by basic water, subsequently, the compound of nickel Ni and/or the compound of manganese Mn is added to the aqueous solution, and the hydroxide containing nickel Ni and/or manganese Mn is precipitated.

As for a raw material of the coating process of the hydroxide containing nickel Ni, as a nickel compound, for example, it is possible to use: an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate, nickel thiocyanate, or the like; or an organic compound such as nickel oxalate, nickel acetate, or the like. One, two, or more kinds of them may be used.

As for a raw material of the coating process of the hydroxide containing manganese Mn, as a manganese compound, for example, it is possible to use: an inorganic compound such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrogensulfide, manganese sulfate, manganese hydrogensulfate, manganese thiocyanate, manganese nitrite, manganese phosphate, manganese dihydrogenphosphate, manganese hydrogencarbonate, or the like; or an organic compound such as manganese oxalate, manganese acetate, or the like. One, two, or more kinds of them may be used.

A value of pH of the solvent system constructed mainly by the water mentioned above is, for example, equal to 12 or more, preferably, 13 or more, and more preferably, 14 or more. The larger the value of pH of the solvent system constructed mainly by the water mentioned above is, the better the uniformity of the coating of the hydroxide containing nickel Ni and/or manganese Mn is and a reaction precision is also high. There are such advantages that the productivity is improved owing to the reduction in processing time and the quality is improved. The pH of the solvent system constructed mainly by the water is determined in consideration of the costs of alkali which is used, or the like.

A temperature of the process dispersing system is, for example, equal to 40° C. or more, preferably, 60° C. or more, and more preferably, 80° C. or more. The larger the value of the temperature of the process dispersing system is, the better the uniformity of the coating of the hydroxide containing nickel Ni and/or manganese Mn is and a reaction speed is also high. There are such advantages that the productivity is improved owing to the reduction in processing time and the quality is improved. The value of the temperature of the process dispersing system is determined in consideration of the costs of the apparatus and the productivity. However, it is also possible to recommend to execute the processes at 100° C. or more by using an autoclave from a viewpoint of the improvement of the productivity due to the reduction in processing time owing to the improvement of the coating uniformity and the improvement of the reaction speed.

Further, the pH of the solvent system constructed mainly by the water can be accomplished by dissolving alkali into the solvent system constructed mainly by the water. As alkali, for example, lithium hydroxide, sodium hydroxide, potassium hydroxide, and their mixture can be mentioned. Although the solvent system can be embodied by properly using those alkali, it is excellent to use lithium hydroxide from viewpoints of purity and performance of the cathode active material according to the second embodiment which is finally obtained. This is because if lithium hydroxide is used, the following advantages are obtained. When the composite oxide particle formed with the hydroxide containing nickel Ni and/or manganese Mn is taken out of the solvent system constructed mainly by the water, by controlling a deposition amount of the dispersing medium made of the solvent constructed mainly by the water, an amount of lithium of the cathode active material according to the second embodiment which is finally obtained can be controlled.

Subsequently, at least a part of the composite oxide particle formed with a layer made of the hydroxide containing nickel Ni and/or manganese Mn is coated with a stannic acid. It is effective to execute the coating process of the stannic acid in the state where the composite oxide particle formed with a layer made of the hydroxide containing nickel Ni and/or manganese Mn has been suspended into the solvent system constructed mainly by the water in which the hydroxide containing nickel Ni and/or manganese Mn had been coating-processed. Thus, at a stage of dehydrating and drying the composite oxide particle formed with the layer made of the hydroxide containing nickel Ni and/or manganese Mn, such a situation that the particles are bound through the hydroxide containing nickel Ni and/or manganese Mn on the surface can be suppressed.

It is preferably effective to execute the coating process of the stannic acid at a cleaning stage after the coating process of the hydroxide containing nickel Ni and/or manganese Mn. Thus, a leakage of the stannic acid added to the suspending system can be prevented and adsorption can be improved. Further, by executing the coating process of the stannic acid, a particle cohesion promoting effect which is not accompanied with the binding of the particles can be obtained in the suspending system. The cleaning operation and the collecting operation of the particles from the dispersing medium can be easily executed.

As a raw material of a stannate compound which can be used for the coating process, for example, calcium stannate, magnesium stannate, potassium stannate, or sodium stannate, or tin fluoride, tin bromide, tin iodide, tin sulfate, or the like which can form stannate ions in an aqueous solution can be also mentioned. One, two, or more kinds of them may be used.

A coating weight of the stannic acid ranges, for example, from 0.00001 weight % to 1.0 weight % for a weight of the composite oxide particle, preferably, it ranges from 0.0001 weight % to 0.1 weight %. If the coating weight of the stannic acid increases to a value over such a range, the capacitance of the cathode active material decreases. If the coating weight of the stannic acid decreases to a value under such a range, the stability of the cathode active material deteriorates.

(Second Step)

In the second step, the composite oxide particle which has been coating-processed in the first step is separated from the solvent system constructed mainly by the water and, thereafter, heating-processed, thereby dehydrating the hydroxide. A coating layer made of an oxide containing lithium Li and a coating element of at least one of nickel Ni and manganese Mn and a surface layer containing tin Sn are formed on the surface of the composite oxide particle. It is preferable that the heating process is executed in an oxidation atmosphere such as air, pure oxygen, or the like at temperatures of, for example, about 300° C. to 1000° C. In this instance, since the hydroxide containing nickel Ni and/or manganese Mn has been coated with the stannic acid, the sintering between the particles is suppressed and the binding of the particles is suppressed.

After the composite oxide particle which has been coating-processed in the first step was separated from the solvent system, if necessary, in order to adjust the lithium amount, it is also possible to impregnate an aqueous solution of the lithium compound into the composite oxide particle and, thereafter, execute the heating process.

As a lithium compound, for example, it is possible to use: an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate, lithium hydrogencarbonate, or the like; or an organic compound such as methyllithium, vinyllithium, isopropyl lithium, butyllithium, phenyllithium, lithium oxalate, lithium acetate, or the like.

After the baking, a particle size can be also adjusted as necessary by light pulverization, the classifying operation, or the like.

A non-aqueous electrolyte secondary battery using the cathode active material according to the second embodiment of the invention as mentioned above is similar to that in the foregoing first embodiment.

Third Embodiment

A cathode active material according to the third embodiment is constructed in such a manner that a coating layer made of an oxide containing lithium Li and a coating element of at least one of nickel Ni and manganese Mn is provided in at least a part of a composite oxide particle and a surface layer containing phosphorus P is provided in at least a part of the coating layer.

First, the reason why the cathode active material includes the above construction is described below. Although the cathode active material constructed mainly by a lithium cobalt acid $LiCoO_2$ can realize the high charge voltage performance and the high energy density performance associated therewith, if the charge/discharge cycles at a high capacitance are repeated at the high charge voltage, the capacitance decreases largely. Since a cause for it depends on the surface of the cathode active material particle, necessity of a surface process of the cathode active material is pointed out.

Therefore, although various surface processes have been proposed, from a viewpoint of eliminating the decrease in capacitance per volume or weight or minimizing the decrease in capacitance, by executing the surface process by a material which can suppress the decrease in capacitance or contribute to the capacitance, the cathode active material in which the high charge voltage performance and the high energy density performance associated therewith can be realized and which is excellent in the charge/discharge cycle characteristics at the high charge voltage can be obtained.

By providing a coating layer made of an oxide containing lithium Li and a coating element of at least one of nickel Ni and manganese Mn for the cathode active material constructed mainly by the lithium cobalt acid LiCoO₂, the cathode active material which has the high charge voltage performance and the high energy density performance associated therewith and is excellent in the charge/discharge cycle characteristics at the high capacitance under the high charge voltage condition can be obtained although it is slightly poor in the high charge voltage performance and the high energy density performance associated therewith.

As a method of providing the coating layer for the composite oxide particle, the following methods can be proposed: a method whereby a compound of lithium Li and a compound of nickel Ni and/or a compound of manganese Mn are mixed in a dry manner as micro-pulverized particles with the composite oxide particle, the particle is coated and baked, and the coating layer made of the oxide containing lithium Li and the coating element of at least one of nickel Ni and manganese Mn is formed on the surface of the composite oxide particle; and a method whereby the compound of lithium Li and the compound of nickel Ni and/or the compound of manganese Mn are dissolved or mixed into a solvent, the particle is coated and baked in a wet manner and the coating layer made of the oxide containing lithium Li and the coating element of at least one of nickel Ni and manganese Mn is formed on the surface of the composite oxide particle. However, according to those methods, such a result that it is difficult to accomplish the coating of high uniformity is obtained.

By coating the surface of the particle with nickel Ni and/or manganese Mn as a hydroxide, heat-dehydrating it, and forming the coating layer, the coating of high uniformity can be realized. According to such a coating process, the compound of nickel Ni and/or the compound of manganese Mn is dissolved into a solvent system constructed mainly by the water. Thereafter, the composite oxide particle is dispersed into the solvent system. A basicity of a dispersing system is raised By adding a base to such a dispersing system or by another method. The hydroxide containing nickel Ni and/or manganese Mn is precipitated to the surface of the composite oxide particle.

The uniformity of the coating onto the composite oxide particle can be further improved by executing the coating process in the solvent system constructed mainly by the water whose pH is equal to 12 or more. In other words, the metal composite oxide particle is preliminarily dispersed into the solvent system constructed mainly by the water whose pH is equal to 12 or more. The compound of nickel Ni and/or the compound of manganese Mn is added to the solvent system. The surface of the metal composite oxide particle is coated with the hydroxide containing nickel Ni and/or manganese Mn.

The composite oxide particle coated with the hydroxide containing nickel Ni and/or manganese Mn by the coating process is heat-dehydrated, thereby forming the coating layer onto the surface of the composite oxide particle. Thus, the uniformity of the coating onto the surface of the composite oxide particle can be improved.

In the steps of coating the surface of the composite oxide particle with the hydroxide containing nickel Ni and/or manganese Mn and cleaning, dehydrating, and drying the composite oxide particle in order to bake it, the particles are bound through the hydroxide containing nickel Ni and/or manganese Mn on the surface. If the particles are broken, a peel-off of an interference of the hydroxide containing nickel Ni and/or manganese Mn whose adhesion is relatively weak and the composite oxide particle occurs or a cohesive failure of the hydroxide containing nickel Ni and/or manganese Mn whose cohesion is weak occurs. In association with it, the improvement of the characteristics of the cathode active material is deteriorated due to the creation of the coating layer.

If the baking in which lithium Li has been added is progressed while keeping the binding of the particles as it is or in the state where the particles having the hydroxide containing nickel Ni and/or manganese Mn are come into contact with the surface, there is such a tendency that the sintering between the particles is liable to be progressed.

If the sintering between the particles is progressed, there is a problem as will be described hereinbelow. Upon creation of the cathode, it is necessary to increase an amount of mechanical energy which is applied in the breakage of the particles that is performed to uniformly mix the composite oxide particle with the binder and the carbon particle serving as a conductive material. In association with it, the cathode active material formed by the composite oxide particles having the coating layer is damaged or broken, so that a total defect amount as powder increases.

The damage or breakdown occurs in a form of a disconnection of a coupling portion of the sintered particles, a creation of a crack in the particle, a crushing of the particle itself, a peel-off of the coating layer, or the like. Particularly, in the composite oxide particle having the coating layer, as compared with the particle of the cathode active material or the like constructed mainly by the lithium cobalt acid LiCoO₂, there is such a tendency that the surface shape of the particle is not smooth and it has the coarse surface. Therefore, when the particle receives an external force, it is considered that a slip between the particles is not smooth, the external force is easily concentrated on a local position, and the cathode active material is easily damaged or broken.

Thus, the surface to which the coating layer is not provided is exposed. That is, the surface which does not contribute to the improvement of the charge/discharge cycle characteristics and to which the coating layer is not provided and the active new surface are exposed. Therefore, the charge/discharge cycle characteristics of the high capacitance under the high charge voltage condition deteriorate. As is well known, the exposed surface is active and has a high surface energy. Thus, a decomposition reaction of the electrolytic solution and the activity of the elution of the surface are extremely higher than those of the surface formed by the ordinary baking.

For the purpose of improving the deterioration of the function of the cathode based on the sintering between the particles and improving a manufacturing process. The following points have been determined. The surface of the composite oxide particle coated with the hydroxide containing nickel Ni and/or manganese Mn is further coated with a phosphoric acid, thereby enabling the progress of the sintering to be improved. The damage or breakdown of the particle can be decreased in association with it. The composite oxide particle, coating layer, and surface layer is described below.

[Composite Oxide]

The composite oxide particle contains at least lithium Li and cobalt Co and it is preferable that its mean compositions are expressed by, for example, Formula 1. By using such a composite oxide particle, the high capacitance and high discharge electric potential can be obtained.

$$Li_{(1+x)}Co_{(1-y)}M_yO_{(2-z)}$$ (Formula 1)

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of −0.10≤x≤0.10; y indicates a value within a range of 0≤y≤0.50; and z indicates a value within a range of −0.10≤z≤0.20.

In Formula 1, the range of x is, for example, −0.10≤x≤0.10, preferably, −0.08≤x≤0.08, and more preferably, −0.06≤x≤0.06. If x decreases to a value under such a range, the discharge capacitance decreases. If x increases to a value over such a range, the elements are diffused out of the particle, become an obstacle to control of basicity in a next processing step, and finally, become a cause of obstructing the promotion of a gel creation during the kneading of a cathode paste.

The range of y is, for example, 0≤y≤0.50, preferably, 0≤y≤0.40, and more preferably, 0≤y≤0.30. If y increases to a value over such a range, the high charge voltage performance held by $LiCoO_2$ and the high energy density performance associated therewith are deteriorated.

The range of z is, for example, −0.10≤z≤0.20, preferably, −0.08≤z≤0.18, and more preferably, −0.06≤z≤0.16. If z decreases to a value under such a range and if z increases to a value over such a range, there is such a tendency that the discharge capacitance decreases.

As for the composite oxide particle, a material which can be ordinarily obtained as a cathode active material can be used as a starting raw material. However, according to circumstances, after a secondary particle was broken by using a ball mill, a grinding machine, or the like, it can be used.

[Coating Layer]

A coating layer is provided in at least a part of the composite oxide particle and includes an oxide containing lithium Li and a coating element of at least one of nickel Ni and manganese Mn. By providing the coating layer, the high charge voltage performance and the high energy density performance associated therewith can be realized and the charge/discharge cycle characteristics at the high capacitance under the high charge voltage condition can be improved.

It is preferable that a construction ratio of nickel Ni and manganese Mn in the coating layer ranges from 100:0 to 30:70 as a mole ratio. It is more preferable that it ranges from 100:0 to 40:60. This is because if an amount of manganese Mn increases to a value over such a range, doping performance of lithium Li deteriorates and, finally, it becomes a factor of a decrease in capacitance of the cathode active material and an increase in electric resistance when such a material is used for a battery. The range of the construction ratio of nickel Ni and manganese Mn is a range showing a larger validity adapted to suppress the progress of sintering between the particles in the baking of a precursor added with lithium Li.

Nickel Ni and manganese Mn in the oxide of the coating layer can be replaced by a metal element (metal elements) of at least one or more kinds selected from a group containing magnesium Mg, aluminum Al, boron B, titanium, vanadium V, chromium Cr, iron Fe, cobalt Co, copper Cu, zinc Zn, tin Sn, and tungsten W.

Thus, stability of the cathode active material can be improved and diffusibility of lithium ions can be improved. A replacement amount of the selected metal element is, for example, equal to or less than 40 mol % of a total amount of nickel Ni and manganese Mn in the oxide of the coating layer, preferably, 30 mol % or less and, more preferably, 20 mol % or less. This is because if the replacement amount of the selected metal element increases to a value over such a range, the doping performance of lithium Li deteriorates and the capacitance of the cathode active material decreases.

An amount of coating layer lies, for example, within a range from 0.5 weight % to 50 weight % of the composite oxide particle, preferably, a range from 1.0 weight % to 40 weight %, more preferably, a range from 2.0 weight % to 35 weight %. This is because if the coating weight of the metal oxide increases to a value over such a range, the capacitance of the cathode active material decreases. This is also because if the coating weight of the metal oxide decreases to a value under such a range, the stability of the cathode active material deteriorates.

[Surface Layer]

The surface layer is provided in at least a part of the coating layer and contains phosphorus P.

A mean diameter of the particle in the cathode active material preferably ranges from 2.0 μm to 50 μm. This is because if the mean diameter is less than 2.0 μm, when the cathode active material is pressed upon manufacturing of the cathode, it is peeled off and a surface area of the active material increases, so that it is necessary to increase addition amounts of a conductive material and a binder, and there is such a tendency that an energy density per unit weight decreases. This is also because if the mean diameter exceeds 50 μm, the particle pierces a separator and there is such a tendency that a short-circuit is caused.

[Manufacturing Method of Cathode Active Material]

Subsequently, a manufacturing method of the cathode active material according to the third embodiment of the invention will be described. The manufacturing method of the cathode active material according to the third embodiment of the invention can be roughly classified into: a first step of forming a layer made of a hydroxide containing nickel Ni and/or manganese Mn into at least a part of the composite oxide particle and, thereafter, coating at least a part of the composite oxide particle with a phosphoric acid; and a second step of executing a heating process after coating with the silicic acid, thereby forming a coating layer made of an oxide containing lithium Li and a coating element of at least one of nickel Ni and manganese Mn and a surface layer containing phosphorus P into at least a part of the composite oxide particle.

(First Step)

In the first step, a coating process of the hydroxide containing nickel Ni and/or manganese Mn and the phosphoric acid is executed. In the first step, for example, first, the composite oxide particle is dispersed into a solvent system constructed mainly by the water in which a compound of nickel Ni and/or a compound of manganese Mn have been dissolved, a basicity of the dispersing system is raised by adding a base into the dispersing system, or the like, and the hydroxide containing nickel Ni and/or manganese Mn is precipitated to the surface of the composite oxide particle. It is also possible to use a method whereby the composite oxide particle is dispersed into the solvent constructed mainly by basic water, subsequently, the compound of nickel Ni and/or the compound of manganese Mn is added to the aqueous solution, and the hydroxide containing nickel Ni and/or manganese Mn is precipitated.

As for a raw material of the coating process of the hydroxide containing nickel Ni, as a nickel compound, for example, it is possible to use: an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate, nickel thiocyanate, or the like; or an organic compound such as nickel oxalate, nickel acetate, or the like. One, two, or more kinds of them may be used.

As for a raw material of the coating process of the hydroxide containing manganese Mn, as a manganese compound, for example, it is possible to use: an inorganic compound such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrogensulfide, manganese sulfate, manganese hydrogensulfate, manganese thiocyanate, manganese nitrite, manganese phosphate, manganese dihydrogenphosphate, manganese hydrogencarbonate, or the like; or an organic compound such as manganese oxalate, manganese acetate, or the like. One, two, or more kinds of them may be used.

A value of pH of the solvent system constructed mainly by the water mentioned above is, for example, equal to 12 or more, preferably, 13 or more, and more preferably, 14 or more. The larger the value of pH of the solvent system constructed mainly by the water mentioned above is, the better the uniformity of the coating of the hydroxide containing nickel Ni and/or manganese Mn is and a reaction precision is also high. There are such advantages that the productivity is improved owing to the reduction in processing time and the quality is improved. The pH of the solvent system constructed mainly by the water is determined in consideration of the costs of alkali which is used, or the like.

A temperature of the process dispersing system is, for example, equal to 40° C. or more, preferably, 60° C. or more, and more preferably, 80° C. or more. The larger the value of the temperature of the process dispersing system is, the better the uniformity of the coating of the hydroxide containing nickel Ni and/or manganese Mn is and a reaction speed is also high. Productivity is improved owing to the reduction in processing time and the quality is improved. The value of the temperature of the process dispersing system is determined in consideration of the costs of the apparatus and the productivity. However, it is also possible to recommend to execute the processes at 100° C. or more by using an autoclave from a viewpoint of the improvement of the productivity due to the reduction in processing time owing to the improvement of the coating uniformity and the improvement of the reaction speed.

Further, the pH of the solvent system constructed mainly by the water can be accomplished by dissolving alkali into the solvent system constructed mainly by the water. As alkali, for example, lithium hydroxide, sodium hydroxide, potassium hydroxide, and their mixture can be mentioned. Although the solvent system can be embodied by properly using those alkali, it is excellent to use lithium hydroxide from viewpoints of purity and performance of the cathode active material according to the third embodiment which is finally obtained. This is because if lithium hydroxide is used, the following effects are observed. When the composite oxide particle formed with the hydroxide containing nickel Ni and/or manganese Mn is taken out of the solvent system constructed mainly by the water, by controlling a deposition amount of the dispersing medium made of the solvent constructed mainly by the water, an amount of lithium of the cathode active material according to the third embodiment which is finally obtained can be controlled.

Subsequently, at least a part of the composite oxide particle formed with a layer made of the hydroxide containing nickel Ni and/or manganese Mn is coated with a phosphoric acid. It is effective to execute the coating process of the phosphoric acid in the state where the composite oxide particle formed with the layer made of the hydroxide containing nickel Ni and/or manganese Mn has been suspended into the solvent system constructed mainly by the water in which the hydroxide containing nickel Ni and/or manganese Mn had been coating-processed. Thus, at a stage of dehydrating and drying the composite oxide particle formed with the layer made of the hydroxide containing nickel Ni and/or manganese Mn, such a situation that the particles are bound through the hydroxide containing nickel Ni and/or manganese Mn on the surface can be suppressed.

It is preferably effective to execute the coating process of the phosphoric acid at a cleaning stage after the coating process of the hydroxide containing nickel Ni and/or manganese Mn. Thus, a leakage of the phosphoric acid added to the suspending system can be prevented and adsorption can be improved. Further, by executing the coating process of the phosphoric acid, a particle cohesion promoting effect which is not accompanied with the binding of the particles can be obtained in the suspending system. The cleaning operation and the collecting operation of the particles from the dispersing medium can be easily executed.

As a phosphoric acid which can be used for the coating process, it is assumed that the phosphoric acid, a phosphonic acid, or a phosphine acid is used as a basic material and their poly-acids are also incorporated in the concept of the phosphoric acid. As a raw material of the phosphate compound which can be used for the coating process, for example, the following materials can be mentioned: an acid such as orthophosphoric acid, hypophosphoric acid, metaphosphoric acid, diphosphoric acid (pyrophosphoric acid), metatriphosphoric acid, phosphonic acid, diphosphonic acid, phosphine acid, or the like; or a salt such as ammonium phosphate, ammonium phosphonic acid, calcium phosphate, calcium phosphonic acid, lithium phosphate, lithium phosphonic acid, magnesium phosphate, sodium phosphine acid, sodium phosphonic acid, sodium metaphosphate, potassium phosphate, potassium phosphonic acid, sodium pyrophosphate, calcium pyrophosphate, potassium pyrophosphate, sodium hexametaphosphate, potassium metaphosphate, or the like. One, two, or more kinds of them may be used.

A coating weight of the phosphoric acid ranges, for example, from 0.00001 weight % to 1.0 weight % for a weight of the composite oxide particle, preferably, it ranges from 0.0001 weight % to 0.1 weight %. If the coating weight of the phosphoric acid increases to a value over such a range, the capacitance of the cathode active material decreases. If the coating weight of the phosphoric acid decreases to a value under such a range, the stability of the cathode active material deteriorates.

(Second Step)

In the second step, the composite oxide particle which has been coating-processed in the first step is separated from the solvent system constructed mainly by the water and, thereafter, heating-processed, thereby dehydrating the hydroxide. A coating layer made of an oxide containing lithium Li and a coating element of at least one of nickel Ni and manganese Mn and a surface layer containing phosphorus P are formed on the surface of the composite oxide particle. It is preferable that the heating process is executed in an oxidation atmosphere such as air, pure oxygen, or the like at temperatures of, for example, about 300° C. to 1000° C. In this instance, since the hydroxide containing nickel Ni and/or manganese Mn has been coated with the phosphoric acid, the sintering between the particles is suppressed and the binding of the particles is suppressed.

After the composite oxide particle which has been coating-processed in the first step was separated from the solvent system, if necessary, in order to adjust the lithium amount, it is also possible to impregnate an aqueous solution of the lithium compound into the composite oxide particle and, thereafter, execute the heating process.

As a lithium compound, for example, it is possible to use: an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate, lithium hydrogencarbonate, or the like; or an organic compound such as methyllithium, vinyllithium, isopropyl lithium, butyllithium, phenyllithium, lithium oxalate, lithium acetate, or the like.

After the baking, a particle size can be also adjusted as necessary by light pulverization, the classifying operation, or the like.

A non-aqueous electrolyte secondary battery using the cathode active material according to the third embodiment of the invention as mentioned above is similar to that of the foregoing first embodiment.

Fourth Embodiment

A cathode active material according to the fourth embodiment of the invention is constructed in such a manner that a coating layer made of an oxide containing lithium Li and a coating element of at least one of nickel Ni and manganese Mn is provided in at least a part of a composite oxide particle and a surface layer containing magnesium Mg is provided in at least a part of the coating layer.

First, the reason why the cathode active material includes the above construction will be described. Although the cathode active material constructed mainly by a lithium cobalt acid $LiCoO_2$ can realize the high charge voltage performance and the high energy density performance associated therewith, if the charge/discharge cycles at a high capacitance are repeated at the high charge voltage, the capacitance decreases largely. Since a cause for it depends on the surface of the cathode active material particle, necessity of a surface process of the cathode active material is pointed out.

Therefore, although various surface processes have been proposed, from a viewpoint of eliminating the decrease in capacitance per volume or weight or minimizing the decrease in capacitance, by executing the surface process by a material which can suppress the decrease in capacitance or contribute to the capacitance, the cathode active material in which the high charge voltage performance and the high energy density performance associated therewith can be realized and which is excellent in the charge/discharge cycle characteristics at the high charge voltage can be obtained.

By providing a coating layer made of an oxide containing lithium Li and a coating element of at least one of nickel Ni and manganese Mn for the cathode active material constructed mainly by the lithium cobalt acid $LiCoO_2$, the cathode active material which has the high charge voltage performance and the high energy density performance associated therewith and is excellent in the charge/discharge cycle characteristics at the high capacitance under the high charge voltage condition can be obtained although it is slightly poor in the high charge voltage performance and the high energy density performance associated therewith.

As a method of providing the coating layer for the composite oxide particle, the following methods can be proposed: a method whereby a compound of lithium Li and a compound of nickel Ni and/or a compound of manganese Mn are mixed in a dry manner as micro-pulverized particles with the composite oxide particle, the particle is coated and baked, and the coating layer made of the oxide containing lithium Li and the coating element of at least one of nickel Ni and manganese Mn is formed on the surface of the composite oxide particle; and a method whereby the compound of lithium Li and the compound of nickel Ni and/or the compound of manganese Mn are dissolved or mixed into a solvent, the particle is coated and baked in a wet manner and the coating layer made of the oxide containing lithium Li and the coating element of at least one of nickel Ni and manganese Mn is formed on the surface of the composite oxide particle. However, according to those methods, such a result that it is difficult to accomplish the coating of high uniformity is obtained.

By coating the surface of the particle with nickel Ni and/or manganese Mn as a hydroxide, heat-dehydrating it, and forming the coating layer, the coating of high uniformity can be realized. According to such a coating process, the compound of nickel Ni and/or the compound of manganese Mn is dissolved into a solvent system constructed mainly by the water. Thereafter, the composite oxide particle is dispersed into the solvent system. A basicity of a dispersing system is raised By adding a base to such a dispersing system or by another method. The hydroxide containing nickel Ni and/or manganese Mn is precipitated to the surface of the composite oxide particle.

The uniformity of the coating onto the composite oxide particle can be further improved by executing the coating process in the solvent system constructed mainly by the water whose pH is equal to 12 or more. In other words, the metal composite oxide particle is preliminarily dispersed into the solvent system constructed mainly by the water whose pH is equal to 12 or more. The compound of nickel Ni and/or the compound of manganese Mn is added to the solvent system. The surface of the metal composite oxide particle is coated with the hydroxide containing nickel Ni and/or manganese Mn.

The composite oxide particle coated with the hydroxide containing nickel Ni and/or manganese Mn by the coating process is heat-dehydrated, thereby forming the coating layer onto the surface of the composite oxide particle. Thus, the uniformity of the coating onto the surface of the composite oxide particle can be improved.

In the composite oxide particle coated with the hydroxide containing nickel Ni and/or manganese Mn, when a ratio of nickel Ni increases and a ratio of manganese Mn decreases, in the baking of a precursor in which lithium Li has been added, the sintering between the particles is liable to be progressed.

If the sintering between the particles is progressed, there is a problem as described hereinbelow. Upon creation of the cathode, it is necessary to increase an amount of mechanical energy which is applied in the breakage of the particles that is performed to uniformly mix the particle with the binder and the carbon particle serving as a conductive material. In association with it, the cathode active material formed by the composite oxide particles having the coating layer is damaged or broken, so that a total defect amount as powder increases.

The damage or breakdown occurs in a form of a disconnection of a coupling portion of the sintered particles, a creation of a crack in the particle, a crushing of the particle itself, a peel-off of the coating layer, or the like. Particularly, in the composite oxide particle having the coating layer, as compared with the particle of the cathode active material or the like constructed mainly by the lithium cobalt acid $LiCoO_2$, there is such a tendency that the surface shape of the particle is not smooth and it has the coarse surface. Therefore, when the particle receives an external force, it is considered that a slip between the particles is not smooth, the external force is easily concentrated on a local position, and the cathode active material is easily damaged or broken.

Thus, the surface to which the coating layer is not provided is exposed. That is, the surface which does not contribute to the improvement of the charge/discharge cycle characteristics and to which the coating layer is not provided and the active new surface are exposed. Therefore, the charge/discharge cycle characteristics of the high capacitance under the high charge voltage condition deteriorate. As is well known, the exposed surface is active and has a high surface energy. Thus, a decomposition reaction of the electrolytic solution and the activity of the elution of the surface are extremely higher than those of the surface formed by the ordinary baking.

For improving the deterioration of the function of the cathode based on the sintering between the particles and improving a manufacturing process, it has been found that the following points. The surface of the composite oxide particle coated with the hydroxide containing nickel Ni and/or manganese Mn is further coated with the hydroxide containing magnesium Mg, thereby enabling the progress of the sintering to be improved. The damage or breakdown of the particle can be decreased in association with it. The composite oxide particle, coating layer, and surface layer is described below.

[Composite Oxide]

The composite oxide particle contains at least lithium Li and cobalt Co and it is preferable that its mean compositions are expressed by, for example, Formula 1. By using such a composite oxide particle, the high capacitance and high discharge electric potential can be obtained.

$$Li_{(1+x)}Co_{(1-y)}M_yO_{(2-z)} \quad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, calcium Ca, strontium Sr, tungsten W, yttrium Y, and zirconium Zr; x indicates a value within a range of $-0.10 \leq x \leq 0.10$; y indicates a value within a range of $0 \leq y \leq 0.50$; and z indicates a value within a range of $-0.10 \leq z \leq 0.20$.

In Formula 1, the range of x is, for example, $-0.10 \leq x \leq 0.10$, preferably, $-0.08 \leq x \leq 0.08$, and more preferably, $-0.06 \leq x \leq 0.06$. If x decreases to a value under such a range, the discharge capacitance decreases. If x increases to a value over such a range, the elements are diffused out of the particle, become an obstacle to control of basicity in a next processing step, and finally, become a cause of obstructing the promotion of a gel creation during the kneading of a cathode paste.

The range of y is, for example, $0 \leq y \leq 0.50$, preferably, $0 \leq y \leq 0.40$, and more preferably, $0 \leq y \leq 0.30$. If y increases to a value over such a range, the high charge voltage performance held by $LiCoO_2$ and the high energy density performance associated therewith are deteriorated.

The range of z is, for example, $-0.10 \leq z \leq 0.20$, preferably, $-0.08 \leq z \leq 0.18$, and more preferably, $-0.06 \leq z \leq 0.16$. If z decreases to a value under such a range and if z increases to a value over such a range, there is such a tendency that the discharge capacitance decreases.

As for the composite oxide particle, a material which can be ordinarily obtained as a cathode active material can be used as a starting raw material. However, according to circumstances, after a secondary particle was broken by using a ball mill, a grinding machine, or the like, it can be used.

[Coating Layer]

A coating layer is provided in at least a part of the composite oxide particle and includes an oxide containing lithium Li and a coating element of at least one of nickel Ni and manganese Mn. By providing the coating layer, the high charge voltage performance and the high energy density performance associated therewith can be realized and the charge/discharge cycle characteristics under the high charge voltage condition can be improved.

It is preferable that a construction ratio of nickel Ni and manganese Mn in the coating layer ranges from 100:0 to 30:70 as a mole ratio. It is more preferable that it ranges from 100:0 to 40:60. This is because if an amount of manganese Mn increases to a value over such a range, doping performance of lithium Li deteriorates and, finally, it becomes a factor of a decrease in capacitance of the cathode active material and an increase in electric resistance when such a material is used for a battery. The range of the construction ratio of nickel Ni and manganese Mn is a range showing a larger validity adapted to suppress the progress of sintering between the particles in the baking of a precursor added with lithium Li.

Nickel Ni and manganese Mn in the oxide of the coating layer can be replaced by a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

Thus, stability of the cathode active material can be improved and diffusibility of lithium ions can be improved. A replacement amount of the selected metal element is equal to or less than 40 mol % of a total amount of nickel Ni and manganese Mn in the oxide of the coating layer, preferably, 30 mol % or less and, more preferably, 20 mol % or less. This is because if the replacement amount of the selected metal element increases to a value over such a range, the doping performance of lithium Li deteriorates and the capacitance of the cathode active material decreases.

An amount of coating layer lies, for example, within a range from 0.5 weight % to 50 weight % of the composite oxide particle, preferably, a range from 1.0 weight % to 40 weight %, more preferably, a range from 2.0 weight % to 35 weight %. This is because if the coating weight of the metal oxide increases to a value over such a range, the capacitance of the cathode active material decreases. This is also because if the coating weight of the metal oxide decreases to a value under such a range, the stability of the cathode active material deteriorates.

[Surface Layer]

The surface layer is provided in at least a part of the coating layer and includes an oxide containing magnesium Mg.

In the oxide of the surface layer, the oxide of 20 mol % or less of a total amount of magnesium Mg can be replaced with, for example, a metal element of at least one kind selected from a group containing cobalt Co, aluminum Al, nickel Ni, manganese Mn, yttrium Y, boron B, titanium, vanadium V, chromium Cr, iron Fe, copper Cu, zinc Zn, molybdenum Mo, tin Sn, calcium Ca, strontium Sr, tungsten W, and zirconium Zr. Thus, the stability of the cathode active material can be improved and the diffusibility of lithium ions can be improved.

A replacement amount of the selected metal element is preferably equal to 20 mol % of a total amount of magnesium Mg in the oxide of the surface layer, more preferably, 15 mol % or less and, further preferably, 10 mol % or less. This is because if the replacement amount of the selected metal element increases to a value over such a range, the doping performance of lithium of the composite oxide particle deteriorates and, finally, the capacitance of the cathode active material decreases.

As an amount in the surface layer, an amount of magnesium Mg contained in the surface layer ranges from 0.01 weight % to 1.0 weight % of the cathode active material on the assumption that the amount of magnesium Mg is calculated as a weight in a magnesium oxide MgO. As an amount in the surface layer, for example, a coating amount of magnesium Mg ranges from $1.0 \times 10^{-5}$ mol to $1.0 \times 10^{-2}$ mol of magnesium ions per surface area of 1 $m^2$ of the coating surface, preferably, a range from $3.0 \times 10^{-5}$ mol to $5.0 \times 10^{-3}$ mol, more preferably, a range from $1.0 \times 10^{-4}$ mol to $1.0 \times 10^{-3}$ mol. If the amount in the surface layer increases to a value over such a range, a diffusion resistance of lithium ions increases and the capacitance of the final cathode active material of the invention decreases. On the other hand, if the amount in the surface layer decreases to a value under such a range, there is such a tendency that the sintering preventing effect and the improving effect of the charge/discharge cycle characteristics associated therewith deteriorate.

A mean diameter of the particle in the cathode active material preferably ranges from 2.0 μm to 50 μm. This is because if the mean diameter is less than 2.0 μm, when the cathode active material is pressed upon manufacturing of the cathode, it is peeled off and a surface area of the active material increases, so that it is necessary to increase addition amounts of a conductive material and a binder, and there is such a tendency that an energy density per unit weight decreases. This is also because if the mean diameter exceeds 50 μm, the particle pierces a separator and there is such a tendency that a short-circuit is caused.

[Manufacturing Method of Cathode Active Material]

Subsequently, a manufacturing method of the cathode active material according to the fourth embodiment is described below. The manufacturing method of the cathode active material according to the fourth embodiment can be roughly classified into: a first step of forming a layer made of a hydroxide containing nickel Ni and/or manganese Mn into at least a part of the composite oxide particle and, thereafter, forming a layer made of a hydroxide containing magnesium Mg into at least a part of the composite oxide particle; and a second step of executing a heating process after forming the hydroxide containing magnesium Mg, thereby forming a coating layer made of an oxide containing lithium Li and a coating element of at least one of nickel Ni and manganese Mn and a surface layer made of an oxide containing magnesium Mg into at least a part of the composite oxide particle.

(First Step)

In the first step, a coating process of the hydroxide containing nickel Ni and/or manganese Mn and the hydroxide containing magnesium Mg is executed. In the first step, for example, first, the composite oxide particle is dispersed into a solvent system constructed mainly by the water in which a compound of nickel Ni and/or a compound of manganese Mn have been dissolved, a basicity of the dispersing system is raised by adding a base into the dispersing system, or the like, and the hydroxide containing nickel Ni and/or manganese Mn is precipitated to the surface of the composite oxide particle. It is also possible to use a method whereby the composite oxide particle is dispersed into the solvent constructed mainly by basic water, subsequently, the compound of nickel Ni and/or the compound of manganese Mn is added to the aqueous solution, and the hydroxide containing nickel Ni and/or manganese Mn is precipitated.

As for a raw material of the coating process of the hydroxide containing nickel Ni, as a nickel compound, it is possible to use: an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate, nickel thiocyanate, or the like; or an organic compound such as nickel oxalate, nickel acetate, or the like. One, two, or more kinds of them may be used.

As for a raw material of the coating process of the hydroxide containing manganese Mn, as a manganese compound, it is possible to use: an inorganic compound such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrogensulfide, manganese sulfate, manganese hydrogensulfate, manganese thiocyanate, manganese nitrite, manganese phosphate, manganese dihydrogenphosphate, manganese hydrogencarbonate, or the like; or an organic compound such as manganese oxalate, manganese acetate, or the like. One, two, or more kinds of them may be used.

Subsequently, the surface of the composite oxide particle coated with the hydroxide containing nickel Ni and/or manganese Mn is coated with the hydroxide containing magnesium Mg. The coating of the hydroxide containing magnesium Mg can be performed in a manner similar to the coating of the hydroxide containing nickel Ni and/or manganese Mn. That is, the composite oxide particle coated with the hydroxide containing nickel Ni and/or manganese Mn is dispersed into the solvent constructed mainly by the water into which the compound of magnesium Mg has been dissolved. The basicity of the dispersing system is raised by adding a base to such a dispersing system or by another method. The hydroxide containing magnesium Mg is precipitated. It is also possible to construct in such a manner that the composite oxide particle coated with the hydroxide containing nickel Ni and/or manganese Mn is dispersed into the solvent system constructed mainly by the basic water and, thereafter, the compound of magnesium Mg is added to such an aqueous solution, thereby precipitating the hydroxide.

As for a raw material of the coating process of the hydroxide containing magnesium Mg, as a magnesium compound, it is possible to use: an inorganic compound such as magnesium hydroxide, magnesium nitrate, magnesium fluoride, magnesium chloride, magnesium bromide, magnesium iodide, magnesium perchlorate, magnesium oxide, magnesium sulfate, magnesium carbonate or the like; or an organic compound such as magnesium oxalate, magnesium acetate, or the like. One, two, or more kinds of them may be used.

In the first step, a value of pH of the solvent system constructed mainly by the water mentioned above is, for example, equal to 12 or more, preferably, 13 or more, and more preferably, 14 or more. The larger the value of pH of the solvent system constructed mainly by the water mentioned above is, the better the uniformity of the coating of the hydroxide containing nickel Ni and/or manganese Mn is and a reaction precision is also high. There are such advantages that the productivity is improved owing to the reduction in processing time and the quality is improved. The pH of the solvent system constructed mainly by the water is determined in consideration of the costs of alkali which is used, or the like.

A temperature of the process dispersing system is, for example, equal to 40° C. or more, preferably, 60° C. or more, and more preferably, 80° C. or more. The larger the value of the temperature of the process dispersing system is, the better the uniformity of the coating of the hydroxide containing nickel Ni and/or manganese Mn is and a reaction speed is also high. There are such advantages that the productivity is improved owing to the reduction in processing time and the quality is improved. The value of the temperature of the process dispersing system is determined in consideration of the costs of the apparatus and the productivity. However, it is also possible to recommend to execute the processes at 100° C. or more by using an autoclave from a viewpoint of the improvement of the productivity due to the reduction in processing time owing to the improvement of the coating uniformity and the improvement of the reaction speed.

Further, in the first step, for example, it is also possible to construct in such a manner that in the solvent system constructed mainly by the water, the hydroxide containing nickel Ni and/or manganese Mn is formed on the surface of the composite oxide particle, thereafter, the hydroxide is extracted from the solvent system constructed mainly by the water and the coating of the hydroxide containing magnesium Mg is performed. However, the invention is not limited to such a construction. For example, it is also possible to construct in such a manner that after the hydroxide containing nickel Ni and/or manganese Mn was formed on the surface of the composite oxide particle, it is not separated as it is from the solvent system constructed mainly by the water but the surface of the particle is coated with the hydroxide containing magnesium Mg by adding the magnesium compound to the solvent system.

Further, the pH of the solvent system constructed mainly by the water can be accomplished by dissolving alkali into the solvent system constructed mainly by the water. As alkali, for example, lithium hydroxide, sodium hydroxide, potassium hydroxide, and their mixture can be mentioned. Although the solvent system can be embodied by properly using those alkali, it is excellent to use lithium hydroxide from viewpoints of purity and performance of the cathode active material according to the fourth embodiment which is finally obtained. This is because if lithium hydroxide is used, the following effects are obtained. When the composite oxide particle formed with the hydroxide containing nickel Ni and/or manganese Mn is taken out of the solvent system constructed mainly by the water, by controlling a deposition amount of the dispersing medium made of the solvent constructed mainly by the water, an amount of lithium of the cathode active material according to the fourth embodiment which is finally obtained can be controlled.

(Second Step)

In the second step, the composite oxide particle which has been coating-processed in the first step is separated from the solvent system constructed mainly by the water and, thereafter, heating-processed, thereby dehydrating the hydroxide. A coating layer made of an oxide containing lithium Li and a coating element of at least one of nickel Ni and manganese Mn and a surface layer made of an oxide containing magnesium Mg are formed on the surface of the composite oxide particle. It is preferable that the heating process is executed in an oxidation atmosphere such as air, pure oxygen, or the like at temperatures of, for example, about 300° C. to 1000° C. In this instance, since the hydroxide containing nickel Ni and/or manganese Mn has been coated with the hydroxide containing magnesium Mg, the sintering between the particles is suppressed and the binding of the particles is suppressed.

After the composite oxide particle which has been coating-processed in the first step was separated from the solvent system, if necessary, in order to adjust the lithium amount, it is also possible to impregnate an aqueous solution of the lithium compound into the composite oxide particle and, thereafter, execute the heating process.

As a lithium compound, for example, it is possible to use: an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate, lithium hydrogencarbonate, or the like; or an organic compound such as methyllithium, vinyllithium, isopropyl lithium, butyllithium, phenyllithium, lithium oxalate, lithium acetate, or the like.

After the baking, a particle size can be also adjusted as necessary by light pulverization, the classifying operation, or the like.

A non-aqueous electrolyte secondary battery using the cathode active material according to the fourth embodiment as mentioned above is similar to that in the foregoing first embodiment.

Fifth Embodiment

A cathode active material according to the fifth embodiment of the invention is constructed in such a manner that a coating layer made of an oxide containing lithium Li and a coating element of at least one of nickel Ni and manganese Mn is provided in at least a part of a composite oxide particle and a surface layer containing a boric acid is provided in at least a part of the coating layer.

First, the reason why the cathode active material includes the above construction is described below. Although the cathode active material constructed mainly by a lithium cobalt acid $LiCoO_2$ can realize the high charge voltage performance and the high energy density performance associated therewith, if the charge/discharge cycles at a high capacitance are repeated at the high charge voltage, the capacitance decreases largely. Since a cause for it depends on the surface of the cathode active material particle, necessity of a surface process of the cathode active material is pointed out.

Therefore, although various surface processes have been proposed, from a viewpoint of eliminating the decrease in capacitance per volume or weight or minimizing the decrease in capacitance, by executing the surface process by a material which can suppress the decrease in capacitance or contribute to the capacitance, the cathode active material in which the high charge voltage performance and the high energy density performance associated therewith can be realized and which is excellent in the charge/discharge cycle characteristics at the high charge voltage can be obtained.

By providing a coating layer made of an oxide containing lithium Li and a coating element of at least one of nickel Ni and manganese Mn for the cathode active material constructed mainly by the lithium cobalt acid $LiCoO_2$, the cathode active material which has the high charge voltage performance and the high energy density performance associated therewith and is excellent in the charge/discharge cycle characteristics at the high capacitance under the high charge voltage condition can be obtained although it is slightly poor in the high charge voltage performance and the high energy density performance associated therewith.

As a method of providing the coating layer for the composite oxide particle, the following methods can be proposed: a method whereby a compound of lithium Li and a compound of nickel Ni and/or a compound of manganese Mn are mixed in a dry manner as micro-pulverized particles with the composite oxide particle, the particle is coated and baked, and the coating layer made of the oxide containing lithium Li and the coating element of at least one of nickel Ni and manganese Mn is formed on the surface of the composite oxide particle; and a method whereby the compound of lithium Li and the compound of nickel Ni and/or the compound of manganese Mn are dissolved or mixed into a solvent, the particle is coated and baked in a wet manner and the coating layer made of the oxide containing lithium Li and the coating element of at least one of nickel Ni and manganese Mn is formed on the surface of the composite oxide particle. However, according to those methods, such a result that it is difficult to accomplish the coating of high uniformity is obtained.

It has been determined that by coating the surface of the particle with nickel Ni and/or manganese Mn as a hydroxide, heat-dehydrating it, and forming the coating layer, the coating of high uniformity can be realized. According to such a coating process, the compound of nickel Ni and/or the compound of manganese Mn is dissolved into a solvent system constructed mainly by the water. Thereafter, the composite oxide particle is dispersed into the solvent system. A basicity of a dispersing system is raised by adding a base to such a dispersing system or by another method. The hydroxide containing nickel Ni and/or manganese Mn is precipitated to the surface of the composite oxide particle.

That the uniformity of the coating onto the composite oxide particle can be further improved by executing the coating process in the solvent system constructed mainly by the water whose pH is equal to 12 or more. In other words, the metal composite oxide particle is preliminarily dispersed into the solvent system constructed mainly by the water whose pH is equal to 12 or more. The compound of nickel Ni and/or the compound of manganese Mn is added to the solvent system. The surface of the metal composite oxide particle is coated with the hydroxide containing nickel Ni and/or manganese Mn.

The composite oxide particle coated with the hydroxide containing nickel Ni and/or manganese Mn by the coating process is heat-dehydrated, thereby forming the coating layer onto the surface of the composite oxide particle. Thus, the uniformity of the coating onto the surface of the composite oxide particle can be improved.

In the steps of coating the surface of the composite oxide particle with the hydroxide containing nickel Ni and/or manganese Mn and cleaning, dehydrating, and drying the composite oxide particle in order to bake it, the particles are bound through the hydroxide containing nickel Ni and/or manganese Mn on the surface. If the particles are broken, a peel-off of an interference of the hydroxide containing nickel Ni and/or manganese Mn whose adhesion is relatively weak and the composite oxide particle occurs or a cohesive failure of the hydroxide containing nickel Ni and/or manganese Mn whose cohesion is weak occurs. In association with it, the improvement of the characteristics of the cathode active material is deteriorated due to the creation of the coating layer.

If the baking in which lithium Li has been added is progressed while keeping the binding of the particles as it is or in the state where the particles having the hydroxide containing nickel Ni and/or manganese Mn are come into contact with the surface, there is such a tendency that the sintering between the particles is liable to be progressed.

If the sintering between the particles is progressed, there is a problem as described below. Upon creation of the cathode, it is necessary to increase an amount of mechanical energy which is applied in the breakage of the particles that is performed to uniformly mix the particle with the binder and the carbon particle serving as a conductive material. In association with it, the cathode active material formed by the composite oxide particles having the coating layer is damaged or broken, so that a total defect amount as powder increases.

The damage or breakdown occurs in a form of a disconnection of a coupling portion of the sintered particles, a creation of a crack in the particle, a crushing of the particle itself, a peel-off of the coating layer, or the like. Particularly, in the composite oxide particle having the coating layer, as compared with the particle of the cathode active material or the like constructed mainly by the lithium cobalt acid $LiCoO_2$, there is such a tendency that the surface shape of the particle is not smooth and it has the coarse surface. Therefore, when the particle receives an external force, it is considered that a slip between the particles is not smooth, the external force is easily concentrated on a local position, and the cathode active material is easily damaged or broken.

Thus, the surface to which the coating layer is not provided is exposed. That is, the surface which does not contribute to the improvement of the charge/discharge cycle characteristics and to which the coating layer is not provided and the active new surface are exposed. Therefore, the charge/discharge cycle characteristics of the high capacitance under the high charge voltage condition deteriorate. As is well known, the exposed surface is active and has a high surface energy. Thus, a decomposition reaction of the electrolytic solution and the activity of the elution of the surface are extremely higher than those of the surface formed by the ordinary baking.

The surface of the composite oxide particle coated with the hydroxide containing nickel Ni and/or manganese Mn is further coated with a boric acid, thereby enabling the progress of the sintering to be improved. The damage or breakdown of the particle can be decreased in association with it. The composite oxide particle, coating layer, and surface layer will now be described.

[Composite Oxide]

The composite oxide particle contains at least lithium Li and cobalt Co and it is preferable that its mean compositions are expressed by, for example, Formula 1. By using such a composite oxide particle, the high capacitance and high discharge electric potential can be obtained.

$$Li_{(1+x)}Co_{(1-y)}M_yO_{(2-z)} \qquad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.10$; y indicates a value within a range of $0 \leq y \leq 0.50$; and z indicates a value within a range of $-0.10 \leq z \leq 0.20$.

In Formula 1, the range of x is, for example, $-0.10 \leq x \leq 0.10$, preferably $-0.08 \leq x \leq 0.08$, and more preferably, $-0.06 \leq x \leq 0.06$. If x decreases to a value under such a range, the discharge capacitance decreases. If x increases to a value over such a range, the elements are diffused out of the particle, become an obstacle to control of basicity in a next processing step, and finally, become a cause of obstructing the promotion of a gel creation during the kneading of a cathode paste.

The range of y is, for example, $0 \leq y \leq 0.50$, preferably, $0 \leq y \leq 0.40$, and more preferably, $0 \leq y \leq 0.30$. If y increases to a value over such a range, the high charge voltage performance held by LiCoO$_2$ and the high energy density performance associated therewith are deteriorated.

The range of z is, for example, $-0.10 \leq z \leq 0.20$, preferably, $-0.08 \leq z \leq 0.18$, and more preferably, $-0.06 \leq z \leq 0.16$. If z decreases to a value under such a range and if z increases to a value over such a range, there is such a tendency that the discharge capacitance decreases.

As for the composite oxide particle, a material which can be ordinarily obtained as a cathode active material can be used as a starting raw material. However, according to circumstances, after a secondary particle was broken by using a ball mill, a grinding machine, or the like, it can be used.

[Coating Layer]

A coating layer is provided in at least a part of the composite oxide particle and includes an oxide containing lithium Li and a coating element of at least one of nickel Ni and manganese Mn. By providing the coating layer, the high charge voltage performance and the high energy density performance associated therewith can be realized and the charge/discharge cycle characteristics at the high capacitance under the high charge voltage condition can be improved.

It is preferable that a construction ratio of nickel Ni and manganese Mn in the coating layer ranges from 100:0 to 30:70 as a mole ratio. It is more preferable that it ranges from 100:0 to 40:60. This is because if an amount of manganese Mn increases to a value over such a range, doping performance of lithium Li deteriorates and, finally, it becomes a factor of a decrease in capacitance of the cathode active material and an increase in electric resistance when such a material is used for a battery. The range of the construction ratio of nickel Ni and manganese Mn is a range showing a larger validity adapted to suppress the progress of sintering between the particles in the baking of a precursor added with lithium Li.

Nickel Ni and manganese Mn in the oxide of the coating layer can be replaced by a metal element of at least one kind selected from a group containing magnesium Mg, aluminum Al, boron B, titanium, vanadium V, chromium Cr, iron Fe, cobalt Co, copper Cu, zinc Zn, tin Sn, and tungsten W.

Thus, stability of the cathode active material can be improved and diffusibility of lithium ions can be improved. A replacement amount of the selected metal element is, for example, equal to or less than 40 mol % of a total amount of nickel Ni and manganese Mn in the oxide of the coating layer, preferably, 30 mol % or less and, more preferably, 20 mol % or less. This is because if the replacement amount of the selected metal element increases to a value over such a range, the doping performance of lithium Li deteriorates and the capacitance of the cathode active material decreases.

An amount of coating layer lies, for example, within a range from 0.5 weight % to 50 weight % of the composite oxide particle, preferably, a range from 1.0 weight % to 40 weight %, more preferably, a range from 2.0 weight % to 35 weight %. This is because if the coating weight of the metal oxide increases to a value over such a range, the capacitance of the cathode active material decreases. This is also because if the coating weight of the metal oxide decreases to a value under such a range, the stability of the cathode active material deteriorates.

[Surface Layer]

The surface layer is provided in at least a part of the coating layer and contains boron B.

A mean diameter of the particle in the cathode active material preferably ranges from 2.0 μm to 50 μm. This is because if the mean diameter is less than 2.0 μm, when the cathode active material is pressed upon manufacturing of the cathode, it is peeled off and a surface area of the active material increases, so that it is necessary to increase addition amounts of a conductive material and a binder, and there is such a tendency that an energy density per unit weight decreases. This is also because if the mean diameter exceeds 50 μm, the particle pierces a separator and there is such a tendency that a short-circuit is caused.

[Manufacturing Method of Cathode Active Material]

Subsequently, a manufacturing method of the cathode active material according to the fifth embodiment is described below. The manufacturing method of the cathode active material according to the fifth embodiment can be roughly classified into: a first step of forming a layer made of a hydroxide containing nickel Ni and/or manganese Mn into at least a part of the composite oxide particle and, thereafter, coating at least a part of the composite oxide particle with a boric acid; and a second step of executing a heating process after coating with the boric acid, thereby forming a coating layer made of an oxide containing lithium Li and a coating element of at least one of nickel Ni and manganese Mn and a surface layer containing boron B into at least a part of the composite oxide particle.

(First Step)

In the first step, a coating process of the hydroxide containing nickel Ni and/or manganese Mn and the silicic acid is executed. In the first step, for example, first, the composite oxide particle is dispersed into a solvent system constructed mainly by the water in which a compound of nickel Ni and/or a compound of manganese Mn have been dissolved, a basicity of the dispersing system is raised by adding a base into the dispersing system, or the like, and the hydroxide containing nickel Ni and/or manganese Mn is precipitated to the surface of the composite oxide particle. It is also possible to use a method whereby the composite oxide particle is dispersed into the solvent constructed mainly by basic water, subsequently, the compound of nickel Ni and/or the compound of manganese Mn is added to the aqueous solution, and the hydroxide containing nickel Ni and/or manganese Mn is precipitated.

As for a raw material of the coating process of the hydroxide containing nickel Ni, as a nickel compound, for example, it is possible to use: an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate, nickel thiocyanate, or the like; or an organic compound such as nickel oxalate, nickel acetate, or the like. One, two, or more kinds of them may be used.

As for a raw material of the coating process of the hydroxide containing manganese Mn, as a manganese compound, for example, it is possible to use: an inorganic compound such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrogensulfide, manganese sulfate, manganese hydrogensulfate, manganese thiocyanate, manganese nitrite, manganese phosphate, manganese dihydrogenphosphate, manganese hydrogencarbonate, or the like; or an organic compound such as manganese oxalate, manganese acetate, or the like. One, two, or more kinds of them may be used.

A value of pH of the solvent system constructed mainly by the water mentioned above is, for example, equal to 12 or more, preferably, 13 or more, and more preferably, 14 or more. The larger the value of pH of the solvent system constructed mainly by the water mentioned above is, the better the uniformity of the coating of the hydroxide containing nickel Ni and/or manganese Mn is and a reaction precision is also high. The productivity is improved owing to the reduction in processing time and the quality is improved. The pH of the solvent system constructed mainly by the water is determined in consideration of the costs of alkali which is used, or the like.

A temperature of the process dispersing system is, for example, equal to 40° C. or more, preferably, 60° C. or more, and more preferably, 80° C. or more. The larger the value of the temperature of the process dispersing system is, the better the uniformity of the coating of the hydroxide containing nickel Ni and/or manganese Mn is and a reaction speed is also high. There are such advantages that the productivity is improved owing to the reduction in processing time and the quality is improved. The value of the temperature of the process dispersing system is determined in consideration of the costs of the apparatus and the productivity. However, it is also possible to recommend to execute the processes at 100° C. or more by using an autoclave from a viewpoint of the improvement of the productivity due to the reduction in processing time owing to the improvement of the coating uniformity and the improvement of the reaction speed.

Further, the pH of the solvent system constructed mainly by the water can be accomplished by dissolving alkali into the solvent system constructed mainly by the water. As alkali, for example, lithium hydroxide, sodium hydroxide, potassium hydroxide, and their mixture can be mentioned. Although the solvent system can be embodied by properly using those alkali, it is excellent to use lithium hydroxide from viewpoints of purity and performance of the cathode active material according to the fifth embodiment which is finally obtained. This is because if lithium hydroxide is used, the following advantages are obtained. When the composite oxide particle formed with the hydroxide containing nickel Ni and/or manganese Mn is taken out of the solvent system constructed mainly by the water, by controlling a deposition amount of the dispersing medium made of the solvent constructed mainly by the water, an amount of lithium of the cathode active material according to the first embodiment which is finally obtained can be controlled.

Subsequently, at least a part of the composite oxide particle formed with a layer made of the hydroxide containing nickel Ni and/or manganese Mn is coated with a boric acid. It is effective to execute the coating process of the boric acid in the state where the composite oxide particle formed with the layer made of the hydroxide containing nickel Ni and/or manganese Mn has been suspended into the solvent system constructed mainly by the water in which the hydroxide containing nickel Ni and/or manganese Mn had been coating-processed. Thus, at a stage of dehydrating and drying the composite oxide particle formed with the layer made of the hydroxide containing nickel Ni and/or manganese Mn, such a situation that the particles are bound through the hydroxide containing nickel Ni and/or manganese Mn on the surface can be suppressed.

It is preferably effective to execute the coating process of the boric acid at a cleaning stage after the coating process of the hydroxide containing nickel Ni and/or manganese Mn. Thus, a leakage of the silicic acid added to the suspending system can be prevented and adsorption can be improved. Further, by executing the coating process of the boric acid, a particle cohesion promoting effect which is not accompanied with the binding of the particles can be obtained in the suspending system. The cleaning operation and the collecting operation of the particles from the dispersing medium can be easily executed.

Regarding the boric acid, it is assumed that a monomer-acid such as orthoborate, perborate, or the like and their poly-acid are incorporated in the concept of the boric acid. As a raw material of a borate compound which can be used for the coating process, for example, there can be mentioned: an acid such as hypoboric acid, metaboric acid, or the like as well as orthoborate; or a salt such as ammonium borate, ammonium tetraborate, ammonium pentaborate, lithium tetraborate, lithium metaborate, magnesium borate, sodium borate, sodium metaborate, sodium tetraborate, sodium perborate, potassium metaborate, potassium borate, potassium tetraborate, or the like. One, two, or more kinds of them may be used.

A coating weight of the boric acid ranges, for example, from 0.00001 weight % to 1.0 weight % for a weight of the composite oxide particle, preferably, it ranges from 0.0001 weight % to 0.1 weight %. If the coating weight of the boric acid increases to a value over such a range, the capacitance of the cathode active material decreases. If the coating weight of the boric acid decreases to a value under such a range, the stability of the cathode active material deteriorates.

(Second Step)

In the second step, the composite oxide particle which has been coating-processed in the first step is separated from the solvent system constructed mainly by the water and, thereafter, heating-processed, thereby dehydrating the hydroxide. A coating layer made of an oxide containing lithium Li and a coating element of at least one of nickel Ni and manganese Mn and a surface layer containing boron B are formed on the surface of the composite oxide particle. It is preferable that the heating process is executed in an oxidation atmosphere such as air, pure oxygen, or the like at temperatures of, for example, about 300° C. to 1000° C. In this instance, since the hydroxide containing nickel Ni and/or manganese Mn has been coated with the boric acid, the sintering between the particles is suppressed and the binding of the particles is suppressed.

After the composite oxide particle which has been coating-processed in the first step was separated from the solvent system, if necessary, in order to adjust the lithium amount, it is also possible to impregnate an aqueous solution of the lithium compound into the composite oxide particle and, thereafter, execute the heating process.

As a lithium compound, for example, it is possible to use: an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate, lithium hydrogencarbonate, or the like; or an organic compound such as methyllithium, vinyllithium, isopropyl lithium, butyllithium, phenyllithium, lithium oxalate, lithium acetate, or the like.

After the baking, a particle size can be also adjusted as necessary by light pulverization, the classifying operation, or the like.

A non-aqueous electrolyte secondary battery using the cathode active material according to the fifth embodiment of the invention as mentioned above is similar to that in the foregoing first embodiment.

Six Embodiment

A cathode active material according to the sixth embodiment of the invention is constructed in such a manner that a coating layer made of an oxide containing lithium Li and a coating element of at least one of nickel Ni and manganese Mn is provided in at least a part of a composite oxide particle and a surface layer containing zinc Zn is provided in at least a part of the coating layer.

First, the reason why the cathode active material includes the above construction is described below. Although the cathode active material constructed mainly by a lithium cobalt acid $LiCoO_2$ can realize the high charge voltage performance and the high energy density performance associated therewith, if the charge/discharge cycles at a high capacitance are repeated at the high charge voltage, the capacitance decreases largely. Since a cause for it depends on the surface of the cathode active material particle, necessity of a surface process of the cathode active material is pointed out.

Therefore, although various surface processes have been proposed, from a viewpoint of eliminating the decrease in capacitance per volume or weight or minimizing the decrease in capacitance, by executing the surface process by a material which can suppress the decrease in capacitance or contribute to the capacitance, the cathode active material in which the high charge voltage performance and the high energy density performance associated therewith can be realized and which is excellent in the charge/discharge cycle characteristics at the high charge voltage can be obtained.

By providing a coating layer made of an oxide containing lithium Li and a coating element of at least one of nickel Ni and manganese Mn for the cathode active material constructed mainly by the lithium cobalt acid $LiCoO_2$, the cathode active material which has the high charge voltage performance and the high energy density performance associated therewith and is excellent in the charge/discharge cycle characteristics at the high capacitance under the high charge voltage condition can be obtained although it is slightly poor in the high charge voltage performance and the high energy density performance associated therewith.

As a method of providing the coating layer for the composite oxide particle, the following methods can be proposed: a method whereby a compound of lithium Li and a compound of nickel Ni and/or a compound of manganese Mn are mixed in a dry manner as micro-pulverized particles with the composite oxide particle, the particle is coated and baked, and the coating layer made of the oxide containing lithium Li and the coating element of at least one of nickel Ni and manganese Mn is formed on the surface of the composite oxide particle; and a method whereby the compound of lithium Li and the compound of nickel Ni and/or the compound of manganese Mn are dissolved or mixed into a solvent, the particle is coated and baked in a wet manner and the coating layer made of the oxide containing lithium Li and the coating element of at least one of nickel Ni and manganese Mn is formed on the surface of the composite oxide particle. However, according to those methods, such a result that it is difficult to accomplish the coating of high uniformity is obtained.

By coating the surface of the particle with nickel Ni and/or manganese Mn as a hydroxide, heat-dehydrating it, and forming the coating layer, the coating of high uniformity can be realized. According to such a coating process, the compound of nickel Ni and/or the compound of manganese Mn is dissolved into a solvent system constructed mainly by the water. Thereafter, the composite oxide particle is dispersed into the solvent system. A basicity of a dispersing system is raised by adding a base to such a dispersing system or by another method. The hydroxide containing nickel Ni and/or manganese Mn is precipitated to the surface of the composite oxide particle.

The uniformity of the coating onto the composite oxide particle can be further improved by executing the coating process in the solvent system constructed mainly by the water whose pH is equal to 12 or more. In other words, the metal composite oxide particle is preliminarily dispersed into the solvent system constructed mainly by the water whose pH is equal to 12 or more. The compound of nickel Ni and/or the compound of manganese Mn is added to the solvent system. The surface of the metal composite oxide particle is coated with the hydroxide containing nickel Ni and/or manganese Mn.

The composite oxide particle coated with the hydroxide containing nickel Ni and/or manganese Mn by the coating process is heat-dehydrated, thereby forming the coating layer onto the surface of the composite oxide particle. Thus, the uniformity of the coating onto the surface of the composite oxide particle can be improved.

Applicants have found out an importance of such a problem that in the composite oxide particle coated with the hydroxide containing nickel Ni and/or manganese Mn, when a ratio of nickel Ni increases and a ratio of manganese Mn decreases, upon baking of the precursor to which lithium Li has been added, the sintering between the particles is liable to progress.

If the sintering between the particles is progressed, there is a problem as will be described hereinbelow. Upon creation of the cathode, it is necessary to increase an amount of mechanical energy which is applied in the breakage of the particles that is performed to uniformly mix the composite oxide particle with the binder and the carbon particle serving as a conductive material. In association with it, the cathode active material formed by the composite oxide particles having the coating layer is damaged or broken, so that a total defect amount as powder increases.

The damage or breakdown occurs in a form of a disconnection of a coupling portion of the sintered particles, a creation of a crack in the particle, a crushing of the particle itself, a peel-off of the coating layer, or the like. Particularly, in the composite oxide particle having the coating layer, as compared with the particle of the cathode active material or the like constructed mainly by the lithium cobalt acid $LiCoO_2$, there is such a tendency that the surface shape of the particle is not smooth and it has the coarse surface. Therefore, when the particle receives an external force, it is considered that a slip between the particles is not smooth, the external force is easily concentrated on a local position, and the cathode active material is easily damaged or broken.

Thus, the surface to which the coating layer is not provided is exposed. That is, the surface which does not contribute to the improvement of the charge/discharge cycle characteristics and to which the coating layer is not provided and the active new surface are exposed. Therefore, the charge/discharge cycle characteristics of the high capacitance under the high charge voltage condition deteriorate. As is well known, the exposed surface is active and has a high surface energy. Thus, a decomposition reaction of the electrolytic solution and the activity of the elution of the surface are extremely higher than those of the surface formed by the ordinary baking.

For the purpose of improving the deterioration of the function of the cathode based on the sintering between the particles and improving a manufacturing process, the following points have been determined. The surface of the composite oxide particle coated with the hydroxide containing nickel Ni and/or manganese Mn is further coated with a hydroxide containing zinc Zn, thereby enabling the progress of the sintering to be improved. The damage or breakdown of the particle can be decreased in association with it. The composite oxide particle, coating layer, and surface layer is described below.

[Composite Oxide]

The composite oxide particle contains at least lithium Li and cobalt Co and it is preferable that its mean compositions are expressed by, for example, Formula 1. By using such a composite oxide particle, the high capacitance and high discharge electric potential can be obtained.

$$Li_{(1+x)}Co_{(1-y)}M_yO_{(2-z)} \qquad \text{(Formula 1)}$$

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, calcium Ca, strontium Sr, tungsten W, yttrium Y, and zirconium Zr; x indicates a value within a range of $-0.10 \leq x \leq 0.10$; y indicates a value within a range of $0 \leq y \leq 0.50$; and z indicates a value within a range of $-0.10 \leq z \leq 0.20$.

In Formula 1, the range of x is, for example, $-0.10 \leq x \leq 0.10$, preferably, $-0.08 \leq x \leq 0.08$, and more preferably, $-0.06 \leq x \leq 0.06$. If x decreases to a value under such a range, the discharge capacitance decreases. If x increases to a value over such a range, the elements are diffused out of the particle, become an obstacle to control of basicity in a next processing step, and finally, become a cause of obstructing the promotion of a gel creation during the kneading of a cathode paste.

The range of y is, for example, $0 \leq y \leq 0.50$, preferably, $0 \leq y \leq 0.40$, and more preferably, $0 \leq y \leq 0.30$. If y increases to a value over such a range, the high charge voltage performance held by $LiCoO_2$ and the high energy density performance associated therewith are deteriorated.

The range of z is, for example, $-0.10 \leq z \leq 0.20$, preferably, $-0.08 \leq z \leq 0.18$, and more preferably, $-0.06 \leq z \leq 0.16$. If z decreases to a value under such a range and if z increases to a value over such a range, there is such a tendency that the discharge capacitance decreases.

As for the composite oxide particle, a material which can be ordinarily obtained as a cathode active material can be used as a starting raw material. However, according to circumstances, after a secondary particle was broken by using a ball mill, a grinding machine, or the like, it can be used.

[Coating Layer]

A coating layer is provided in at least a part of the composite oxide particle and includes an oxide containing lithium Li and a coating element of at least one of nickel Ni and manganese Mn. By providing the coating layer, the high charge voltage performance and the high energy density performance associated therewith can be realized and the charge/discharge cycle characteristics under the high charge voltage condition can be improved.

It is preferable that a construction ratio of nickel Ni and manganese Mn in the coating layer ranges from 100:0 to 30:70 as a mole ratio. It is more preferable that it ranges from 100:0 to 40:60. This is because if an amount of manganese Mn increases to a value over such a range, doping performance of lithium Li deteriorates and, finally, it becomes a factor of a decrease in capacitance of the cathode active material and an increase in electric resistance when such a material is used for a battery. The range of the construction ratio of nickel Ni and manganese Mn is a range showing a larger validity adapted to suppress the progress of sintering between the particles in the baking of a precursor added with lithium Li.

Nickel Ni and manganese Mn in the oxide of the coating layer can be replaced by a metal element of at least one kind selected from a group containing magnesium Mg, aluminum Al, boron B, titanium, vanadium V, chromium Cr, iron Fe, cobalt Co, copper Cu, zinc Zn, molybdenum Mn, tin Sn, calcium Ca, strontium Sr, tungsten W, yttrium Y, and zirconium Zr.

Thus, stability of the cathode active material can be improved and diffusibility of lithium ions can be improved. A replacement amount of the selected metal element is, for example, equal to or less than 40 mol % of a total amount of nickel Ni and manganese Mn in the oxide of the coating layer, preferably, 30 mol % or less and, more preferably, 20 mol % or less. This is because if the replacement amount of the selected metal element increases to a value over such a range, the doping performance of lithium Li deteriorates and the capacitance of the cathode active material decreases.

An amount of coating layer lies, for example, within a range from 0.5 weight % to 50 weight % for 100 weight % of the composite oxide particle, preferably, a range from 1.0 weight % to 40 weight %, more preferably, a range from 2.0 weight % to 35 weight %. This is because if the coating weight of the metal oxide increases to a value over such a range, the capacitance of the cathode active material decreases. This is also because if the coating weight of the metal oxide decreases to a value under such a range, the stability of the cathode active material deteriorates.

[Surface layer]

The surface layer is provided in at least a part of the coating layer and includes an oxide containing zinc Zn.

In the oxide of the surface layer, the oxide of 20 mol % or less of a total amount of zinc Zn can be replaced with, for example, a metal element of at least one kind selected from a group containing cobalt Co, aluminum Al, nickel Ni, manganese Mn, yttrium Y, boron B, titanium, vanadium V, chromium Cr, iron Fe, copper Cu, zinc Zn, molybdenum Mo, tin Sn, calcium Ca, strontium Sr, tungsten W, and zirconium Zr. Thus, the stability of the cathode active material can be improved and the diffusibility of lithium ions can be improved.

A replacement amount of the selected metal element is preferably equal to 20 mol % of a total amount of zinc Zn in the oxide of the surface layer, more preferably, 15 mol % or less and, further preferably, 10 mol % or less. This is because if the replacement amount of the selected metal element increases to a value over such a range, the doping performance of lithium of the composite oxide particle deteriorates and, finally, the capacitance of the cathode active material decreases.

As an amount in the surface layer, an amount of zinc Zn contained in the surface layer ranges from 0.02 weight % to 2.0 weight % of the cathode active material on the assumption that the amount of zinc is calculated as a weight in a zinc oxide ZnO. As an amount in the surface layer, for example, a coating amount of zinc Zn ranges from $1.0 \times 10^{-5}$ mol to $1.0 \times 10^{-2}$ mol of zinc ions per surface area of 1 $m^2$ of the coating surface, preferably, a range from $3.0 \times 10^{-5}$ mol to $5.0 \times 10^{-3}$ mol, more preferably, a range from $1.0 \times 10^{-4}$ mol to $1.0 \times 10^{-3}$ mol. If the amount in the surface layer increases to a value over such a range, a diffusion resistance of lithium ions increases and the capacitance of the final cathode active material of the invention decreases. On the other hand, if the amount in the surface layer decreases to a value under such a range, there is such a tendency that the sintering preventing effect and the improving effect of the charge/discharge cycle characteristics associated therewith deteriorate.

A mean diameter of the particle in the cathode active material preferably ranges from 2.0 μm to 50 μm. This is because if the mean diameter is less than 2.0 μm, when the cathode active material is pressed upon manufacturing of the cathode, it is peeled off and a surface area of the active material increases, so that it is necessary to increase addition amounts of a conductive material and a binder, and there is such a tendency that an energy density per unit weight decreases. This is also because if the mean diameter exceeds 50 µm, the particle pierces a separator and there is such a tendency that a short-circuit is caused.

[Manufacturing Method of Cathode Active Material]

Subsequently, a manufacturing method of the cathode active material according to the sixth embodiment is described below. The manufacturing method of the cathode active material according to the sixth embodiment can be roughly classified into: a first step of forming a layer made of a hydroxide containing nickel Ni and/or manganese Mn into at least a part of the composite oxide particle and, thereafter, forming a layer made of a hydroxide containing zinc Zn into at least a part of the composite oxide particle with a silicic acid; and a second step of executing a heating process after forming the hydroxide containing zinc Zn, thereby forming a coating layer made of an oxide containing lithium Li and a coating element of at least one of nickel Ni and manganese Mn and a surface layer made of an oxide containing zinc Zn into at least a part of the composite oxide particle.

(First Step)

In the first step, a coating process of the hydroxide containing nickel Ni and/or manganese Mn and the hydroxide containing zinc Zn is executed. In the first step, for example, first, the composite oxide particle is dispersed into a solvent system constructed mainly by the water in which a compound of nickel Ni and/or a compound of manganese Mn have been dissolved, a basicity of the dispersing system is raised by adding a base into the dispersing system, or the like, and the hydroxide containing nickel Ni and/or manganese Mn is precipitated to the surface of the composite oxide particle. It is also possible to use a method whereby the composite oxide particle is dispersed into the solvent constructed mainly by basic water, subsequently, the compound of nickel Ni and/or the compound of manganese Mn is added to the aqueous solution, and the hydroxide containing nickel Ni and/or manganese Mn is precipitated.

As for a raw material of the coating process of the hydroxide containing nickel Ni, as a nickel compound, it is possible to use: an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate, nickel thiocyanate, or the like; or an organic compound such as nickel oxalate, nickel acetate, or the like. One, two, or more kinds of them may be used.

As for a raw material of the coating process of the hydroxide containing manganese Mn, as a manganese compound, it is possible to use: an inorganic compound such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrogensulfide, manganese sulfate, manganese hydrogensulfate, manganese thiocyanate, manganese nitrite, manganese phosphate, manganese dihydrogenphosphate, manganese hydrogencarbonate, or the like; or an organic compound such as manganese oxalate, manganese acetate, or the like. One, two, or more kinds of them may be used.

Subsequently, the surface of the composite oxide particle coated with the hydroxide containing nickel Ni and/or manganese Mn is coated with the hydroxide containing zinc Zn. The coating of the hydroxide containing zinc Zn can be performed in a manner similar to the coating of the hydroxide containing nickel Ni and/or manganese Mn. That is, the composite oxide particle coated with the hydroxide containing nickel Ni and/or manganese Mn is dispersed into the solvent system constructed mainly by the water into which the compound of zinc Zn has been dissolved. The basicity of the dispersing system is raised by adding a base to such a dispersing system or by another method. The hydroxide containing zinc Zn is precipitated. It is also possible to construct in such a manner that the composite oxide particle coated with the hydroxide containing nickel Ni and/or manganese Mn is dispersed into the solvent system constructed mainly by the basic water and, thereafter, the compound of zinc Zn is added to such an aqueous solution, thereby precipitating the hydroxide.

As for a raw material of the coating process of the hydroxide containing zinc Zn, as a zinc compound, it is possible to use: an inorganic compound such as zinc hydroxide, zinc nitrate, zinc fluoride, zinc chloride, zinc bromide, zinc iodide, zinc perchlorate, zinc oxide, zinc sulfate, zinc carbonate or the like; or an organic compound such as zinc oxalate, zinc acetate, or the like. One, two, or more kinds of them may be used.

In the first step, a value of pH of the solvent system constructed mainly by the water mentioned above is, for example, equal to 12 or more, preferably, 13 or more, and more preferably, 14 or more. The larger the value of pH of the solvent system constructed mainly by the water mentioned above is, the better the uniformity of the coating of the hydroxide containing nickel Ni and/or manganese Mn and that of the hydroxide containing zinc Zn are and a reaction precision is also high. There are such advantages that the productivity is improved owing to the reduction in processing time and the quality is improved. The pH of the solvent system constructed mainly by the water is determined in consideration of the costs of alkali which is used, or the like.

A temperature of the process dispersing system is, for example, equal to 40° C. or more, preferably, 60° C. or more, and more preferably, 80° C. or more. The larger the value of the temperature of the process dispersing system is, the better the uniformity of the coating of the hydroxide containing nickel Ni and/or manganese Mn is and a reaction speed is also high. There are such advantages that the productivity is improved owing to the reduction in processing time and the quality is improved. The value of the temperature of the process dispersing system is determined in consideration of the costs of the apparatus and the productivity. However, it is also possible to recommend to execute the processes at 100° C. or more by using an autoclave from a viewpoint of the improvement of the productivity due to the reduction in processing time owing to the improvement of the coating uniformity and the improvement of the reaction speed.

Further, in the first step, for example, it is also possible to construct in such a manner that in the solvent system constructed mainly by the water, the hydroxide containing nickel Ni and/or manganese Mn is formed on the surface of the composite oxide particle, thereafter, the hydroxide is extracted from the solvent system constructed mainly by the water and the coating of the hydroxide containing zinc Zn is performed. However, the embodiments are not limited to such a construction. For example, it is also possible to construct in such a manner that after the hydroxide containing nickel Ni and/or manganese Mn was formed on the surface of the composite oxide particle, it is not separated as it is from the solvent system constructed mainly by the water but the surface of the particle is coated with the hydroxide containing zinc Zn by adding the zinc compound to the solvent system.

Further, the pH of the solvent system constructed mainly by the water can be accomplished by dissolving alkali into the solvent system constructed mainly by the water. As alkali, for example, lithium hydroxide, sodium hydroxide, potassium hydroxide, and their mixture can be mentioned. Although the solvent system can be embodied by properly using those alkali, it is excellent to use lithium hydroxide from viewpoints of purity and performance of the cathode active material according to the sixth embodiment which is finally obtained. This is because if lithium hydroxide is used, the following effects are observed. When the composite oxide particle formed with the hydroxide containing nickel Ni and/or manganese Mn is taken out of the solvent system constructed mainly by the water, by controlling a deposition amount of the dispersing medium made of the solvent constructed mainly by the water, an amount of lithium of the cathode active material according to the sixth embodiment which is finally obtained can be controlled.

(Second Step)

In the second step, the composite oxide particle which has been coating-processed in the first step is separated from the solvent system constructed mainly by the water and, thereafter, heating-processed, thereby dehydrating the hydroxide. A coating layer made of an oxide containing lithium Li and a coating element of at least one of nickel Ni and manganese Mn and a surface layer made of an oxide containing zinc Zn are formed on the surface of the composite oxide particle. It is preferable that the heating process is executed in an oxidation atmosphere such as air, pure oxygen, or the like at temperatures of, for example, about 300° C. to 1000° C. In this instance, since the hydroxide containing nickel Ni and/or manganese Mn has been coated with the hydroxide containing zinc Zn, the sintering between the particles is suppressed and the binding of the particles is suppressed.

After the composite oxide particle which has been coating-processed in the first step was separated from the solvent system, if necessary, in order to adjust the lithium amount, it is also possible to impregnate an aqueous solution of the lithium compound into the composite oxide particle and, thereafter, execute the heating process.

As a lithium compound, for example, it is possible to use: an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate, lithium hydrogencarbonate, or the like; or an organic compound such as methyllithium, vinyllithium, isopropyl lithium, butyllithium, phenyllithium, lithium oxalate, lithium acetate, or the like.

After the baking, a particle size can be also adjusted as necessary by light pulverization, the classifying operation, or the like.

A non-aqueous electrolyte secondary battery using the cathode active material according to the sixth embodiment of the invention as mentioned above is similar to that in the foregoing first embodiment.

Seventh Embodiment

A cathode active material according to the seventh embodiment is constructed in such a manner that a coating layer made of an oxide containing lithium Li and a coating element of at least one of nickel Ni and manganese Mn is provided in at least a part of a composite oxide particle and a surface layer containing a tungsten W is provided in at least a part of the coating layer.

First, the reason why the cathode active material includes the above construction described below. Although the cathode active material constructed mainly by a lithium cobalt acid $LiCoO_2$ can realize the high charge voltage performance and the high energy density performance associated therewith, if the charge/discharge cycles at a high capacitance are repeated at the high charge voltage, the capacitance decreases largely. Since a cause for it depends on the surface of the cathode active material particle, necessity of a surface process of the cathode active material is pointed out.

Therefore, although various surface processes have been proposed, from a viewpoint of eliminating the decrease in capacitance per volume or weight or minimizing the decrease in capacitance, by executing the surface process by a material which can suppress the decrease in capacitance or contribute to the capacitance, the cathode active material in which the high charge voltage performance and the high energy density performance associated therewith can be realized and which is excellent in the charge/discharge cycle characteristics at the high charge voltage can be obtained.

By providing a coating layer made of an oxide containing lithium Li and a coating element of at least one of nickel Ni and manganese Mn for the cathode active material constructed mainly by the lithium cobalt acid $LiCoO_2$, the cathode active material which has the high charge voltage performance and the high energy density performance associated therewith and is excellent in the charge/discharge cycle characteristics at the high capacitance under the high charge voltage condition can be obtained although it is slightly poor in the high charge voltage performance and the high energy density performance associated therewith.

As a method of providing the coating layer for the composite oxide particle, the following methods can be proposed: a method whereby a compound of lithium Li and a compound of nickel Ni and/or a compound of manganese Mn are mixed in a dry manner as micro-pulverized particles with the composite oxide particle, the particle is coated and baked, and the coating layer made of the oxide containing lithium Li and the coating element of at least one of nickel Ni and manganese Mn is formed on the surface of the composite oxide particle; and a method whereby the compound of lithium Li and the compound of nickel Ni and/or the compound of manganese Mn are dissolved or mixed into a solvent, the particle is coated and baked in a wet manner and the coating layer made of the oxide containing lithium Li and the coating element of at least one of nickel Ni and manganese Mn is formed on the surface of the composite oxide particle. However, according to those methods, such a result that it is difficult to accomplish the coating of high uniformity is obtained.

By coating the surface of the particle with nickel Ni and/or manganese Mn as a hydroxide, heat-dehydrating it, and forming the coating layer, the coating of high uniformity can be realized. According to such a coating process, the compound of nickel Ni and/or the compound of manganese Mn is dissolved into a solvent system constructed mainly by the water. Thereafter, the composite oxide particle is dispersed into the solvent system. A basicity of a dispersing system is raised by adding a base to such a dispersing system or by another method. The hydroxide containing nickel Ni and/or manganese Mn is precipitated to the surface of the composite oxide particle.

The uniformity of the coating onto the composite oxide particle can be further improved by executing the coating process in the solvent system constructed mainly by the water whose pH is equal to 12 or more. In other words, the metal composite oxide particle is preliminarily dispersed into the solvent system constructed mainly by the water whose pH is equal to 12 or more. The compound of nickel Ni and/or the compound of manganese Mn is added to the solvent system. The surface of the metal composite oxide particle is coated with the hydroxide containing nickel Ni and/or manganese Mn.

The composite oxide particle coated with the hydroxide containing nickel Ni and/or manganese Mn by the coating process is heat-dehydrated, thereby forming the coating layer onto the surface of the composite oxide particle. Thus, the uniformity of the coating onto the surface of the composite oxide particle can be improved.

In the steps of coating the surface of the composite oxide particle with the hydroxide containing nickel Ni and/or manganese Mn and cleaning, dehydrating, and drying the composite oxide particle in order to bake it, the particles are bound through the hydroxide containing nickel Ni and/or manganese Mn on the surface. If the particles are broken, a peel-off of an interference of the hydroxide containing nickel Ni and/or manganese Mn whose adhesion is relatively weak and the composite oxide particle occurs or a cohesive failure of the hydroxide containing nickel Ni and/or manganese Mn whose cohesion is weak occurs. In association with it, the improvement of the characteristics of the cathode active material is deteriorated due to the creation of the coating layer.

If the baking in which lithium Li has been added is progressed while keeping the binding of the particles as it is or in the state where the particles having the hydroxide containing nickel Ni and/or manganese Mn are come into contact with the surface, there is such a tendency that the sintering between the particles is liable to be progressed.

If the sintering between the particles is progressed, there is a problem as described below. Upon creation of the cathode, it is necessary to increase an amount of mechanical energy which is applied in the breakage of the particles that is performed to uniformly mix the composite oxide particle with the binder and the carbon particle serving as a conductive material. In association with it, the cathode active material formed by the composite oxide particles having the coating layer is damaged or broken, so that a total defect amount as powder increases.

The damage or breakdown occurs in a form of a disconnection of a coupling portion of the sintered particles, a creation of a crack in the particle, a crushing of the particle itself, a peel-off of the coating layer, or the like. Particularly, in the composite oxide particle having the coating layer, as compared with the particle of the cathode active material or the like constructed mainly by the lithium cobalt acid $LiCoO_2$, there is such a tendency that the surface shape of the particle is not smooth and it has the coarse surface. Therefore, when the particle receives an external force, it is considered that a slip between the particles is not smooth, the external force is easily concentrated on a local position, and the cathode active material is easily damaged or broken.

Thus, the surface to which the coating layer is not provided is exposed. That is, the surface which does not contribute to the improvement of the charge/discharge cycle characteristics and to which the coating layer is not provided and the active new surface are exposed. Therefore, the charge/discharge cycle characteristics of the high capacitance under the high charge voltage condition deteriorate. As is well known, the exposed surface is active and has a high surface energy. Thus, a decomposition reaction of the electrolytic solution and the activity of the elution of the surface are extremely higher than those of the surface formed by the ordinary baking.

The surface of the composite oxide particle coated with the hydroxide containing nickel Ni and/or manganese Mn is further coated with a tungstic acid, thereby enabling the progress of the sintering to be improved. The damage or breakdown of the particle can be decreased in association with it. The composite oxide particle, coating layer, and surface layer is described below.

[Composite Oxide]

The composite oxide particle contains at least lithium Li and cobalt Co and it is preferable that its mean compositions are expressed by, for example, Formula 1. By using such a composite oxide particle, the high capacitance and high discharge electric potential can be obtained.

$$Li_{(1+x)}Co_{(1-y)}M_yO_{(2-x)}$$ 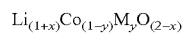 (Formula 1)

in Formula 1, M denotes an element of at least one kind selected from a group containing magnesium Mg, aluminum Al, boron B, titanium, vanadium V, chromium Cr, manganese Mn, iron Fe, nickel Ni, copper Cu, zinc Zn, molybdenum Mo, tin Sn, and tungsten W; x indicates a value within a range of $-0.10 \leq x \leq 0.0$; y indicates a value within a range of $0 \leq y \leq 0.50$; and z indicates a value within a range of $-0.10 \leq z \leq 0.20$.

In Formula 1, the range of x is, for example, $-0.10 \leq x \leq 0.10$, preferably, $-0.08 \leq x \leq 0.08$, and more preferably, $-0.06 \leq x \leq 0.06$. If x decreases to a value under such a range, the discharge capacitance decreases. If x increases to a value over such a range, the elements are diffused out of the particle, become an obstacle to control of basicity in a next processing step, and finally, become a cause of obstructing the promotion of a gel creation during the kneading of a cathode paste.

The range of y is, for example, $0 \leq y \leq 0.50$, preferably, $0 \leq y \leq 0.40$, and more preferably, $0 \leq y \leq 0.30$. If y increases to a value over such a range, the high charge voltage performance held by $LiCoO_2$ and the high energy density performance associated therewith are deteriorated.

The range of z is, for example, $-0.10 \leq z \leq 0.20$, preferably, $-0.08 \leq z \leq 0.18$, and more preferably, $-0.06 \leq z \leq 0.16$. If z decreases to a value under such a range and if z increases to a value over such a range, there is such a tendency that the discharge capacitance decreases.

As for the composite oxide particle, a material which can be ordinarily obtained as a cathode active material can be used as a starting raw material. However, according to circumstances, after a secondary particle was broken by using a ball mill, a grinding machine, or the like, it can be used.

[Coating Layer]

A coating layer is provided in at least a part of the composite oxide particle and includes an oxide containing lithium Li and a coating element of at least one of nickel Ni and manganese Mn. By providing the coating layer, the high charge voltage performance and the high energy density performance associated therewith can be realized and the charge/discharge cycle characteristics at the high capacitance under the high charge voltage condition can be improved.

It is preferable that a construction ratio of nickel Ni and manganese Mn in the coating layer ranges from 100:0 to 30:70 as a mole ratio. It is more preferable that it ranges from 100:0 to 40:60. This is because if an amount of manganese Mn increases to a value over such a range, doping performance of lithium Li deteriorates and, finally, it becomes a factor of a decrease in capacitance of the cathode active material and an increase in electric resistance when such a material is used for a battery. The range of the construction ratio of nickel Ni and manganese Mn is a range showing a larger validity adapted to suppress the progress of sintering between the particles in the baking of a precursor added with lithium Li.

Nickel Ni and manganese Mn in the oxide of the coating layer can be replaced by a metal element (metal elements) of at least one or more kinds selected from a group containing magnesium Mg, aluminum Al, boron B, titanium, vanadium V, chromium Cr, iron Fe, cobalt Co, copper Cu, zinc Zn, tin Sn, and tungsten W.

Thus, stability of the cathode active material can be improved and diffusibility of lithium ions can be improved. A replacement amount of the selected metal element is, for example, equal to or less than 40 mol % of a total amount of nickel Ni and manganese Mn in the oxide of the coating layer, preferably, 30 mol % or less and, more preferably, 20 mol % or less. This is because if the replacement amount of the selected metal element increases to a value over such a range, the doping performance of lithium Li deteriorates and the capacitance of the cathode active material decreases.

An amount of coating layer lies, for example, within a range from 0.5 weight % to 50 weight % of the composite oxide particle, preferably, a range from 1.0 weight % to 40 weight %, more preferably, a range from 2.0 weight % to 35 weight %. This is because if the coating weight of the metal oxide increases to a value over such a range, the capacitance of the cathode active material decreases. This is also because if the coating weight of the metal oxide decreases to a value under such a range, the stability of the cathode active material deteriorates.

[Surface Layer]

The surface layer is provided in at least a part of the coating layer and contains tungsten W.

A mean diameter of the particle in the cathode active material preferably ranges from 2.0 μm to 50 μm. This is because if the mean diameter is less than 2.0 μm, when the cathode active material is pressed upon manufacturing of the cathode, it is peeled off and a surface area of the active material increases, so that it is necessary to increase addition amounts of a conductive material and a binder, and there is such a tendency that an energy density per unit weight decreases. This is also because if the mean diameter exceeds 50 μm, the particle pierces a separator and there is such a tendency that a short-circuit is caused.

[Manufacturing Method of Cathode Active Material]

Subsequently, a manufacturing method of the cathode active material according to the seventh embodiment is described below. The manufacturing method of the cathode active material according to the seventh embodiment of the invention can be roughly classified into: a first step of forming a layer made of a hydroxide containing nickel Ni and/or manganese Mn into at least a part of the composite oxide particle and, thereafter, coating at least a part of the composite oxide particle with a tungstic acid; and a second step of executing a heating process after coating with the tungstic acid, thereby forming a coating layer made of an oxide containing lithium Li and a coating element of at least one of nickel Ni and manganese Mn and a surface layer containing tungsten W into at least a part of the composite oxide particle.

(First Step)

In the first step, a coating process of the hydroxide containing nickel Ni and/or manganese Mn and the tungstic acid is executed. In the first step, for example, first, the composite oxide particle is dispersed into a solvent system constructed mainly by the water in which a compound of nickel Ni and/or a compound of manganese Mn have been dissolved, a basicity of the dispersing system is raised by adding a base into the dispersing system, or the like, and the hydroxide containing nickel Ni and/or manganese Mn is precipitated to the surface of the composite oxide particle. It is also possible to use a method whereby the composite oxide particle is dispersed into the solvent constructed mainly by basic water, subsequently, the compound of nickel Ni and/or the compound of manganese Mn is added to the aqueous solution, and the hydroxide containing nickel Ni and/or manganese Mn is precipitated.

As for a raw material of the coating process of the hydroxide containing nickel Ni, as a nickel compound, for example, it is possible to use: an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate, nickel thiocyanate, or the like; or an organic compound such as nickel oxalate, nickel acetate, or the like. One, two, or more kinds of them may be used.

As for a raw material of the coating process of the hydroxide containing manganese Mn, as a manganese compound, for example, it is possible to use: an inorganic compound such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrogensulfide, manganese sulfate, manganese hydrogensulfate, manganese thiocyanate, manganese nitrite, manganese phosphate, manganese dihydrogenphosphate, manganese hydrogencarbonate, or the like; or an organic compound such as manganese oxalate, manganese acetate, or the like. One, two, or more kinds of them may be used.

A value of pH of the solvent system constructed mainly by the water mentioned above is, for example, equal to 12 or more, preferably, 13 or more, and more preferably, 14 or more. The larger the value of pH of the solvent system constructed mainly by the water mentioned above is, the better the uniformity of the coating of the hydroxide containing nickel Ni and/or manganese Mn is and a reaction precision is also high. There are such advantages that the productivity is improved owing to the reduction in processing time and the quality is improved. The pH of the solvent system constructed mainly by the water is determined in consideration of the costs of alkali which is used, or the like.

A temperature of the process dispersing system is, for example, equal to 40° C. or more, preferably, 60° C. or more, and more preferably, 80° C. or more. The larger the value of the temperature of the process dispersing system is, the better the uniformity of the coating of the hydroxide containing nickel Ni and/or manganese Mn is and a reaction speed is also high. There are such advantages that the productivity is improved owing to the reduction in processing time and the quality is improved. The value of the temperature of the process dispersing system is determined in consideration of the costs of the apparatus and the productivity. However, it is also possible to recommend to execute the processes at 100° C. or more by using an autoclave from a viewpoint of the improvement of the productivity due to the reduction in processing time owing to the improvement of the coating uniformity and the improvement of the reaction speed.

Further, the pH of the solvent system constructed mainly by the water can be accomplished by dissolving alkali into the solvent system constructed mainly by the water. As alkali, for example, lithium hydroxide, sodium hydroxide, potassium hydroxide, and their mixture can be mentioned. Although the solvent system can be embodied by properly using those alkali, it is excellent to use lithium hydroxide from viewpoints of purity and performance of the cathode active material according to the seventh embodiment which is finally obtained. This is because if lithium hydroxide is used, the following advantages are obtained. When the composite oxide particle formed with the hydroxide containing nickel Ni and/or manganese Mn is taken out of the solvent system constructed mainly by the water, by controlling a deposition amount of the dispersing medium made of the solvent constructed mainly by the water, an amount of lithium of the cathode active material according to the seventh embodiment which is finally obtained can be controlled.

Subsequently, at least a part of the composite oxide particle formed with a layer made of the hydroxide containing nickel Ni and/or manganese Mn is coated with a tungstic acid. It is effective to execute the coating process of the tungstic acid in the state where the composite oxide particle formed with the layer made of the hydroxide containing nickel Ni and/or manganese Mn has been suspended into the solvent system constructed mainly by the water in which the hydroxide containing nickel Ni and/or manganese Mn had been coating-processed. Thus, at a stage of dehydrating and drying the composite oxide particle formed with the layer made of the hydroxide containing nickel Ni and/or manganese Mn, such a situation that the particles are bound through the hydroxide containing nickel Ni and/or manganese Mn on the surface can be suppressed.

It is preferably effective to execute the coating process of the tungstic acid at a cleaning stage after the coating process of the hydroxide containing nickel Ni and/or manganese Mn. Thus, a leakage of the tungstic acid added to the suspending system can be prevented and adsorption can be improved. Further, by executing the coating process of the tungstic acid, a particle cohesion promoting effect which is not accompanied with the binding of the particles can be obtained in the suspending system. The cleaning operation and the collecting operation of the particles from the dispersing medium can be easily executed.

As a raw material of a tungstate compound which can be used for the coating process, for example, ammonium tungstate, potassium tungstate, sodium tungstate, lithium tungstate, a tungstic acid, tungstate anhydride, or the like can be mentioned. One, two, or more kinds of them may be used.

A coating weight of the tungstic acid ranges, for example, from 0.00001 weight % to 1.0 weight % for a weight of the composite oxide particle, preferably, it ranges from 0.0001 weight % to 0.1 weight %. If the coating weight of the tungstic acid increases to a value over such a range, the capacitance of the cathode active material decreases. If the coating weight of the tungstic acid decreases to a value under such a range, the stability of the cathode active material deteriorates.

(Second Step)

In the second step, the composite oxide particle which has been coating-processed in the first step is separated from the solvent system constructed mainly by the water and, thereafter, heating-processed, thereby dehydrating the hydroxide. A coating layer made of an oxide containing lithium Li and a coating element of at least one of nickel Ni and manganese Mn and a surface layer containing tungsten W are formed on the surface of the composite oxide particle. It is preferable that the heating process is executed in an oxidation atmosphere such as air, pure oxygen, or the like at temperatures of, for example, about 300° C. to 1000° C. In this instance, since the hydroxide containing nickel Ni and/or manganese Mn has been coated with the tungstic acid, the sintering between the particles is suppressed and the binding of the particles is suppressed.

After the composite oxide particle which has been coating-processed in the first step was separated from the solvent system, if necessary, in order to adjust the lithium amount, it is also possible to impregnate an aqueous solution of the lithium compound into the composite oxide particle and, thereafter, execute the heating process.

As a lithium compound, for example, it is possible to use: an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate, lithium hydrogencarbonate, or the like; or an organic compound such as methyllithium, vinyllithium, isopropyl lithium, butyllithium, phenyllithium, lithium oxalate, lithium acetate, or the like. One, two, or more kinds of them may be used.

After the baking, a particle size can be also adjusted as necessary by light pulverization, the classifying operation, or the like.

A non-aqueous electrolyte secondary battery using the cathode active material according to the seventh embodiment as mentioned above is similar to that in the foregoing first embodiment.

Eighth Embodiment

A cathode active material for a non-aqueous electrolyte secondary battery (hereinbelow, properly referred to as a cathode active material) according to the eighth embodiment of the invention is constructed in such a manner that a coating layer made of an oxide containing lithium Li and a coating element of at least one of nickel Ni and manganese Mn is provided in at least a part of a composite oxide particle and a surface layer made of an oxide of an element of at least one kind of silicon Si, aluminum Al, titanium, and zirconium Zr is provided in at least a part of the coating layer.

First, the reason why the cathode active material includes the above construction will be described. Although the cathode active material constructed mainly by a lithium cobalt acid $LiCoO_2$ can realize the high charge voltage performance and the high energy density performance associated therewith, if the charge/discharge cycles at a high capacitance are repeated at the high charge voltage, the capacitance decreases largely. Since a cause for it depends on the surface of the cathode active material particle, necessity of a surface process of the cathode active material is pointed out.

Therefore, although various surface processes have been proposed, from a viewpoint of eliminating the decrease in capacitance per volume or weight or minimizing the decrease in capacitance, by executing the surface process by a material which can suppress the decrease in capacitance or contribute to the capacitance, the cathode active material in which the high charge voltage performance and the high energy density performance associated therewith can be realized and which is excellent in the charge/discharge cycle characteristics at the high charge voltage can be obtained.

Therefore, the present inventors et al. vigorously examined, so that they have found out the following points. By providing a coating layer made of an oxide containing lithium Li and a coating element of at least one of nickel Ni and manganese Mn for the cathode active material constructed mainly by the lithium cobalt acid $LiCoO_2$, the cathode active material which has the high charge voltage performance and the high energy density performance associated therewith and is excellent in the charge/discharge cycle characteristics at the high capacitance under the high charge voltage condition can be obtained although it is slightly poor in the high charge voltage performance and the high energy density performance associated therewith.

As a method of providing the coating layer for the composite oxide particle, the following method can be proposed. A compound of lithium Li and a compound of nickel Ni and/or a compound of manganese Mn are micro-pulverized to thereby form micro-particles. By mixing the micro-particles and the composite oxide particle in a dry manner, the surface of the composite oxide particle is coated with the micro-particles and baked. The coating layer made of the oxide containing lithium Li and the coating element of at least one of nickel Ni and manganese Mn is formed on the surface of the composite oxide particle. It is also possible to use the following method.

The compound of lithium Li and the compound of nickel Ni and/or the compound of manganese Mn are dissolved or mixed into a solvent, the surface of the composite oxide particle is coated with the compounds in a wet manner, and they are baked after that. The coating layer made of the oxide containing lithium Li and the coating element of at least one of nickel Ni and manganese Mn is formed on the surface of the composite oxide particle. However, according to those methods, such a result that it is difficult to accomplish the coating of high uniformity is obtained.

By coating the surface of the particle with nickel Ni and/or manganese Mn as a hydroxide, heat-dehydrating it, and forming the coating layer, the coating of high uniformity can be realized. According to such a coating process, the compound of nickel Ni and/or the compound of manganese Mn is dissolved into a solvent system constructed mainly by the water. Thereafter, the composite oxide particle is dispersed into the solvent system. A basicity of a dispersing system is raised by adding a base to such a dispersing system or by another method. The hydroxide containing nickel Ni and/or manganese Mn is precipitated to the surface of the composite oxide particle.

The uniformity of the coating onto the composite oxide particle can be further improved by executing the coating process in the solvent system constructed mainly by the water whose pH is equal to 12 or more. In other words, the metal composite oxide particle is preliminarily dispersed into the solvent system constructed mainly by the water whose pH is equal to 12 or more. The compound of nickel Ni and/or the compound of manganese Mn is added to the solvent system. The surface of the metal composite oxide particle is coated with the hydroxide containing nickel Ni and/or manganese Mn.

The composite oxide particle coated with the hydroxide containing nickel Ni and/or manganese Mn by the coating process is heat-dehydrated, thereby forming the coating layer onto the surface of the composite oxide particle. Thus, the uniformity of the coating onto the surface of the composite oxide particle can be improved.

In the composite oxide particle coated with the hydroxide containing nickel Ni and/or manganese Mn, when a ratio of nickel Ni increases and a ratio of manganese Mn decreases, upon baking of the precursor to which lithium Li has been added, the sintering between the particles is liable to progress.

If the sintering between the particles is progressed, a problem as described below occurs. Upon creation of the cathode, it is necessary to increase an amount of mechanical energy which is applied in the breakage of the particles that is performed to uniformly mix the particle with the binder and the carbon particle serving as a conductive material. In association with it, the cathode active material formed by the composite oxide particles having the coating layer is damaged or broken, so that a total defect amount as powder increases.

The damage or breakdown occurs in a form of a disconnection of a coupling portion of the sintered particles, a creation of a crack in the particle, a crushing of the particle itself, a peel-off of the coating layer, or the like. Particularly, in the composite oxide particle having the coating layer, as compared with the particle of the cathode active material or the like constructed mainly by the lithium cobalt acid $LiCoO_2$, there is such a tendency that the surface shape of the particle is not smooth and it has the coarse surface. Therefore, when the particle receives an external force, it is considered that a slip between the particles is not smooth, the external force is easily concentrated on a local position, and the cathode active material is easily damaged or broken.

Thus, the surface to which the coating layer is not provided is exposed. That is, the surface which does not contribute to the improvement of the charge/discharge cycle characteristics and to which the coating layer is not provided and the active new surface are exposed. Therefore, the charge/discharge cycle characteristics of the high capacitance under the high charge voltage condition deteriorate. As is well known, the exposed surface is active and has a high surface energy. Thus, a decomposition reaction of the electrolytic solution and the activity of the elution of the surface are much higher than those of the surface formed by the ordinary baking.

For the purpose of improving the deterioration of the function of the cathode based on the sintering between the particles and improving a manufacturing process, the surface of the composite oxide particle coated with the hydroxide containing nickel Ni and/or manganese Mn is further coated with the hydroxide containing at least one kind of silicon Si, aluminum Al, titanium, and zirconium Zr, thereby enabling the progress of the sintering to be improved. In association with it, the damage or breakage of the particle can be reduced. A surface layer made of the metal oxide micro-particles is provided, thereby preventing nickel Ni and/or manganese Mn constructing the coating layer from being solute in the composite oxide particle. Nickel Ni and/or manganese Mn are held in the surface of the composite oxide particle and the coating effect is enhanced, so that the cycle maintaining ratio is also improved eventually.

The composite oxide particle, coating layer, and surface layer is described below.

[Composite Oxide Particle]

The composite oxide particle contains at least lithium Li and cobalt Co and it is preferable that its mean compositions are expressed by, for example, Formula 2 or 3. By using such a composite oxide particle, the high capacitance and high discharge electric potential can be obtained.

  (Formula 2)

in Formula 2, Ma denotes an element of at least one kind selected from a group containing bismuth Bi and gallium Ga; Mb denotes an element of at least one kind selected from a group containing vanadium V, chromium Cr, boron B, manganese Mn, iron Fe, nickel Ni, copper Cu, zinc Zn, aluminum Al, magnesium Mg, titanium, zirconium Zr, molybdenum Mo, tin Sn, calcium Ca, strontium Sr, yttrium Y, and tungsten W; w indicates a value within a range of $-0.10 \leq w \leq 0.10$; x indicates a value within a range of $0.001 \leq x \leq 0.10$; y indicates a value within a range of $0 \leq y \leq 0.40$; and z indicates a value within a range of $-0.10 \leq z \leq 0.20$, and

  (Formula 3)

in Formula 3, Mc denotes an element of at least one kind selected from a group containing magnesium Mg, aluminum Al, titanium, and zirconium Zr; Md denotes an element of at least one kind selected from a group containing vanadium V, chromium Cr, boron B, manganese Mn, iron Fe, nickel Ni, copper Cu, zinc Zn, molybdenum Mo, tin Sn, calcium Ca, strontium Sr, yttrium Y, and tungsten W; w indicates a value within a range of $-0.10 \leq w \leq 0.10$; x indicates a value within a range of $0.001 \leq x \leq 0.10$; y indicates a value within a range of $0 \leq y \leq 0.40$; and z indicates a value within a range of $-0.10 \leq z \leq 0.20$.

In Formulae 2 and 3, the range of w is, for example, $-0.10 \leq w \leq 0.10$, preferably, $-0.08 \leq w \leq 0.08$, and more preferably, $-0.06 \leq w \leq 0.06$. If w decreases to a value under such a range, the discharge capacitance decreases. If w increases to a value over such a range, the elements are diffused out of the particle, become an obstacle to control of basicity in a next processing step, and finally, become a cause of obstructing the promotion of a gel creation during the kneading of a cathode paste.

The range of x is, for example, $0.001 \leq x \leq 0.10$, preferably, $0.002 \leq x \leq 0.08$, and more preferably, $0.003 \leq x \leq 0.06$. If x decreases to a value under such a range, when the non-aqueous electrolyte secondary battery is finally manufactured, the charge/discharge cycle characteristics at the high capacitance under the high charge voltage condition deteriorate due to factors which are caused in the processing steps until the cathode is manufactured and the battery is manufactured. If x increases to a value over such a range, there is such a tendency that the discharge capacitance decreases.

The range of y is, for example, $0 \leq y \leq 0.40$, preferably, $0 \leq y \leq 0.30$, and more preferably, $0 \leq y \leq 0.20$. If y increases to a value over such a range, the high charge voltage performance held by $LiCoO_2$ and the high energy density performance associated therewith are deteriorated.

The range of z is, for example, $-0.10 \leq z \leq 0.20$, preferably, $-0.08 \leq z \leq 0.18$, and more preferably, $-0.06 \leq z \leq 0.16$. If z decreases to a value under such a range and if z increases to a value over such a range, there is such a tendency that the discharge capacitance decreases.

It is preferable that the addition amount x of bismuth Bi or gallium Ga which is used as Ma in Formula 2 is smaller than the addition amount y of Mb in Formula. This is because bismuth Bi or gallium Ga is hard to be solute in lithium cobalt acid as compared with Mb.

Although bismuth Bi or gallium Ga in Formula 2 and magnesium Mg, aluminum Al, titanium, and zirconium Zr in Formula 3 can exist so as to have a concentration gradation in the composite oxide particle, it is preferable that they are solute so that the concentration becomes almost uniform.

As for the composite oxide particle, a material which can be ordinarily obtained as a cathode active material can be used as a starting raw material. However, according to circumstances, after a secondary particle was broken by using a ball mill, a grinding machine, or the like, it can be used.

[Coating Layer]

A coating layer is provided in at least a part of the composite oxide particle and includes an oxide containing lithium Li and a coating element of at least one of nickel Ni and manganese Mn. By providing the coating layer, the high charge voltage performance and the high energy density performance associated therewith can be realized and the charge/discharge cycle characteristics under the high charge voltage condition can be improved.

It is preferable that a construction ratio of nickel Ni and manganese Mn in the coating layer ranges from 100:0 to 30:70 as a mole ratio. It is more preferable that it ranges from 100:0 to 40:60. This is because if an amount of manganese Mn increases to a value over such a range, doping performance of lithium Li deteriorates and, finally, it becomes a factor of a decrease in capacitance of the cathode active material and an increase in electric resistance when such a material is used for a battery. The range of the construction ratio of nickel Ni and manganese Mn is a range showing a larger validity adapted to suppress the progress of sintering between the particles in the baking of a precursor added with lithium Li.

Nickel Ni and manganese Mn in the oxide of the coating layer can be replaced by a metal element of at least one kind selected from a group containing magnesium Mg, aluminum Al, boron B, titanium, vanadium V, chromium Cr, iron Fe, cobalt Co, copper Cu, zinc Zn, molybdenum Mo, tin Sn, calcium Ca, strontium Sr, tungsten W, yttrium Y, and zirconium Zr.

Thus, stability of the cathode active material can be improved and diffusibility of lithium ions can be improved. A replacement amount of the selected metal element is, for example, equal to or less than 40 mol % of a total amount of nickel Ni and manganese Mn in the oxide of the coating layer, preferably, 30 mol % or less and, more preferably, 20 mol % or less. This is because if the replacement amount of the selected metal element increases to a value over such a range, the doping performance of lithium Li deteriorates and the capacitance of the cathode active material decreases.

An amount of coating layer lies, for example, within a range from 0.5 mol % or more to 50 mol % or less for the number of moles of the composite oxide particle, preferably, a range from 1.0 mol % or more to 40 mol % or less, more preferably, a range from 2.0 mol % or more to 30 mol % or less. This is because if the coating weight of the metal oxide increases to a value over such a range, the capacitance of the cathode active material decreases. This is also because if the coating weight of the metal oxide decreases to a value under such a range, the stability of the cathode active material deteriorates.

[Surface Layer]

The surface layer is provided in at least a part of the coating layer and includes an oxide of an element of at least one kind of silicon Si, aluminum Al, titanium, and zirconium Zr.

As for the metal oxide micro-particle which is made of an oxide of an element of at least one kind of silicon Si, aluminum Al, titanium, and zirconium Zr and is used in the invention, a primary mean diameter ranges from 1.0 nm or more to 100 nm or less, preferably, a range from 2.0 nm or more to 80 nm or less, and more preferably, a range from 5.0 nm or more to 50 nm or less. This is because if the primary mean diameter of the metal oxide micro-particle increases to a value over such a range, the adhesion of the metal oxide micro-particle to the composite oxide particle with the coating layer deteriorates. If the primary mean diameter of the metal oxide micro-particle decreases to a value under such a range, the effect of suppressing the sintering between the particles is hard to be obtained.

As for an amount in surface layer, the amount of the metal oxide particle lies, for example, within a range from 0.01 mol % or more to 10 mol % or less for the metal element of the composite oxide particle, preferably, a range from 0.03 mol % or more to 8.0 mol % or less, more preferably, a range from 0.05 mol % or more to 5.0 mol % or less. If the amount of surface layer increases to a value over such a range, there is such a tendency that the discharge capacitance decreases. If the amount of surface layer decreases to a value under such a range, there is such a tendency that the effect of preventing the sintering between the particles and the effect of improving the charge/discharge cycle characteristics associated therewith deteriorate.

As for the amount of surface layer, for example, as a coating amount of silicon Si, aluminum Al, titanium, and zirconium Zr, an amount of at least one kind of silicon Si ions, aluminum Al ions, titanium ions, and zirconium Zr ions per surface area of 1m$^2$ of the coating surface ranges from $1.0 \times 10^{-5}$ mol or more to $1.0 \times 10^{-2}$ mol or less, preferably, a range from $3.0 \times 10^{-5}$ mol or more to $5.0 \times 10^{-3}$ mol or less, more preferably, a range from $1.0 \times 10^{-4}$ mol or more to $1.0 \times 10^{-3}$ mol or less. If the amount of surface layer increases to a value over such a range, a diffusion resistance of lithium ions increases and the capacitance of the final cathode active material of the invention decreases. On the other hand, if the amount in the surface layer decreases to a value under such a range, there is such a tendency that the preventing effect of the sintering between the particles and the improving effect of the charge/discharge cycle characteristics associated therewith deteriorate.

A mean diameter of the particle in the cathode active material constructed as mentioned above preferably ranges from 2.0 µm or more to 50 µm or less. This is because if the mean diameter is less than 2.0 µm, when the cathode active material is pressed upon manufacturing of the cathode, it is peeled off and a surface area of the active material increases, so that it is necessary to increase addition amounts of a conductive material and a binder, and there is such a tendency that an energy density per unit weight decreases. This is also because if the mean diameter exceeds 50 µm, the particle pierces a separator and there is such a tendency that a short-circuit is caused.

[Manufacturing Method of Cathode Active Material]

Subsequently, a manufacturing method of the cathode active material according to the eighth embodiment is described below. The first manufacturing method and the second manufacturing method described below.

<First Manufacturing Method>

The first manufacturing method of the cathode active material according to the eighth embodiment can be roughly classified into: a first step of forming a layer made of a hydroxide containing nickel Ni and/or manganese Mn into at least a part of the composite oxide particle and, thereafter, forming a layer made of a hydroxide containing at least one kind of silicon Si, aluminum Al, titanium, and zirconium Zr into at least a part of the composite oxide particle; and a second step of executing a heating process after forming the hydroxide containing at least one kind of silicon Si, aluminum Al, titanium, and zirconium Zr, thereby forming a coating layer made of an oxide containing lithium Li and a coating element of at least one of nickel Ni and manganese Mn and a surface layer made of an oxide containing at least one kind of silicon Si, aluminum Al, titanium, and zirconium Zr into at least a part of the composite oxide particle.

(First Step)

In the first step, a coating process of the hydroxide containing nickel Ni and/or manganese Mn and the hydroxide containing at least one kind of silicon Si, aluminum Al, titanium, and zirconium Zr is executed. In the first step, for example, first, the composite oxide particle is dispersed into a solvent system constructed mainly by the water in which a compound of nickel Ni and/or a compound of manganese Mn have been dissolved, a basicity of the dispersing system is raised by adding a base into the dispersing system, or the like, and the hydroxide containing nickel Ni and/or manganese Mn is precipitated to the surface of the composite oxide particle. It is also possible to use a method whereby the composite oxide particle is dispersed into the solvent constructed mainly by basic water, subsequently, the compound of nickel Ni and/or the compound of manganese Mn is added to the aqueous solution, and the hydroxide containing nickel Ni and/or manganese Mn is precipitated.

As for a raw material of the coating process of the hydroxide containing nickel Ni, as a nickel compound, it is possible to use: an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate, nickel thiocyanate, or the like; or an organic compound such as nickel oxalate, nickel acetate, or the like. One, two, or more kinds of them may be used.

As for a raw material of the coating process of the hydroxide containing manganese Mn, as a manganese compound, it is possible to use: an inorganic compound such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrogensulfide, manganese sulfate, manganese hydrogensulfate, manganese thiocyanate, manganese nitrite, manganese phosphate, manganese dihydrogenphosphate, manganese hydrogencarbonate, or the like; or an organic compound such as manganese oxalate, manganese acetate, or the like. One, two, or more kinds of them may be used.

Subsequently, the surface of the composite oxide particle coated with the hydroxide containing nickel Ni and/or manganese Mn is coated with the hydroxide containing at least one kind of silicon Si, aluminum Al, titanium, and zirconium Zr. The coating of the hydroxide containing at least one kind of silicon Si, aluminum Al, titanium, and zirconium Zr can be performed in a manner similar to the coating of the hydroxide containing nickel Ni and/or manganese Mn. That is, the composite oxide particle coated with the hydroxide containing nickel Ni and/or manganese Mn is dispersed into the solvent system constructed mainly by the water into which the compound containing at least one kind of silicon Si, aluminum Al, titanium, and zirconium Zr has been dissolved. The basicity of the dispersing system is raised by adding a base into the dispersing system, or the like, and the hydroxide containing at least one kind of silicon Si, aluminum Al, titanium, and zirconium Zr is precipitated. It is also possible to use a method whereby the composite oxide particle coated with the hydroxide containing nickel Ni and/or manganese Mn is dispersed into the solvent constructed mainly by the basic water, thereafter, the compound containing at least one kind of silicon Si, aluminum Al, titanium, and zirconium Zr is added to the aqueous solution, and the hydroxide is precipitated.

For example, the following compounds can be used as a raw material of the coating process of the hydroxide containing at least one kind of silicon Si, aluminum Al, titanium, and zirconium Zr.

As a silicon compound, hexafluorosilicic acid or ammonium hexafluorosilicate can be used. One, two, or more kinds of them may be used.

Sodium aluminate, potassium aluminate, aluminum oxalate, aluminum nitrate, ammonium sulfate, and aluminum phosphate can be used as an aluminum compound. One, two, or more kinds of them may be used.

Titanium trichloride, titanium tetrachloride, or titanium sulfate can be used as a titanium compound. One, two, or more kinds of them may be used.

Zirconium oxychloride octohydrate and zirconium nitrate can be used as a zirconium compound. One, two, or more kinds of them may be used.

In the first step, a value of pH of the solvent system constructed mainly by the water mentioned above is, for example, equal to 12 or more, preferably, 13 or more, and more preferably, 14 or more. The larger the value of pH of the solvent system constructed mainly by the water mentioned above is, the better the uniformity of the coating of the hydroxide containing nickel Ni and/or manganese Mn is and a reaction precision is also high. There are such advantages that the productivity is improved owing to the reduction in processing time and the quality is improved. The pH of the solvent system constructed mainly by the water is determined in consideration of the costs of alkali which is used, or the like.

A temperature of the process dispersing system is, for example, equal to 40° C. or more, preferably, 60° C. or more, and more preferably, 80° C. or more. The larger the value of the temperature of the process dispersing system is, the better the uniformity of the coating of the hydroxide containing nickel Ni and/or manganese Mn is and a reaction speed is also high. There are such advantages that the productivity is improved owing to the reduction in processing time and the quality is improved. The value of the temperature of the process dispersing system is determined in consideration of the costs of the apparatus and the productivity. However, it is also possible to recommend to execute the processes at 100° C. or more by using an autoclave from a viewpoint of the improvement of the productivity due to the reduction in processing time owing to the improvement of the coating uniformity and the improvement of the reaction speed.

Further, in the first step, for example, it is also possible to construct in such a manner that in the solvent system constructed mainly by the water, the hydroxide containing nickel Ni and/or manganese Mn is formed on the surface of the composite oxide particle, thereafter, the hydroxide is extracted from the solvent system constructed mainly by the water and the coating of the hydroxide containing at least one kind of silicon Si, aluminum Al, titanium, and zirconium Zr is performed. However, the embodiments are not limited to such a construction. For example, it is also possible to construct in such a manner that after the hydroxide containing nickel Ni and/or manganese Mn was formed on the surface of the composite oxide particle, it is not separated as it is from the solvent system constructed mainly by the water but the surface of the particle is coated with the hydroxide containing at least one kind of silicon Si, aluminum Al, titanium, and zirconium Zr by adding the compound made of silicon Si, aluminum Al, titanium, or zirconium Zr to the solvent system.

Further, the pH of the solvent system constructed mainly by the water can be accomplished by dissolving alkali into the solvent system constructed mainly by the water. As alkali, for example, lithium hydroxide, sodium hydroxide, potassium hydroxide, and their mixture can be mentioned. Although the solvent system can be embodied by properly using those alkali, it is excellent to use lithium hydroxide from viewpoints of purity and performance of the cathode active material according to the eighth embodiment which is finally obtained. This is because if lithium hydroxide is used, the following advantages are obtained. When the composite oxide particle formed with the hydroxide containing nickel Ni and/or manganese Mn is taken out of the solvent system constructed mainly by the water, by controlling a deposition amount of the dispersing medium made of the solvent constructed mainly by the water, an amount of lithium of the cathode active material according to the eighth embodiment which is finally obtained can be controlled.

(Second Step)

In the second step, the composite oxide particle which has been coating-processed in the first step is separated from the solvent system constructed mainly by the water and, thereafter, heating-processed, thereby dehydrating the hydroxide. A coating layer made of an oxide containing lithium Li and a coating element of at least one of nickel Ni and manganese Mn and a surface layer made of an oxide containing at least one kind of silicon Si, aluminum Al, titanium, and zirconium Zr are formed on the surface of the composite oxide particle. It is preferable that the heating process is executed in an oxidation atmosphere such as air, pure oxygen, or the like at temperatures of, for example, about 300° C. to 1000° C. In this instance, since the hydroxide containing nickel Ni and/or manganese Mn has been coated with the hydroxide containing at least one kind of silicon Si, aluminum Al, titanium, and zirconium Zr, the sintering between the particles is suppressed and the binding of the particles is suppressed.

After the composite oxide particle which has been coating-processed in the first step was separated from the solvent system, if necessary, in order to adjust the lithium amount, it is also possible to impregnate an aqueous solution of the lithium compound into the composite oxide particle and, thereafter, execute the heating process.

As a lithium compound, for example, it is possible to use: an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate, lithium hydrogencarbonate, or the like; or an organic compound such as methyllithium, vinyllithium, isopropyl lithium, butyllithium, phenyllithium, lithium oxalate, lithium acetate, or the like.

After the baking, a particle size can be also adjusted as necessary by light pulverization, the classifying operation, or the like.

<Second Manufacturing Method>

The second manufacturing method of the cathode active material according to the eighth embodiment can be roughly classified into: a first step of forming a layer made of a hydroxide containing nickel Ni and/or manganese Mn into at least a part of the composite oxide particle and drying; a second step of coating a part of the composite oxide particle obtained after the drying with metal oxide micro-particle made of an oxide containing at least one kind of silicon Si, aluminum Al, titanium, and zirconium Zr; and a third step of executing a heating process after the coating by the metal oxide particle was performed, thereby forming a coating layer made of an oxide containing lithium Li and a coating element of at least one of nickel Ni and manganese Mn and a surface layer made of an oxide containing at least one kind of silicon Si, aluminum Al, titanium, and zirconium Zr into at least a part of the composite oxide particle.

(First Step)

In the first step, a coating process of the hydroxide containing nickel Ni and/or manganese Mn is executed to the surface of the composite oxide particle. A material and a method similar to those in the first manufacturing method can be used for the coating process of the hydroxide. Subsequently, the composite oxide particle to which the hydroxide has been coating-processed is separated from the solvent system constructed mainly by the water and, thereafter, is dried under an environment of, for example, 120° C.

(Second Step)

In the second step, the metal oxide micro-particle made of the oxide containing at least one kind of silicon Si, aluminum Al, titanium, and zirconium Zr is added to the composite oxide particle coated with the hydroxide by the first step and stirred and mixed in a dry manner, thereby coating the surface of the composite oxide particle with the metal oxide particle.

(Third Step)

In the third step, after the hydroxide was coating-processed, the hydroxide is dehydrated by heat-processing the composite oxide particle coated with the metal oxide particle. The coating layer made of the oxide containing lithium Li and the coating element of at least one of nickel Ni and manganese Mn and the surface layer made of the oxide containing at least one kind of silicon Si, aluminum Al, titanium, and zirconium Zr are formed onto the surface of the composite oxide particle. It is preferable to execute the heating process at a temperature of, for example, about 300 to 1000° C. in the air or an oxidation atmosphere such as pure oxygen or the like. At this time, since the hydroxide containing nickel Ni and/or manganese Mn has been coated with the metal oxide particle including at least one kind of silicon Si, aluminum Al, titanium, and zirconium Zr, the sintering between the particles is suppressed and the bonding of the particles is suppressed.

After the baking, a particle size can be also adjusted as necessary by light pulverization, the classifying operation, or the like in a manner similar to the first manufacturing method.

By using such a cathode active material, the excellent stability can be obtained under the high charge voltage. The energy density can be improved in association therewith and the high charge/discharge capacitance can be obtained. A non-aqueous electrolyte secondary battery having the excellent charge/discharge cycle characteristics at the high capacitance can be obtained under the high charge voltage.

A non-aqueous electrolyte secondary battery using the cathode active material according to the eighth embodiment of the invention as mentioned above is similar to that in the foregoing first embodiment.

EXAMPLES

Specific Examples are described below.

Example 1

Example 1-1

First, the composite oxide particle of 20 weight parts in which mean compositions are $Li_{1.03}CoO_{2.01}$ and a mean diameter measured by a laser scattering method is equal to 13 μm is stirred and dispersed into the pure water of 80° C. and 300 weight parts for 1 hour.

Subsequently, nickel nitrate $Ni(NO_3)_2 \cdot 6H_2O$ of 1.60 weight parts as a commercially available chemical reagent and manganese nitrate $Mn(NO_3)_2 \cdot 6H_2O$ of 1.65 weight parts as a commercially available chemical reagent are added to the obtained solution. An LiOH aqueous solution of 2N is further added for 30 minutes until the value of pH reaches 13. The agitation-dispersion is further continued at 80° C. for 3 hours and, thereafter, the obtained solution is cooled.

Subsequently, the above dispersing system is decantation-cleaned. Sodium metasilicate $Na_2SiO_3$ of 0.1 weight part as a commercially available chemical reagent is dissolved into the pure water of 2.0 weight parts, the obtained solution is added to the cleaned dispersing system. The dispersing system is further decantation-cleaned, finally filtered, and dried at 120° C., thereby forming a precursor.

Subsequently, in order to adjust an amount of lithium, the LiOH aqueous solution of 2N of 2 weight parts is impregnated into the obtained precursor sample of 10 weight parts and uniformly mixed and the obtained sample is dried, thereby obtaining a baked precursor. The baked precursor is temperature-elevated in the air flow at a rate of 5° C. per minute by using an electric furnace, held at 950° C. for 5 hours, and thereafter, cooled down to 150° C. at a rate of 7° C. per minute, thereby obtaining a cathode active material of Example 1-1.

Example 1-2

First, the composite oxide particle of 20 weight parts used in Example 1-1 is stirred and dispersed into the LiOH aqueous solution of 2N of 80° C. and 300 weight parts for 2 hours (in the present system, pH=14.3). Subsequently, an aqueous solution of 10 weight parts is formed by adding nickel nitrate $Ni(NO_3)_2 \cdot 6H_2O$ of 1.60 weight parts as a commercially available chemical reagent and manganese nitrate $Mn(NO_3)_2 \cdot 6H_2O$ of 1.65 weight parts as a commercially available chemical reagent into the LiOH aqueous solution and, further, by adding the pure water thereto. The obtained aqueous solution of all of 10 weight parts is added for 2 hours. The agitation-dispersion is further continued at 80° C. for 1 hour and, thereafter, the obtained solution is cooled.

Subsequently, the above dispersing system is decantation-cleaned. Sodium orthosilicate (tetrasodium monosilicate) $Na_4SiO_4$ of 0.1 weight part as a commercially available chemical reagent is dissolved into the pure water of 2.0 weight parts, the obtained solution is added to the cleaned dispersing system. The dispersing system is further decantation-cleaned, finally filtered, and dried at 120° C., thereby forming a precursor. Subsequently, the obtained precursor is temperature-elevated in the air flow at a rate of 5° C. per minute by using the electric furnace, held at 950° C. for 5 hours, and thereafter, cooled down to 150° C. at a rate of 7° C. per minute, thereby obtaining a cathode active material of Example 1-2.

Example 1-3

An aqueous solution of 20 weight parts is formed by adding the pure water to nickel nitrate $Ni(NO_3)_2 \cdot 6H_2O$ of 3.20 weight parts as a commercially available chemical reagent and manganese nitrate $Mn(NO_3)_2 \cdot 6H_2O$ of 3.30 weight parts as a commercially available chemical reagent. The obtained aqueous solution of all of 20 weight parts is added for 3 hours. Sodium metasilicate $Na_2SiO_3$ of 0.2 weight part as a commercially available chemical reagent is dissolved into the pure water of 5.0 weight parts and the obtained solution is added. Then, a cathode active material of Example 1-3 is formed in a manner similar to that of Example 1-2.

<Comparison 1-1>

The composite oxide particle in which the mean compositions are $Li_{1.03}CoO_{2.01}$ and the mean diameter measured by the laser scattering method is equal to 13 μm in Example 1-1 is used for the cathode active material of Comparison 1-1.

<Comparison 1-2>

A cathode active material of Comparison 1-2 is formed in a manner similar to that of Example 1-1 except that sodium metasilicate $Na_2SiO_3$ of 0.10 weight part is not added in Example 1-1.

Evaluation

The secondary batteries shown in FIGS. 1 and 2 are manufactured by using the manufactured cathode active materials of Examples 1-1 to 1-3 and Comparisons 1-1 and 1-2. First, the manufactured cathode active material powder of 86 weight %, graphite of 10 weight % serving as a conductive material, and polyvinylidene fluoride PVdF of 4 weight % serving as a binder are mixed and dispersed into N-methyl-2-pyrrolidone NMP serving as a solvent. After that, the both surfaces of the cathode collector 2A made of a belt-shaped aluminum foil having a thickness of 20 μm are coated with the obtained solvent. The collector is dried and compression-molded by a roller pressing machine, thereby forming the cathode mixture layers 2B and manufacturing the cathode 2. At this time, a gap of the cathode mixture layer 2B is adjusted so as to reach 26% as a volume ratio. Subsequently, the cathode lead 13 made of aluminum is attached to the cathode collector 2A.

The artificial graphite powder of 90 weight % serving as an anode active material and polyvinylidene fluoride of 10 weight % serving as a binder are mixed and dispersed into N-methyl-2-pyrrolidone NMP serving as a solvent. After that, the both surfaces of the anode collector 3A made of a belt-shaped copper foil having a thickness of 10 μm are coated with the obtained solvent. The collector is dried and compression-molded by the roller pressing machine, thereby forming the anode mixture layers 3B and manufacturing the anode 3. Subsequently, the anode lead 14 made of nickel is attached to the anode collector 3A.

The belt-shaped cathode 2 and belt-shaped anode 3 manufactured as mentioned above are wound a number of times through a porous polyolefin film serving as a separator 4, thereby manufacturing the spiral type winded electrode member 20. Subsequently, the winded electrode member 20 is enclosed in the battery can 1 made of iron. The pair of insulating plates 5 and 6 are arranged on both of the upper and lower surfaces of the winded electrode member 20. The cathode lead 13 is led out of the cathode collector 2A and welded to the relief valve mechanism 8. The anode lead 14 is led out of the anode collector 3A and welded to the bottom portion of the battery can 1. After that, an electrolytic solution is injected into the battery can 1 and the battery can 1 is caulked through the gasket 10, thereby fixing the relief valve mechanism 8, PTC element 9, and battery cap 7, so that the cylindrical secondary battery having an outer diameter of 18 mm and a height of 65 mm is obtained. As an electrolytic solution, $LiPF_6$ is dissolved as an electrolytic salt at 1.0 mol/l into a solvent in which ethylene carbonate and diethyl carbonate have been mixed at a volume ratio of 1:1 and the obtained solution is used.

With respect to the secondary battery manufactured as mentioned above, the charging and discharging are executed under a temperature environment of 45° C. A discharge capacitance at the first cycle is obtained as an initial capacitance. A discharge capacitance maintaining ratio at the 200th cycle to that at the first cycle is obtained.

As for the charging, after the constant current charging was executed by a constant current of 1000 mA until a battery voltage reaches 4.40V, the constant voltage charging is executed by a constant voltage of 4.40V until the sum of charging time reaches 2.5 hours. As for the discharging, the constant current discharging is executed by a constant current of 800 mA until the battery voltage reaches 2.75V. Measurement results are shown in Table 1.

TABLE 1

| | MEAN COMPOSITIONS OF COMPOSITE OXIDE PARTICLE | COATING RAW MATERIAL OF COATING LAYER | COATING RAW MATERIAL OF SURFACE LAYER | INITIAL CAPACITANCE [mAh] | DISCHARGE CAPACITANCE MAINTAINING RATIO [%] |
|---|---|---|---|---|---|
| EXAMPLE 1-1 | $Li_{1.03}CoO_{2.01}$ | $Ni(NO_3)_2 \cdot 6H_2O$ | $Na_2SiO_3$ | 2430 | 82 |
| EXAMPLE 1-2 | | $Mn(NO_3)_2 \cdot 6H_2O$ | $Na_4SiO_4$ | 2420 | 83 |
| EXAMPLE 1-3 | | | $Na_2SiO_3$ | 2440 | 85 |
| COMPARISON 1-1 | $Li_{1.03}CoO_{2.01}$ | — | — | 2440 | 34 |
| COMPARISON 1-2 | | $Ni(NO_3)_2 \cdot 6H_2O, Mn(NO_3)_2 \cdot 6H_2O$ | — | 2450 | 81 |

As shown in Table 1, according to Examples 1-1 to 1-3, the high capacitance is obtained and the discharge capacitance maintaining ratio can be remarkably improved as compared with that in Comparison 1-1. The discharge capacitance maintaining ratio can be also remarkably improved as compared with that in Comparison 1-2 in which the surface layer containing silicon Si is not formed.

Example 2

Example 2-1

First, the composite oxide particle of 20 weight parts in which the mean compositions are $Li_{1.03}CoO_{2.01}$ and the mean diameter measured by the laser scattering method is equal to 13 μm is stirred and dispersed into the pure water of 80° C. and 300 weight parts for 1 hour.

Subsequently, nickel nitrate $Ni(NO_3)_2.6H_2O$ of 1.60 weight parts as a commercially available chemical reagent and manganese nitrate $Mn(NO_3)_2.6H_2O$ of 1.65 weight parts as a commercially available chemical reagent are added to the obtained solution. The LiOH aqueous solution of 2N is further added for 30 minutes until the value of pH reaches 13. The agitation-dispersion is further continued at 80° C. for 3 hours and, thereafter, the obtained solution is cooled.

Subsequently, the above dispersing system is decantation-cleaned. Sodium stannate trihydrate $Na_2SnO_3.3H_2O$ of 0.1 weight part as a commercially available chemical reagent is dissolved into the pure water of 2.0 weight parts, the obtained solution is added to the cleaned dispersing system. The dispersing system is further decantation-cleaned, finally filtered, and dried at 120° C., thereby forming a precursor.

Subsequently, in order to adjust an amount of lithium, the LiOH aqueous solution of 2N of 2 weight parts is impregnated into the obtained precursor sample of 10 weight parts and uniformly mixed and the obtained sample is dried, thereby obtaining a baked precursor. The baked precursor is temperature-elevated in the air flow at a rate of 5° C. per minute by using the electric furnace, held at 950° C. for 5 hours, and thereafter, cooled down to 150° C. at a rate of 7° C. per minute, thereby obtaining a cathode active material of Example 2-1.

Example 2-2

First, the composite oxide particle of 20 weight parts used in Example 2-1 is stirred and dispersed into the LiOH aqueous solution of 2N of 80° C. and 300 weight parts for 2 hours (in the present system, pH=14.3). Subsequently, an aqueous solution of 10 weight parts is formed by adding nickel nitrate $Ni(NO_3)_2.6H_2O$ of 1.60 weight parts as a commercially available chemical reagent and manganese nitrate $Mn(NO_3)_2.6H_2O$ of 1.65 weight parts as a commercially available chemical reagent into the LiOH aqueous solution and, further, by adding the pure water thereto. The obtained aqueous solution of all of 10 weight parts is added for 2 hours. The agitation-dispersion is further continued at 80° C. for 1 hour and, thereafter, the obtained solution is cooled.

Subsequently, the above dispersing system is decantation-cleaned. Potassium stannate trihydrate $K_2SnO_3.3H_2O$ of 0.1 weight part as a commercially available chemical reagent is dissolved into the pure water of 2.0 weight parts, the obtained solution is added to the cleaned dispersing system. The dispersing system is further decantation-cleaned, finally filtered, and dried at 120° C., thereby forming a precursor. Subsequently, the obtained precursor is temperature-elevated in the air flow at a rate of 5° C. per minute by using the electric furnace, held at 950° C. for 5 hours, and thereafter, cooled down to 150° C. at a rate of 7° C. per minute, thereby obtaining a cathode active material of Example 2-2.

Example 2-3

An aqueous solution of 20 weight parts is formed by adding the pure water to nickel nitrate $(Ni(NO_3)_2.6H_2O)$ of 3.20 weight parts as a commercially available chemical reagent and manganese nitrate $Mn(NO_3)_2.6H_2O$ of 3.30 weight parts as a commercially available chemical reagent. The obtained aqueous solution of all of 20 weight parts is added for 3 hours. Sodium stannate trihydrate $Na_2SnO_3.3H_2O$ of 0.2 weight part as a commercially available chemical reagent is dissolved into the pure water of 5.0 weight parts and the obtained solution is added. Then, a cathode active material of Example 2-3 is formed in a manner similar to that of Example 2-2.

<Comparison 2-1>

The composite oxide particle in which the mean compositions are $Li_{1.03}CoO_{2.01}$ and the mean diameter measured by the laser scattering method is equal to 13 μm in Example 2-1 is used for the cathode active material of Comparison 2-1.

<Comparison 2-2>

A cathode active material of Comparison 2-2 is formed in a manner similar to that of Example 2-1 except that sodium stannate trihydrate $Na_2SnO_3.3H_2O$ of 0.10 weight part is not added in Example 2-1.

Evaluation

The secondary batteries shown in FIGS. 1 and 2 are manufactured by using the manufactured cathode active materials of Examples 2-1 to 2-3 and Comparisons 2-1 and 2-2 in a manner similar to that in foregoing Example 1-1.

With respect to the secondary battery manufactured as mentioned above, the charging and discharging are executed under the temperature environment of 45° C. The discharge capacitance at the first cycle is obtained as an initial capacitance. The discharge capacitance maintaining ratio at the 200th cycle to that at the first cycle is obtained.

As for the charging, after the constant current charging was executed by the constant current of 1000 mA until the battery voltage reaches 4.40V, the constant voltage charging is executed by the constant voltage of 4.40V until the sum of charging time reaches 2.5 hours. As for the discharging, the constant current discharging is executed by the constant current of 800 mA until the battery voltage reaches 2.75V. Measurement results are shown in Table 2.

TABLE 2

| | MEAN COMPOSITIONS OF COMPOSITE OXIDE PARTICLE | COATING RAW MATERIAL OF COATING LAYER | COATING RAW MATERIAL OF SURFACE LAYER | INITIAL CAPACITANCE [mAh] | DISCHARGE CAPACITANCE MAINTAINING RATIO [%] |
|---|---|---|---|---|---|
| EXAMPLE 2-1 | $Li_{1.03}CoO_{2.01}$ | $Ni(NO_3)_2·6H_2O$ | $Na_2SnO_3·3H_2O$ | 2440 | 82 |
| EXAMPLE 2-2 | | $Mn(NO_3)_2·6H_2O$ | $K_2SnO_3·3H_2O$ | 2440 | 83 |
| EXAMPLE 2-3 | | | $Na_2SnO_3·3H_2O$ | 2450 | 84 |
| COMPARISON 2-1 | $Li_{1.03}CoO_{2.01}$ | — | — | 2440 | 34 |
| COMPARISON 2-2 | | $Ni(NO_3)_2·6H_2O, Mn(NO_3)_2·6H_2O$ | — | 2450 | 81 |

As shown in Table 2, according to Examples 2-1 to 2-3, the high capacitance is obtained and the discharge capacitance maintaining ratio can be remarkably improved as compared with that in Comparison 2-1. The discharge capacitance maintaining ratio can be also remarkably improved as compared with that in Comparison 2-2 in which the surface layer containing tin Sn is not formed.

Example 3

Example 3-1

First, the composite oxide particle of 20 weight parts in which the mean compositions are $Li_{1.03}CoO_{2.01}$ and the mean diameter measured by the laser scattering method is equal to 13 μm is stirred and dispersed into the pure water of 80° C. and 300 weight parts for 1 hour.

Subsequently, nickel nitrate $Ni(NO_3)_2.6H_2O$ of 1.60 weight parts as a commercially available chemical reagent and manganese nitrate $Mn(NO_3)_2.6H_2O$ of 1.65 weight parts as a commercially available chemical reagent are added to the obtained solution. The LiOH aqueous solution of 2N is further added for 30 minutes until the value of pH reaches 13. The agitation-dispersion is further continued at 80° C. for 3 hours and, thereafter, the obtained solution is cooled.

Subsequently, the above dispersing system is decantation-cleaned. Ammonium dihydrogenphosphate $(NH_4H_2PO_4)$ of 0.1 weight part as a commercially available chemical reagent is dissolved into the pure water of 2.0 weight parts, the obtained solution is added to the cleaned dispersing system. The dispersing system is further decantation-cleaned, finally filtered, and dried at 120° C., thereby forming a precursor.

Subsequently, in order to adjust an amount of lithium, the LiOH aqueous solution of 2N of 2 weight parts is impregnated into the obtained precursor sample of 10 weight parts and uniformly mixed and the obtained sample is dried, thereby obtaining a baked precursor. The baked precursor is temperature-elevated in the air flow at a rate of 5° C. per minute by using the electric furnace, held at 950° C. for 5 hours, and thereafter, cooled down to 150° C. at a rate of 7° C. per minute, thereby obtaining a cathode active material of Example 3-1.

Example 3-2

First, the composite oxide particle of 20 weight parts used in Example 3-1 is stirred and dispersed into the LiOH aqueous solution of 2N of 80° C. and 300 weight parts for 2 hours (in the present system, pH=14.3). Subsequently, an aqueous solution of 10 weight parts is formed by adding the pure water to nickel nitrate $Ni(NO_3)_2 \cdot 6H_2O$ of 1.60 weight parts as a commercially available chemical reagent and manganese nitrate $Mn(NO_3)_2 \cdot 6H_2O$ of 1.65 weight parts as a commercially available chemical reagent into the LiOH aqueous solution and, further, by adding the pure water thereto. The obtained aqueous solution of all of 10 weight parts is added for 2 hours. The agitation-dispersion is further continued at 80° C. for 1 hour and, thereafter, the obtained solution is cooled.

Subsequently, the above dispersing system is decantation-cleaned. Sodium hexametaphosphate $((NaPO_3)_6)$ of 0.1 weight part as a commercially available chemical reagent is dissolved into the pure water of 2.0 weight parts, the obtained solution is added to the cleaned dispersing system. The dispersing system is further decantation-cleaned, finally filtered, and dried at 120° C., thereby forming a precursor. Subsequently, the obtained precursor is temperature-elevated in the air flow at a rate of 5° C. per minute by using the electric furnace, held at 950° C. for 5 hours, and thereafter, cooled down to 150° C. at a rate of 7° C. per minute, thereby obtaining a cathode active material of Example 3-2.

Example 3-3

An aqueous solution of 20 weight parts is formed by adding the pure water to nickel nitrate $Ni(NO_3)_2 \cdot 6H_2O$ of 3.20 weight parts as a commercially available chemical reagent and manganese nitrate $Mn(NO_3)_2 \cdot 6H_2O$ of 3.30 weight parts as a commercially available chemical reagent. The obtained aqueous solution of all of 20 weight parts is added for 3 hours. Ammonium dihydrogenphosphate $NH_4H_2PO_4$ of 0.2 weight part as a commercially available chemical reagent is dissolved into the pure water of 5.0 weight parts and the obtained solution is added. Then, a cathode active material of Example 3-3 is formed in a manner similar to that of Example 3-2.

<Comparison 3-1>

The composite oxide particle in which the mean compositions are $Li_{1.03}CoO_{2.01}$ and the mean diameter measured by the laser scattering method is equal to 13 μm in Example 3-1 is used for the cathode active material of Comparison 3-1.

<Comparison 3-2>

A cathode active material of Comparison 3-2 is formed in a manner similar to that of Example 3-1 except that ammonium dihydrogenphosphate $NH_4H_2PO_4$ of 0.1 weight part is not added in Example 3-1.

Evaluation

The secondary batteries shown in FIGS. 1 and 2 are manufactured by using the manufactured cathode active materials of Examples 3-1 to 3-3 and Comparisons 3-1 and 3-2 in a manner similar to that in foregoing Example 1-1.

With respect to the secondary battery manufactured as mentioned above, the charging and discharging are executed under the temperature environment of 45° C. The discharge capacitance at the first cycle is obtained as an initial capacitance. The discharge capacitance maintaining ratio at the 200th cycle to that at the first cycle is obtained.

As for the charging, after the constant current charging was executed by the constant current of 1000 mA until the battery voltage reaches 4.40V, the constant voltage charging is executed by the constant voltage of 4.40V until the sum of charging time reaches 2.5 hours. As for the discharging, the constant current discharging is executed by the constant current of 800 mA until the battery voltage reaches 2.75V. Measurement results are shown in Table 3.

TABLE 3

| | MEAN COMPOSITIONS OF COMPOSITE OXIDE PARTICLE | COATING RAW MATERIAL OF COATING LAYER | COATING RAW MATERIAL OF SURFACE LAYER | INITIAL CAPACITANCE [mAh] | DISCHARGE CAPACITANCE MAINTAINING RATIO [%] |
|---|---|---|---|---|---|
| EXAMPLE 3-1 | $Li_{1.03}CoO_{2.01}$ | $Ni(NO_3)_2 \cdot 6H_2O$ | $NH_4H_2PO_4$ | 2440 | 83 |
| EXAMPLE 3-2 | | $Mn(NO_3)_2 \cdot 6H_2O$ | $(NaPO_3)_6$ | 2430 | 83 |
| EXAMPLE 3-3 | | | $NH_4H_2PO_4$ | 2440 | 84 |
| COMPARISON 3-1 | $Li_{1.03}CoO_{2.01}$ | — | — | 2440 | 34 |
| COMPARISON 3-2 | | $Ni(NO_3)_2 \cdot 6H_2O, Mn(NO_3)_2 \cdot 6H_2O$ | — | 2450 | 81 |

As shown in Table 3, according to Examples 3-1 to 3-3, the high capacitance is obtained and the discharge capacitance maintaining ratio can be remarkably improved as compared with that in Comparison 3-1. The discharge capacitance maintaining ratio can be also remarkably improved as compared with that in Comparison 3-2 in which the surface layer containing phosphorus P is not formed.

Example 4

Example 4-1

First, the composite oxide particle of 10 weight parts in which the mean compositions are $Li_{1.03}CoO_{2.02}$, the mean diameter measured by the laser scattering method is equal to 13 μm, and the specific surface area is equal to 0.3 $m^2/g$ is stirred and dispersed into the LiOH aqueous solution of 2N of 80° C. and 300 weight parts for 1 hour.

Subsequently, the solution obtained by dissolving nickel nitrate $Ni(NO_3)_2 \cdot 6H_2O$ of 1.54 weight parts as a commercially available chemical reagent and manganese nitrate $Mn(NO_3)_2 \cdot 6H_2O$ of 0.83 weight part as a commercially available chemical reagent into the pure water of 10 weight parts is added to the obtained aqueous solution for 2 hours.

Subsequently, the solution obtained by dissolving magnesium nitrate $Mg(NO_3)_2 \cdot 6H_2O$ of 0.10 weight part as a commercially available chemical reagent into the pure water of 5 weight parts is added to the obtained aqueous solution for 1 hour. By further stirring the obtained aqueous solution at 80° C. for 1 hour, the dispersion is continued and the solution is cooled.

Subsequently, the dispersing system is filtered and dried at 120° C. Then, in order to adjust the amount of lithium, the LiOH aqueous solution of 2N of 2 weight parts is impregnated into the precursor sample of 10 weight parts and uniformly mixed and the obtained sample is dried, thereby obtaining a baked precursor. The baked precursor is temperature-elevated at a rate of 5° C. per minute by using the electric furnace, held at 950° C. for 5 hours, and thereafter, cooled down to 150° C. at a rate of 7° C. per minute, thereby obtaining a cathode active material of Example 4-1.

Example 4-2

Nickel nitrate $Ni(NO_3)_2 \cdot 6H_2O$ of 3.08 weight parts and manganese nitrate $Mn(NO_3)_2 \cdot 6H_2O$ of 3.30 weight parts are dissolved into the pure water of 20 weight parts. Magnesium sulfate $MgSO_4 \cdot 7H_2O$ of 0.50 weight part is dissolved into the pure water of 5 weight parts. An amount of LiOH aqueous solution of 2N to be impregnated in order to adjust the amount of lithium is set to 5 weight parts. Then, a cathode active material of Example 4-2 is obtained in a manner similar to that of Example 4-1.

Example 4-3

Nickel nitrate $Ni(NO_3)_2 \cdot 6H_2O$ of 3.08 weight parts and manganese nitrate $Mn(NO_3)_2 \cdot 6H_2O$ of 3.30 weight parts are dissolved into the pure water of 20 weight parts. An addition amount of magnesium nitrate $Mg(NO_3)_2 \cdot 6H_2O$ is set to 0.50 weight part. An amount of LiOH aqueous solution of 2N to be impregnated in order to adjust the amount of lithium is set to 4 weight parts. Then, a cathode active material of Example 4-3 is obtained in a manner similar to that of Example 4-1.

<Comparison 4-1>

The composite oxide particle in which the mean compositions are $Li_{1.03}CoO_{2.02}$, the mean diameter measured by the laser scattering method is equal to 13 μm, and the specific surface area is equal to 0.3 m²/g in Example 4-1 is used for the cathode active material of Comparison 4-1.

<Comparison 4-2>

A cathode active material of Comparison 4-2 is formed in a manner similar to that of Example 4-1 except that magnesium nitrate $Mg(NO_3)_2 \cdot 6H_2O$ of 0.10 weight part is not added in Example 4-1.

Evaluation

The secondary batteries shown in FIGS. 1 and 2 are manufactured by using the manufactured cathode active materials of Examples 4-1 to 4-3 and Comparisons 4-1 and 4-2 in a manner similar to that in foregoing Example 1-1. The cathode active material is sufficiently pulverized by using the grinding machine so as to pass through an opening sieve of 70 μm and used as a cathode active material powder.

With respect to the secondary battery manufactured as mentioned above, the charging and discharging are executed under the temperature environment of 45° C. The discharge capacitance at the first cycle is obtained as an initial capacitance. The discharge capacitance maintaining ratio at the 200th cycle to that at the first cycle is obtained.

As for the charging, after the constant current charging was executed by the constant current of 1000 mA until the battery voltage reaches 4.40V, the constant voltage charging is executed by the constant voltage of 4.40V until the sum of charging time reaches 2.5 hours. As for the discharging, the constant current discharging is executed by the constant current of 800 mA until the battery voltage reaches 2.75V. Measurement results are shown in Table 4.

TABLE 4

| | MEAN COMPOSITIONS OF COMPOSITE OXIDE PARTICLE | COATING RAW MATERIAL OF COATING LAYER | COATING RAW MATERIAL OF SURFACE LAYER | INITIAL CAPACITANCE [mAh] | DISCHARGE CAPACITANCE MAINTAINING RATIO [%] |
|---|---|---|---|---|---|
| EXAMPLE 4-1 | $Li_{1.03}CoO_{2.02}$ | $Ni(NO_3)_2 \cdot 6H_2O$ | $Mg(NO_3)_2 \cdot 6H_2O$ | 2430 | 83 |
| EXAMPLE 4-2 | | $Mn(NO_3)_2 \cdot 6H_2O$ | $MgSO_4 \cdot 7H_2O$ | 2440 | 85 |
| EXAMPLE 4-3 | | | $Mg(NO_3)_2 \cdot 6H_2O$ | 2460 | 84 |
| COMPARISON 4-1 | $Li_{1.03}CoO_{2.02}$ | — | — | 2510 | 30 |
| COMPARISON 4-2 | | $Ni(NO_3)_2 \cdot 6H_2O$, $Mn(NO_3)_2 \cdot 6H_2O$ | — | 2450 | 79 |

As shown in Table 4, according to Examples 4-1 to 4-3, the high capacitance is obtained and the discharge capacitance maintaining ratio can be remarkably improved as compared with that in Comparison 4-1. The discharge capacitance maintaining ratio can be also remarkably improved as compared with that in Comparison 4-2 in which the surface layer made of the oxide containing magnesium Mg is not formed.

Example 5

Example 5-1

First, the composite oxide particle of 20 weight parts in which the mean compositions are $Li_{1.03}CoO_{2.01}$ and the mean diameter measured by the laser scattering method is equal to 13 μm is stirred and dispersed into the pure water of 80° C. and 300 weight parts for 1 hour.

Subsequently, nickel nitrate $Ni(NO_3)_2 \cdot 6H_2O$ of 1.60 weight parts as a commercially available chemical reagent and manganese nitrate $Mn(NO_3)_2 \cdot 6H_2O$ of 1.65 weight parts as a commercially available chemical reagent are added to the obtained solution. The LiOH aqueous solution of 2N is further added for 30 minutes until the value of pH reaches 13. The agitation-dispersion is further continued at 80° C. for 3 hours and, thereafter, the obtained solution is cooled.

Subsequently, the above dispersing system is decantation-cleaned. Lithium tetraborate $Li_2B_4O_7 \cdot 3H_2O$ of 0.1 weight part as a commercially available chemical reagent is dissolved into the pure water of 2.0 weight parts, the obtained solution is added to the cleaned dispersing system. The dispersing system is further decantation-cleaned, finally filtered, and dried at 120° C., thereby forming a precursor.

Subsequently, in order to adjust an amount of lithium, the LiOH aqueous solution of 2N of 2 weight parts is impregnated into the obtained precursor sample of 10 weight parts and uniformly mixed and the obtained sample is dried, thereby obtaining a baked precursor. The baked precursor is temperature-elevated in the air flow at a rate of 5° C. per minute by using the electric furnace, held at 950° C. for 5 hours, and thereafter, cooled down to 150° C. at a rate of 7° C. per minute, thereby obtaining a cathode active material of Example 5-1.

Example 5-2

First, the composite oxide particle of 20 weight parts used in Example 5-1 is stirred and dispersed into the LiOH aqueous solution of 2N of 80° C. and 300 weight parts for 2 hours (in the present system, pH=14.3). Subsequently, an aqueous solution of 10 weight parts is formed by adding the pure water to nickel nitrate $Ni(NO_3)_2 \cdot 6H_2O$ of 1.60 weight parts as a commercially available chemical reagent and manganese nitrate $Mn(NO_3)_2 \cdot 6H_2O$ of 1.65 weight parts as a commercially available chemical reagent into the LiOH aqueous solution and, further, by adding the pure water thereto. The obtained aqueous solution of all of 10 weight parts is added for 2 hours. The agitation-dispersion is further continued at 80° C. for 1 hour and, thereafter, the obtained solution is cooled.

Subsequently, the above dispersing system is decantation-cleaned. Sodium metaborate $NaBO_2 \cdot 4H_2O$ of 0.1 weight part as a commercially available chemical reagent is dissolved into the pure water of 2.0 weight parts, the obtained solution is added to the cleaned dispersing system. The dispersing system is further decantation-cleaned, finally filtered, and dried at 120° C., thereby forming a precursor. Subsequently, the obtained precursor is temperature-elevated in the air flow at a rate of 5° C. per minute by using the electric furnace, held at 950° C. for 5 hours, and thereafter, cooled down to 150° C. at a rate of 7° C. per minute, thereby obtaining a cathode active material of Example 5-2.

Example 5-3

An aqueous solution of 20 weight parts is formed by adding the pure water to nickel nitrate $Ni(NO_3)_2 \cdot 6H_2O$ of 3.20 weight parts as a commercially available chemical reagent and manganese nitrate $Mn(NO_3)_2 \cdot 6H_2O$ of 3.30 weight parts as a commercially available chemical reagent. The obtained aqueous solution of all of 20 weight parts is added for 3 hours. Lithium tetraborate $Li_2B_4O_7 \cdot 3H_2O$ of 0.2 weight part as a commercially available chemical reagent is dissolved into the pure water of 5.0 weight parts and the obtained solution is added. Then, a cathode active material of Example 5-3 is formed in a manner similar to that of Example 5-2.

<Comparison 5-1>

The composite oxide particle in which the mean compositions are $Li_{1.03}CoO_{2.01}$ and the mean diameter measured by the laser scattering method is equal to 13 μm in Example 5-1 is used for the cathode active material of Comparison 5-1.

<Comparison 5-2>

A cathode active material of Comparison 5-2 is formed in a manner similar to that of Example 5-1 except that Lithium tetraborate $Li_2B_4O_7 \cdot 3H_2O$ of 0.1 weight part is not added in Example 5-1.

Evaluation

The secondary batteries shown in FIGS. 1 and 2 are manufactured by using the manufactured cathode active materials of Examples 5-1 to 5-3 and Comparisons 5-1 and 5-2 in a manner similar to that in foregoing Example 1-1.

With respect to the secondary battery manufactured as mentioned above, the charging and discharging are executed under the temperature environment of 45° C. The discharge capacitance at the first cycle is obtained as an initial capacitance. The discharge capacitance maintaining ratio at the 200th cycle to that at the first cycle is obtained.

As for the charging, after the constant current charging was executed by the constant current of 1000 mA until the battery voltage reaches 4.40V, the constant voltage charging is executed by the constant voltage of 4.40V until the sum of charging time reaches 2.5 hours. As for the discharging, the constant current discharging is executed by the constant current of 800 mA until the battery voltage reaches 2.75V. Measurement results are shown in Table 5.

TABLE 5

| | MEAN COMPOSITIONS OF COMPOSITE OXIDE PARTICLE | COATING RAW MATERIAL OF COATING LAYER | COATING RAW MATERIAL OF SURFACE LAYER | INITIAL CAPACITANCE [mAh] | DISCHARGE CAPACITANCE MAINTAINING RATIO [%] |
|---|---|---|---|---|---|
| EXAMPLE 5-1 | $Li_{1.03}CoO_{2.01}$ | $Ni(NO_3)_2 \cdot 6H_2O$ | $Li_2B_4O_7 \cdot 3H_2O$ | 2430 | 82 |
| EXAMPLE 5-2 | | $Mn(NO_3)_2 \cdot 6H_2O$ | $NaBO_2 \cdot 4H_2O$ | 2440 | 82 |
| EXAMPLE 5-3 | | | $Li_2B_4O_7 \cdot 3H_2O$ | 2450 | 84 |
| COMPARISON 5-1 | $Li_{1.03}CoO_{2.01}$ | — | — | 2440 | 34 |
| COMPARISON 5-2 | | $Ni(NO_3)_2 \cdot 6H_2O, Mn(NO_3)_2 \cdot 6H_2O$ | — | 2450 | 81 |

As shown in Table 5, according to Examples 5-1 to 5-3, the high capacitance is obtained and the discharge capacitance maintaining ratio can be remarkably improved as compared with that in Comparison 5-1. The discharge capacitance maintaining ratio can be also remarkably improved as compared with that in Comparison 5-2 in which the surface layer containing boron B is not formed.

Example 6

Example 6-1

First, the composite oxide particle of 10 weight parts in which the mean compositions are $Li_{1.03}CoO_{2.02}$, the mean diameter measured by the laser scattering method is equal to 13 μm, and the specific surface area is equal to 0.3 m$^2$/g is stirred and dispersed into the LiOH aqueous solution of 2N of 80° C. and 300 weight parts for 1 hour.

Subsequently, the solution obtained by dissolving nickel nitrate $Ni(NO_3)_2 \cdot 6H_2O$ of 1.54 weight parts as a commercially available chemical reagent and manganese nitrate $Mn(NO_3)_2 \cdot 6H_2O$ of 0.83 weight part as a commercially available chemical reagent into the pure water of 10 weight parts is added to the obtained aqueous solution for 2 hours.

Subsequently, the solution obtained by dissolving zinc nitrate $Zn(NO_3)_2 \cdot 6H_2O$ of 0.10 weight part as a commercially available chemical reagent into the pure water of 5 weight parts is added to the obtained aqueous solution for 1 hour. By further stirring the obtained aqueous solution at 80° C. for 1 hour, the dispersion is continued and the solution is cooled.

Subsequently, the dispersing system is filtered and dried at 120° C. Then, in order to adjust the amount of lithium, the LiOH aqueous solution of 2N of 2 weight parts is impregnated into the precursor sample of 10 weight parts and uniformly mixed and the obtained sample is dried, thereby obtaining a baked precursor. The baked precursor is temperature-elevated at a rate of 5° C. per minute by using the electric furnace, held at 950° C. for 5 hours, and thereafter, cooled down to 150° C. at a rate of 7° C. per minute, thereby obtaining a cathode active material of Example 6-1.

grinding machine so as to pass through the opening sieve of 70 μm and used as a cathode active material powder.

With respect to the secondary battery manufactured as mentioned above, the charging and discharging are executed under the temperature environment of 45° C. The discharge capacitance at the first cycle is obtained as an initial capacitance. The discharge capacitance maintaining ratio at the 200th cycle to that at the first cycle is obtained.

As for the charging, after the constant current charging was executed by the constant current of 1000 mA until the battery voltage reaches 4.40V, the constant voltage charging is executed by the constant voltage of 4.40V until the sum of charging time reaches 2.5 hours. As for the discharging, the constant current discharging is executed by the constant current of 800 mA until the battery voltage reaches 2.75V. Measurement results are shown in Table 6.

TABLE 6

| | MEAN COMPOSITIONS OF COMPOSITE OXIDE PARTICLE | COATING RAW MATERIAL OF COATING LAYER | COATING RAW MATERIAL OF SURFACE LAYER | INITIAL CAPACITANCE [mAh] | DISCHARGE CAPACITANCE MAINTAINING RATIO [%] |
|---|---|---|---|---|---|
| EXAMPLE 6-1 | $Li_{1.03}CoO_{2.02}$ | $Ni(NO_3)_2 \cdot 6H_2O$ | $Zn(NO_3)_2 \cdot 6H_2O$ | 2430 | 83 |
| EXAMPLE 6-2 | | $Mn(NO_3)_2 \cdot 6H_2O$ | $ZnSO_4 \cdot 7H_2O$ | 2450 | 84 |
| EXAMPLE 6-3 | | | $Zn(NO_3)_2 \cdot 6H_2O$ | 2460 | 85 |
| COMPARISON 6-1 | $Li_{1.03}CoO_{2.02}$ | — | — | 2510 | 30 |
| COMPARISON 6-2 | | $Ni(NO_3)_2 \cdot 6H_2O, Mn(NO_3)_2 \cdot 6H_2O$ | — | 2450 | 79 |

Example 6-2

Nickel nitrate $Ni(NO_3)_2 \cdot 6H_2O$ of 3.08 weight parts and manganese nitrate $Mn(NO_3)_2 \cdot 6H_2O$ of 3.30 weight parts are dissolved into the pure water of 20 weight parts. Zinc sulfate $ZnSO_4 \cdot 7H_2O$ of 0.50 weight part is dissolved into the pure water of 5 weight parts. An amount of LiOH aqueous solution of 2N to be impregnated in order to adjust the amount of lithium is set to 5 weight parts. Then, a cathode active material of Example 6-2 is obtained in a manner similar to that of Example 6-1.

Example 6-3

Nickel nitrate $Ni(NO_3)_2 \cdot 6H_2O$ of 3.08 weight parts and manganese nitrate $Mn(NO_3)_2 \cdot 6H_2O$ of 3.30 weight parts are dissolved into the pure water of 20 weight parts. The addition amount of zinc nitrate $Zn(NO_3)_2 \cdot 6H_2O$ is set to 0.50 weight part. The amount of LiOH aqueous solution of 2N to be impregnated in order to adjust the amount of lithium is set to 4 weight parts. Then, a cathode active material of Example 6-3 is obtained in a manner similar to that of Example 6-1.

<Comparison 6-1>

The composite oxide particle in which the mean compositions are $Li_{1.03}CoO_{2.02}$, the mean diameter measured by the laser scattering method is equal to 13 μm, and the specific surface area is equal to 0.3 m²/g in Example 6-1 is used for the cathode active material of Comparison 6-1.

<Comparison 6-2>

A cathode active material of Comparison 6-2 is formed in a manner similar to that of Example 6-1 except that zinc nitrate $Zn(NO_3)_2 \cdot 6H_2O$ of 0.10 weight part is not added in Example 6-1.

Evaluation

The secondary batteries shown in FIGS. 1 and 2 are manufactured by using the manufactured cathode active materials of Examples 6-1 to 6-3 and Comparisons 6-1 and 6-2. The cathode active material is sufficiently pulverized by using the grinding machine so as to pass through the opening sieve of 70 μm and used as a cathode active material powder.

As shown in Table 6, according to Examples 6-1 to 6-3, the high capacitance is obtained and the discharge capacitance maintaining ratio can be remarkably improved as compared with that in Comparison 6-1. The discharge capacitance maintaining ratio can be also remarkably improved as compared with that in Comparison 6-2 in which the surface layer made of the oxide containing zinc Zn is not formed.

Example 7

Example 7-1

First, the composite oxide particle of 20 weight parts in which the mean compositions are $Li_{1.03}CoO_{2.01}$ and the mean diameter measured by the laser scattering method is equal to 13 μm is stirred and dispersed into the pure water of 80° C. and 300 weight parts for 1 hour.

Subsequently, nickel nitrate $Ni(NO_3)_2 \cdot 6H_2O$ of 1.60 weight parts as a commercially available chemical reagent and manganese nitrate $Mn(NO_3)_2 \cdot 6H_2O$ of 1.65 weight parts as a commercially available chemical reagent are added to the obtained solution. The LiOH aqueous solution of 2N is further added for 30 minutes until the value of pH reaches 13. The agitation-dispersion is further continued at 80° C. for 3 hours and, thereafter, the obtained solution is cooled.

Subsequently, the above dispersing system is decantation-cleaned. Sodium tungstate $Na_2WO_4 \cdot 2H_2O$ of 0.1 weight part as a commercially available chemical reagent is dissolved into the pure water of 1.0 weight part, the obtained solution is added to the cleaned dispersing system. The dispersing system is further decantation-cleaned, finally filtered, and dried at 120° C., thereby forming a precursor.

Subsequently, in order to adjust an amount of lithium, the LiOH aqueous solution of 2N of 2 weight parts is impregnated into the obtained precursor sample of 10 weight parts and uniformly mixed and the obtained sample is dried, thereby obtaining a baked precursor. The baked precursor is temperature-elevated in the air flow at a rate of 5° C. per minute by using the electric furnace, held at 950° C. for 5 hours, and thereafter, cooled down to 150° C. at a rate of 7° C. per minute, thereby obtaining a cathode active material of Example 7-1.

Example 7-2

First, the composite oxide particle of 20 weight parts used in Example 7-1 is stirred and dispersed into the LiOH aqueous solution of 2N of 80° C. and 300 weight parts for 2 hours (in the present system, pH=14.3). Subsequently, an aqueous solution of 10 weight parts is formed by adding the pure water to nickel nitrate $Ni(NO_3)_2 \cdot 6H_2O$ of 1.60 weight parts as a commercially available chemical reagent and manganese nitrate $Mn(NO_3)_2 \cdot 6H_2O$ of 1.65 weight parts as a commercially available chemical reagent. The obtained aqueous solution of all of 10 weight parts is added for 2 hours. The agitation-dispersion is further continued at 80° C. for 1 hour and, thereafter, the obtained solution is cooled.

Subsequently, the above dispersing system is decantation-cleaned. Sodium tungstate $Na_2WO_4 \cdot 2H_2O$ of 0.2 weight part as a commercially available chemical reagent is dissolved into the pure water of 2.0 weight parts, the obtained solution is added to the cleaned dispersing system. The dispersing system is further decantation-cleaned, finally filtered, and dried at 120° C., thereby forming a precursor. Subsequently, the obtained precursor is temperature-elevated in the air flow at a rate of 5° C. per minute by using the electric furnace, held at 950° C. for 5 hours, and thereafter, cooled down to 150° C. at a rate of 7° C. per minute, thereby obtaining a cathode active material of Example 7-2.

Example 7-3

An aqueous solution of 20 weight parts is formed by adding the pure water to nickel nitrate $Ni(NO_3)_2 \cdot 6H_2O$ of 3.20 weight parts as a commercially available chemical reagent and manganese nitrate $Mn(NO_3)_2 \cdot 6H_2O$ of 3.30 weight parts as a commercially available chemical reagent. The obtained aqueous solution of all of 20 weight parts is added for 3 hours. Sodium phosphorus tungstate $Na_3[PO_4 \cdot 12WO_3] \cdot 15H_2O$ of 0.1 weight part as a commercially available chemical reagent is dissolved into the pure water of 1.0 weight part and the obtained solution is added. Then, a cathode active material of Example 7-3 is formed in a manner similar to that of Example 7-2.

Example 7-4

An aqueous solution of 20 weight parts is formed by adding the pure water to nickel nitrate $Ni(NO_3)_2 \cdot 6H_2O$ of 3.20 weight parts as a commercially available chemical reagent, manganese nitrate $Mn(NO_3)_2 \cdot 6H_2O$ of 3.30 weight parts as a commercially available chemical reagent, and aluminum nitrate $Al(NO_3)_3 \cdot 9H_2O$ of 0.86 weight part. The obtained aqueous solution of all of 20 weight parts is added for 3 hours. Sodium tungstate $Na_2WO_4 \cdot 2H_2O$ of 0.1 weight part as a commercially available chemical reagent and tungstate anhydride $WO_3$ as a commercially available chemical reagent of 0.05 weight part are dissolved into the pure water of 2.0 weight parts and the obtained solution is added. Then, a cathode active material of Example 7-4 is formed in a manner similar to that of Example 7-2.

<Comparison 7-1>

The composite oxide particle in which the mean compositions are $Li_{1.03}CoO_{2.01}$ and the mean diameter measured by the laser scattering method is equal to 13 μm in Example 7-1 is used for the cathode active material of Comparison 7-1.

<Comparison 7-2>

A cathode active material of Comparison 7-2 is formed in a manner similar to that of Example 7-1 except that sodium tungstate $Na_2WO_4 \cdot 2H_2O$ of 0.10 weight part is not added in Example 7-1.

Evaluation

The secondary batteries shown in FIGS. 1 and 2 are manufactured by using the manufactured cathode active materials of Examples 7-1 to 7-4 and Comparisons 7-1 and 7-2 in a manner similar to that in foregoing Example 1-1.

With respect to the secondary battery manufactured as mentioned above, the charging and discharging are executed under the temperature environment of 45° C. The discharge capacitance at the first cycle is obtained as an initial capacitance. The discharge capacitance maintaining ratio at the 200th cycle to that at the first cycle is obtained.

As for the charging, after the constant current charging was executed by the constant current of 1000 mA until the battery voltage reaches 4.40V, the constant voltage charging is executed by the constant voltage of 4.40V until the sum of charging time reaches 2.5 hours. As for the discharging, the constant current discharging is executed by the constant current of 800 mA until the battery voltage reaches 2.75V. Measurement results are shown in Table 7.

TABLE 7

| | MEAN COMPOSITIONS OF COMPOSITE OXIDE PARTICLE | COATING RAW MATERIAL OF COATING LAYER | COATING RAW MATERIAL OF SURFACE LAYER | INITIAL CAPACITANCE [mAh] | DISCHARGE CAPACITANCE MAINTAINING RATIO [%] |
|---|---|---|---|---|---|
| EXAMPLE 7-1 | $Li_{1.03}CoO_{2.01}$ | $Ni(NO_3)_2 \cdot 6H_2O$, $Mn(NO_3)_2 \cdot 6H_2O$ | $Na_2WO_4 \cdot 2H_2O$ | 2430 | 84 |
| EXAMPLE 7-2 | | | $Na_2WO_4 \cdot 2H_2O$ | 2420 | 86 |
| EXAMPLE 7-3 | | | $Na_3[PO_4 \cdot 12WO_3] \cdot 15H_2O$ | 2450 | 88 |
| EXAMPLE 7-4 | | $Ni(NO_3)_2 \cdot 6H_2O$, $Mn(NO_3)_2 \cdot 6H_2O$, $Al(NO_3)_3 \cdot 9H_2O$ | $Na_2WO_4 \cdot 2H_2O$, $WO_3$ | 2440 | 88 |
| COMPARISON 7-1 | $Li_{1.03}CoO_{2.01}$ | — | — | 2440 | 34 |
| COMPARISON 7-2 | | $Ni(NO_3)_2 \cdot 6H_2O$, $Mn(NO_3)_2 \cdot 6H_2O$ | — | 2450 | 81 |

As shown in Table 7, according to Examples 7-1 to 7-4, the high capacitance is obtained and the discharge capacitance maintaining ratio can be remarkably improved as compared with that in Comparison 7-1. The discharge capacitance maintaining ratio can be also remarkably improved as compared with that in Comparison 7-2 in which the surface layer containing tungsten W is not formed.

As oxide particles constructing the surface layers which are used in following Examples 8 to 10, the following oxide particles are used.

Silicon oxide micro-particle: AEROSIL 200, made by Japan AEROSIL Co., Ltd., Primary mean diameter=about 12 nm (catalogue value)

Aluminum oxide micro-particle: AEROXIDE Alu C, made by DEGUSSA Co., Ltd., Primary mean diameter=about 13 nm (catalogue value)

Zirconium oxide micro-particle: NANOTECH $ZrO_2$, made by Adachi New Industry Co., Ltd., Primary mean diameter=about 20 to 30 nm (catalogue value)

Titanium oxide micro-particle: AEROXIDE $TiO_2$ P25 made by Japan AEROSIL Co., Ltd., Primary mean diameter=about 21 nm (catalogue value)

Example 8

Samples 8-1 to 8-27

In Example 8, a non-aqueous electrolyte secondary battery is formed by using the cathode active material using the composite oxide formed by dissolving gallium Ga into a lithium cobalt acid.

Sample 8-1

First, lithium carbonate $Li_2Co_3$ of 38.1 weight parts as a commercially available chemical reagent, cobalt carbonate $CoCO_3$ of 117.7 weight parts, and gallium nitrate $Ga(NO_3)_3.9H_2O$ of 4.2 weight parts are sufficiently mixed while being pulverized by a ball mill. Subsequently, the obtained mixture is temporarily baked in the air at 650° C. for 5 hours, further held in the air at 950° C. for 20 hours, and thereafter, cooled down to 150° C. at a rate of 7° C. per minute. Subsequently, the mixture is taken out at a room temperature and pulverized, thereby manufacturing the composite oxide particle. According to this composite oxide particle, the mean diameter measured by the laser scattering method is equal to 12 µm and the analysis values of the mean chemical compositions are $Li_{1.03}Co_{0.99}Ga_{0.01}O_{2.02}$.

Such a composite oxide particle of 20 weight parts is stirred and dispersed into the pure water of 80° C. and 300 weight parts for 1 hour. Nickel nitrate $Ni(NO_3)_2.6H_2O$ of 1.60 weight parts as a commercially available chemical reagent and manganese nitrate $Mn(NO_3)_2.6H_2O$ of 1.65 weight parts as a commercially available chemical reagent are added to the obtained solution. The LiOH aqueous solution of 2N is further added for 30 minutes until the value of pH reaches 13. The agitation-dispersion is further continued at 80° C. for 3 hours and, thereafter, the obtained solution is cooled.

Subsequently, the above dispersing system is filtered, cleaned, and dried at 120° C. The analysis result of a metal mole containing ratio of the composite oxide particle in which the coating layer has been formed on the obtained surface is $Li_{1.00}Co_{0.95}Ga_{0.01}Ni_{0.02}Mn_{0.02}$. The silicon oxide micro-particle of 0.01 weight part is added to the obtained composite oxide particle having the coating layer of 10 weight parts and the composite oxide particle is stirred and mixed in the dry manner, thereby manufacturing a precursor sample having good flowability in which the surface of the composite oxide particle having the coating layer has been coated with the silicon oxide micro-particle to thereby obtain the surface layer.

In order to adjust an amount of lithium, the LiOH aqueous solution of 2N of 2 weight parts is impregnated into the obtained precursor sample. The obtained sample is uniformly mixed and dried, thereby obtaining a baked precursor. The baked precursor is temperature-elevated at a rate of 5° C. per minute by using the electric furnace, held at 950° C. for 5 hours, and thereafter, cooled down to 150° C. at a rate of 7° C. per minute, thereby obtaining a cathode active material.

A cylindrical secondary battery is manufactured as follows by using the above cathode active material.

First, the manufactured cathode active material powder of 86 mol %, graphite of 10 mol % serving as a conductive material, and polyvinylidene fluoride PVdF of 4 mol % serving as a binder are mixed and dispersed into N-methyl-2-pyrrolidone NMP serving as a solvent. After that, the both surfaces of the cathode collector made of a belt-shaped aluminum foil having a thickness of 20 µm are coated with the obtained solvent. The collector is dried and compression-molded by the roller pressing machine, thereby forming the cathode mixture layers and manufacturing the cathode. At this time, the cathode active material is sufficiently pulverized by using the grinding machine so as to pass through the opening sieve of 70 µm and used as a cathode active material powder. The gap of the cathode mixture layer is adjusted so as to reach 26% as a volume ratio. Subsequently, the cathode lead made of aluminum is attached to the cathode collector.

The artificial graphite powder of 90 mol % serving as an anode active material and polyvinylidene fluoride of 10 mol % serving as a binder are mixed and dispersed into N-methyl-2-pyrrolidone serving as a solvent. After that, the both surfaces of the anode collector made of a belt-shaped copper foil having a thickness of 10 µm are coated with the obtained solvent. The collector is dried and compression-molded by the roller pressing machine, thereby forming the anode mixture layers and manufacturing the anode. Subsequently, the anode lead made of nickel is attached to the anode collector.

The belt-shaped cathode and belt-shaped anode manufactured as mentioned above are laminated through the separator made of the porous polyolefin film and wound a number of times, thereby manufacturing the spiral type winded electrode member. Subsequently, the winded electrode member is enclosed in the battery can made of iron. The pair of insulating plates are arranged on both of the upper and lower surfaces of the winded electrode member. Subsequently, the cathode lead is led out of the cathode collector and welded to the relief valve mechanism whose electrical conduction with the battery cap has been assured. The anode lead is led out of the anode collector and welded to the bottom portion of the battery can.

After that, the electrolytic solution is injected into the battery can. As an electrolytic solution, $LiPF_6$ is dissolved as an electrolytic salt at 1.0 mol/l into the solvent in which ethylene carbonate and diethyl carbonate have been mixed at a volume ratio of 1:1 and the obtained solution is used. Further, by caulking the battery can through a gasket, the relief valve mechanism, PTC element, and battery cap are fixed and the cylindrical secondary battery having an outer diameter of 18 mm and a height of 65 mm is obtained.

Sample 8-2

The composite oxide particle of 20 weight parts manufactured in Sample 8-1 is stirred and dispersed into the LiOH aqueous solution of 2N of 80° C. and 300 weight parts for 2 hours. Subsequently, nickel nitrate $Ni(NO_3)_2.6H_2O$ of 1.60 weight parts as a commercially available chemical reagent and manganese nitrate $Mn(NO_3)_2.6H_2O$ of 1.65 weight parts as a commercially available chemical reagent are added and the pure water is further added, thereby manufacturing the solution of 10 weight parts. The obtained solution is added for 30 minutes to a solution into which the foregoing composite oxide particle has been dispersed. Thereafter, the agitation-dispersion is continued for 3 hours and obtained solution is cooled.

Subsequently, the above dispersing system is filtered, cleaned, and dried at 120° C. The aluminum oxide micro-particle of 0.02 weight part is added to the obtained composite oxide particle having the coating layer on the surface of 10 weight parts and the composite oxide particle is stirred and mixed in the dry manner, thereby manufacturing a precursor sample having the good flowability in which the surface of the composite oxide particle having the coating layer has been coated with the aluminum oxide micro-particle to thereby obtain the surface layer. The baked precursor is temperature-elevated at a rate of 5° C. per minute by using the electric furnace, held at 950° C. for 5 hours, and thereafter, cooled down to 150° C. at a rate of 7° C. per minute, thereby obtaining a cathode active material. Then, a cylindrical secondary battery is manufactured in a manner similar to that of Sample 8-1.

Sample 8-3

A cylindrical secondary battery is manufactured in a manner similar to that of Sample 8-2 except that a part of the belt-shaped cathode manufactured by being compressed by the roller pressing machine is collected and the compression is further repeated twice under the same conditions by the roller pressing machine.

Sample 8-4

The zirconium oxide micro-particle of 0.01 weight part is added to the composite oxide particle having the coating layer of 10 weight parts and the composite oxide particle is stirred and mixed in the dry manner, thereby obtaining a cathode active material in which the surface of the composite oxide particle having the coating layer has been coated with the zirconium oxide micro-particle to thereby obtain the surface layer. Then, a cylindrical secondary battery is manufactured in a manner similar to that of Sample 8-1.

Sample 8-5

The titanium oxide micro-particle of 0.03 weight part is added to the composite oxide particle having the coating layer of 10 weight parts and the composite oxide particle is stirred and mixed in the dry manner, thereby obtaining a cathode active material in which the surface of the composite oxide particle having the coating layer has been coated with the titanium oxide micro-particle to thereby obtain the surface layer. Then, a cylindrical secondary battery is manufactured in a manner similar to that of Sample 8-1.

Sample 8-6

A cylindrical secondary battery is manufactured in a manner similar to that of Sample 8-2 except that the following points. That is, nickel nitrate $Ni(NO_3)_2 \cdot 6H_2O$ of 3.20 weight parts and manganese nitrate $Mn(NO_3)_2 \cdot 6H_2O$ of 3.30 weight parts are added and the pure water is further added, thereby manufacturing the solution of 20 weight parts. The obtained solution is added for 1 hour to a solution into which the composite oxide has been dispersed, thereby manufacturing the composite oxide particle having the coating layer. Thereafter, the titanium oxide micro-particle of 0.03 weight part is added to the composite oxide particle having the coating layer of 10 weight parts and the composite oxide particle is stirred and mixed in the dry manner. Thus, the surface of the composite oxide particle having the coating layer is coated with the titanium oxide micro-particle to thereby obtain the surface layer.

Sample 8-7

A cylindrical secondary battery is manufactured in a manner similar to that of Sample 8-2 except that the following points. That is, nickel nitrate of 2.40 weight parts and manganese nitrate of 0.83 weight part are added and the pure water is further added, thereby manufacturing the solution of 10 weight parts. The obtained solution is added for 30 minutes to a solution into which the composite oxide has been dispersed, thereby manufacturing the composite oxide particle having the coating layer. The cathode active material manufactured so as not to form the surface layer is used.

Sample 8-8

A cylindrical secondary battery is manufactured in a manner similar to that of Sample 8-7 except that it uses the cathode active material manufactured by adding silicon oxide micro-particle of 0.01 weight part to the composite oxide particle having the coating layer of 10 weight parts and by forming the surface layer by the dry-type agitation-mixture.

Sample 8-9

A cylindrical secondary battery is manufactured in a manner similar to that of Sample 8-7 except that it uses the cathode active material manufactured by adding aluminum oxide micro-particle of 0.02 weight part to the composite oxide particle having the coating layer of 10 weight parts and by forming the surface layer by the dry-type agitation-mixture.

Sample 8-10

A cylindrical secondary battery is manufactured in a manner similar to that of Sample 8-7 except that it uses the cathode active material manufactured by adding titanium oxide micro-particle of 0.03 weight part to the composite oxide particle having the coating layer of 10 weight parts and by forming the surface layer by the dry-type agitation-mixture.

Sample 8-11

A cylindrical secondary battery is manufactured in a manner similar to that of Sample 8-7 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 8-12

A cathode active material made of the composite oxide particle in which only the coating layer has been formed and which does not have the surface layer is manufactured by a method similar to that of Sample 8-1 except that the composite oxide particle is manufactured by mixing lithium carbonate $Li_2CO_3$ of 38.1 weight parts as a commercially available chemical reagent, cobalt carbonate $CoCO_3$ of 117.7 weight parts, and gallium nitrate $Ga(NO_3)_3 \cdot 9H_2O$ of 4.2 weight parts. According to this composite oxide particle, the mean diameter measured by the laser scattering method is equal to 12 μm and the analysis values of the mean chemical compositions are $Li_{1.03}Cu_{0.997}Ga_{0.03}O_{2.02}$. A cylindrical secondary battery is manufactured in a manner similar to that of Sample 8-1 except that the cathode active material is used.

Sample 8-13

A cylindrical secondary battery is manufactured in a manner similar to that of Sample 8-12 except that it uses the cathode active material manufactured by adding silicon oxide micro-particle of 0.01 weight part to the composite oxide particle having the coating layer of 10 weight parts and by forming the surface layer by the dry-type agitation-mixture.

Sample 8-14

A cylindrical secondary battery is manufactured in a manner similar to that of Sample 8-12 except that it uses the cathode active material manufactured by adding aluminum oxide micro-particle of 0.02 weight part to the composite oxide particle having the coating layer of 10 weight parts and by forming the surface layer by the dry-type agitation-mixture.

Sample 8-15

A cylindrical secondary battery is manufactured in a manner similar to that of Sample 8-12 except that it uses the cathode active material manufactured by adding titanium oxide micro-particle of 0.03 weight part to the composite oxide particle having the coating layer of 10 weight parts and by forming the surface layer by the dry-type agitation-mixture.

Sample 8-16

A cylindrical secondary battery is manufactured in a manner similar to that of Sample 8-12 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 8-17

A cathode active material made of the composite oxide particle in which only the coating layer has been formed and which does not have the surface layer is manufactured by a method similar to that of Sample 8-2 except that the composite oxide particle is manufactured by mixing lithium carbonate $Li_2CO_3$ of 38.1 weight parts as a commercially available chemical reagent, cobalt carbonate $CoCO_3$ of 116.5 weight parts, gallium nitrate $Ga(NO_3)_3 \cdot 9H_2O$ of 0.42 weight part, aluminum hydroxide $Al(OH)_3$ of 0.78 weight part, and magnesium carbonate $MgCO_3$ of 0.84 weight part. According to this composite oxide particle, the mean diameter measured by the laser scattering method is equal to 13 μm and the analysis values of the mean chemical compositions are $Li_{1.03}Co_{0.979}Ga_{0.001}Al_{0.01}Mg_{0.01}O_{2.02}$. A cylindrical secondary battery is manufactured in a manner similar to that of Sample 8-1 except that the cathode active material is used.

Sample 8-18

A cylindrical secondary battery is manufactured in a manner similar to that of Sample 8-17 except that it uses the cathode active material manufactured by adding silicon oxide micro-particle of 0.01 weight part to the composite oxide particle having the coating layer of 10 weight parts and by forming the surface layer by the dry-type agitation-mixture.

Sample 8-19

A cylindrical secondary battery is manufactured in a manner similar to that of Sample 8-17 except that it uses the cathode active material manufactured by adding aluminum oxide micro-particle of 0.05 weight part to the composite oxide particle having the coating layer of 10 weight parts and by forming the surface layer by the dry-type agitation-mixture.

Sample 8-20

A cylindrical secondary battery is manufactured in a manner similar to that of Sample 8-17 except that it uses the cathode active material manufactured by adding titanium oxide micro-particle of 0.03 weight part to the composite oxide particle having the coating layer of 10 weight parts and by forming the surface layer by the dry-type agitation-mixture.

Sample 8-21

A cylindrical secondary battery is manufactured in a manner similar to that of Sample 8-17 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 8-22

A composite oxide particle is manufactured by a method similar to that of Sample 8-1 except that the composite oxide particle is manufactured by mixing lithium carbonate $Li_2CO_3$ of 38.1 weight parts as a commercially available chemical reagent and cobalt carbonate $CoCO_3$ of 118.9 weight parts. According to this composite oxide particle, the mean diameter measured by the laser scattering method is equal to 12 μm and the analysis values of the mean chemical compositions are $Li_{1.03}CoO_{2.02}$. A cylindrical secondary battery is manufactured in a manner similar to that of Sample 8-2 except that it uses the cathode active material obtained by forming the coating layer and the surface layer made of aluminum oxide by using the lithium cobalt acid particle by a method similar to that of Sample 8-2 and, thereafter, baking.

Sample 8-23

A cylindrical secondary battery is manufactured in a manner similar to that of Sample 8-22 except that a part of the belt-shaped cathode manufactured by being compressed by the roller pressing machine is collected and the compression is further repeated twice under the same conditions by the roller pressing machine.

Sample 8-24

A cylindrical secondary battery is manufactured in a manner similar to that of Sample 8-22 except that it used the cathode active material in which the coating layer is not provided.

Sample 8-25

A cathode active material made of the composite oxide particle in which only the coating layer has been formed and which does not have the surface layer is manufactured by a method similar to that of Sample 8-2 except that the composite oxide particle is manufactured by mixing lithium carbonate $Li_2CO_3$ of 38.1 weight parts as a commercially available chemical reagent, cobalt carbonate $CoCO_3$ of 112.9 weight parts, and gallium nitrate $Ga(NO_3)_3.9H_2O$ of 21.0 weight parts. According to this composite oxide particle, the mean diameter measured by the laser scattering method is equal to 12 μm and the analysis values of the mean chemical compositions are $Li_{1.03}Co_{0.95}Ga_{0.05}O_{2.02}$. A cylindrical secondary battery is manufactured in a manner similar to that of Sample 8-1 except that the cathode active material is used.

Sample 8-26

A cylindrical secondary battery is manufactured in a manner similar to that of Sample 8-1 except that the coating layer is formed by adding nickel nitrate $Ni(NO_3)_2.6H_2O$ of 0.64 weight part as a commercially available chemical reagent and manganese nitrate $Mn(NO_3)_2.6H_2O$ of 2.64 weight parts as a commercially available chemical reagent into a solution obtained by stirring and dispersing the composite oxide particle of 20 weight parts into the pure water and the surface layer is not provided.

Sample 8-27

A cylindrical secondary battery is manufactured in a manner similar to that of Sample 8-26 except that it uses the cathode active material manufactured by adding aluminum oxide micro-particle of 0.02 weight part to the composite oxide particle having the coating layer of 10 weight parts and by forming the surface layer by the dry-type agitation-mixture.

[Evaluation of Cylindrical Secondary Battery]

(a) Initial Capacitance

With respect to the cylindrical secondary battery manufactured as mentioned above, the charging and discharging are executed under the environment temperature of 45° C. and the discharge capacitance at the first cycle is obtained as an initial capacitance.

As for the charging, after the constant current charging was executed by the constant current of 1000 mA until the battery voltage reaches 4.40V, the constant voltage charging is executed by the constant voltage of 4.40V until the sum of charging time reaches 2.5 hours. As for the discharging, the constant current discharging is executed by the constant current of 800 mA until the battery voltage reaches 2.75V.

(b) Capacitance Maintaining Ratio

With respect to the cylindrical secondary battery whose initial capacitance has been obtained as mentioned in (a), the charging and discharging are executed under the same conditions until the 200 cycles, the discharge capacitance at the 200th cycle is measured, and the capacitance maintaining ratio for the initial capacitance is obtained.

An evaluation result is shown in Table 8.

TABLE 8

| | | COATING LAYER | | | SURFACE LAYER | | COMPRESSION | | |
|---|---|---|---|---|---|---|---|---|---|
| | COMPOSITE OXIDE PARTICLE | MIXTURE AMOUNT OF NICKEL NITRATE [WEIGHT PARTS] | MIXTURE AMOUNT OF MANGANESE NITRATE [WEIGHT PARTS] | Ni:Mn RATIO | MATERIAL | MIXTURE AMOUNT [WEIGHT PARTS] | OF CATHODE ACTIVE MATERIAL LAYER | INITIAL CAPACITANCE [mAh] | CAPACITANCE MAINTAINING RATIO [%] |
| SAMPLE 8-1 | $Li_{1.03}Co_{0.99}Ga_{0.99}Ga_{0.01}O_{2.02}$ | 1.60 | 1.65 | 5:5 | $SiO_2$ | 0.01 | X | 2410 | 84 |
| SAMPLE 8-2 | | | | | $Al_2O_2$ | 0.02 | X | 2440 | 86 |
| SAMPLE 8-3 | | | | | $Al_2O_2$ | 0.02 | ○ | 2420 | 84 |
| SAMPLE 8-4 | | | | | $ZrO_2$ | 0.01 | X | 2430 | 85 |
| SAMPLE 8-5 | | | | | $TiO_2$ | 0.03 | X | 2420 | 84 |
| SAMPLE 8-6 | | 3.20 | 3.30 | 5:5 | $TiO_2$ | 0.03 | X | 2420 | 85 |
| SAMPLE 8-7 | | 2.40 | 0.83 | 7.5:2.5 | — | — | X | 2400 | 82 |
| SAMPLE 8-8 | | | | | $SiO_2$ | 0.01 | X | 2450 | 85 |
| SAMPLE 8-9 | | | | | $Al_2O_2$ | 0.02 | X | 2470 | 87 |
| SAMPLE 8-10 | | | | | $TiO_2$ | 0.03 | X | 2450 | 85 |
| SAMPLE 8-11 | | | | | $ZrO_2$ | 0.01 | X | 2460 | 84 |
| SAMPLE 8-12 | $Li_{1.03}Co_{0.997}Ga_{0.003}O_{2.02}$ | 1.60 | 1.65 | 5:5 | — | — | X | 2400 | 83 |
| SAMPLE 8-13 | | | | | $SiO_2$ | 0.01 | X | 2430 | 84 |
| SAMPLE 8-14 | | | | | $Al_2O_2$ | 0.02 | X | 2450 | 86 |
| SAMPLE 8-15 | | | | | $TiO_2$ | 0.03 | X | 2430 | 84 |
| SAMPLE 8-16 | | | | | $ZrO_2$ | 0.01 | X | 2430 | 85 |
| SAMPLE 8-17 | $Li_{1.03}Co_{0.979}Ga_{0.001}Al_{0.01}Mg_{0.01}O_{2.02}$ | 1.60 | 1.65 | 5:5 | — | — | X | 2400 | 84 |
| SAMPLE 8-18 | | | | | $SiO_2$ | 0.01 | X | 2410 | 88 |
| SAMPLE 8-19 | | | | | $Al_2O_2$ | 0.05 | X | 2400 | 88 |
| SAMPLE 8-20 | | | | | $TiO_2$ | 0.03 | X | 2410 | 87 |
| SAMPLE 8-21 | | | | | $ZrO_2$ | 0.01 | X | 2420 | 88 |
| SAMPLE 8-22 | $Li_{1.03}CoO_{2.02}$ | 1.60 | 1.65 | 5:5 | $Al_2O_2$ | 0.02 | X | 2460 | 82 |
| SAMPLE 8-23 | | | | | $Al_2O_2$ | 0.02 | ○ | 2450 | 76 |
| SAMPLE 8-24 | | — | — | — | $Al_2O_2$ | 0.02 | X | 2220 | 80 |
| SAMPLE 8-25 | $Li_{1.03}Co_{0.95}Ga_{0.05}O_{2.02}$ | 1.60 | 1.65 | 5:5 | — | — | X | 2180 | 82 |
| SAMPLE 8-26 | $Li_{1.03}Co_{0.99}Ga_{0.01}O_{2.02}$ | 0.64 | 2.64 | 4:6 | — | — | X | 2390 | 52 |
| SAMPLE 8-27 | | — | — | — | $Al_2O_2$ | 0.02 | X | 2380 | 56 |

As will be understood from Table 8, the secondary battery in which both of the large initial capacitance and capacitance maintaining ratio are satisfied can be manufactured by using the cathode active material in which the coating layer made of the oxide containing lithium Li and at least one of nickel Ni and manganese Mn and the surface layer containing at least one kind of silicon oxide, aluminum oxide, zirconium oxide, and titanium oxide have been provided for the composite oxide particle shown by Formula 2 and made of lithium cobalt acid into which gallium Ga has been dissolved.

As will be understood by comparing, for example, Sample 8-7 with Samples 8-8 to 8-11, in the composite oxide particles having the coating layers manufactured under the same conditions, in the case where the surface layer made of one of silicon oxide, aluminum oxide, zirconium oxide, and titanium oxide is provided, the initial capacitance and the capacitance maintaining ratio are improved more than those in the case where the surface layer is not provided.

As will be understood by comparing Sample 8-9 with Sample 8-27, in the composite oxide particles having the surface layers manufactured under the same conditions, in the case where the coating layer is provided, the initial capacitance and the capacitance maintaining ratio are improved more than those in the case where the coating layer is not provided.

Example 9

Samples 9-1 to 9-24

In Example 9, a non-aqueous electrolyte secondary battery is formed by using the cathode active material using the composite oxide formed by dissolving bismuth Bi into the lithium cobalt acid.

Sample 9-1

First, lithium carbonate $Li_2CO_3$ of 38.1 weight parts as a commercially available chemical reagent, cobalt carbonate $CoCO_3$ of 118.3 weight parts, and bismuth carbonate $(BiO)_2CO_3$ of 1.27 weight parts are sufficiently mixed while being pulverized by the ball mill. Subsequently, the obtained mixture is temporarily baked in the air at 650° C. for 5 hours, further held in the air at 950° C. for 20 hours, and thereafter, cooled down to 150° C. at a rate of 7° C. per minute. Subsequently, the mixture is taken out at a room temperature and pulverized, thereby manufacturing the composite oxide particle. According to this composite oxide particle, the mean diameter measured by the laser scattering method is equal to 11 μm and the analysis values of the mean chemical compositions are $Li_{1.03}Co_{0.995}Bi_{0.005}O_{2.02}$.

The coating layer and the surface layer made of the silicon oxide micro-particle are provided for such a composite oxide particle by a method similar to that of Sample 8-1, thereby manufacturing a cathode active material. A cylindrical secondary battery is manufactured by using the cathode active material.

Sample 9-2

The coating layer and the surface layer made of the aluminum oxide micro-particle are provided for the composite oxide particle similar to that in Sample 9-1 by a method similar to that of Sample 8-2, thereby manufacturing a cathode active material. A cylindrical secondary battery is manufactured by using the cathode active material.

Sample 9-3

A cylindrical secondary battery is manufactured in a manner similar to that of Sample 9-2 except that a part of the belt-shaped cathode manufactured by being compressed by the roller pressing machine is collected and the compression is further repeated twice under the same conditions by the roller pressing machine.

Sample 9-4

The zirconium oxide micro-particle of 0.01 weight part is added to the composite oxide particle having the coating layer of 10 weight parts and the composite oxide particle is stirred and mixed in the dry manner, thereby obtaining a cathode active material in which the surface of the composite oxide particle having the coating layer has been coated with the zirconium oxide micro-particle to thereby obtain the surface layer. Then, a cylindrical secondary battery is manufactured in a manner similar to that of Sample 9-1.

Sample 9-5

The titanium oxide micro-particle of 0.03 weight part is added to the composite oxide particle having the coating layer of 10 weight parts and the composite oxide particle is stirred and mixed in the dry manner, thereby obtaining a cathode active material in which the surface of the composite oxide particle having the coating layer has been coated with the titanium oxide micro-particle to thereby obtain the surface layer. Then, a cylindrical secondary battery is manufactured in a manner similar to that of Sample 9-1.

Sample 9-6

A cylindrical secondary battery is manufactured in a manner similar to that of Sample 9-2 except that the following points. That is, nickel nitrate of 3.20 weight parts and manganese nitrate of 3.30 weight parts are added and the pure water is further added, thereby manufacturing the solution of 20 weight parts. The obtained solution is added for 1 hour to a solution into which the composite oxide has been dispersed, thereby manufacturing the composite oxide particle having the coating layer. Thereafter, the titanium oxide micro-particle of 0.03 weight part is added to the composite oxide particle having the coating layer of 10 weight parts and the composite oxide particle is stirred and mixed in the dry manner. Thus, the surface of the composite oxide particle having the coating layer is coated with the titanium oxide micro-particle to thereby obtain the surface layer.

Sample 9-7

A composite oxide particle in which the coating layer has been formed is manufactured by a method similar to that of Sample 8-2 except that the composite oxide particle is manufactured by mixing lithium carbonate $Li_2CO_3$ of 38.1 weight parts as a commercially available chemical reagent, cobalt carbonate $CoCO_3$ of 115.3 weight parts, bismuth carbonate $(BiO)_2CO_3$ of 2.55 weight parts, aluminum hydroxide $Al(OH)_3$ of 0.78 weight part, and magnesium carbonate $MgCO_3$ of 0.84 weight part. According to this composite oxide particle, the mean diameter measured by the laser scattering method is equal to 12 μm and the analysis values of the mean chemical compositions are $Li_{1.03}Co_{0.97}Al_{0.01}Mg_{0.01}Bi_{0.01}O_{2.02}$. A cylindrical secondary battery is manufactured in a manner similar to that of Sample 9-2 except that it uses the cathode active material manufactured by adding the aluminum oxide micro-particle of 0.05 weight part to the composite oxide particle having the coating layer of 10 weight parts and the surface layer is formed by the dry-type agitation-mixture.

Sample 9-8

A cathode active material made of the composite oxide particle in which only the coating layer has been formed and which does not have the surface layer is manufactured by a method similar to that of Sample 9-1 except that the composite oxide particle is manufactured by mixing lithium carbonate $Li_2CO_3$ of 38.1 weight parts as a commercially available chemical reagent, cobalt carbonate $CoCO_3$ of 115.3 weight parts, bismuth carbonate $(BiO)_2CO_3$ of 1.28 weight parts, aluminum hydroxide $Al(OH)_3$ of 0.78 weight part, and magnesium carbonate $MgCO_3$ of 0.84 weight part. According to this composite oxide particle, the mean diameter measured by the laser scattering method is equal to 12 μm and the analysis values of the mean chemical compositions are $Li_{1.03}Co_{0.975}Al_{0.01}Mg_{0.01}Bi_{0.005}O_{2.02}$. A cylindrical secondary battery is manufactured in a manner similar to that of Sample 9-1 except that the cathode active material is used.

Sample 9-9

A cylindrical secondary battery is manufactured in a manner similar to that of Sample 9-8 except that it uses the cathode active material manufactured by adding silicon oxide micro-particle of 0.01 weight part to the composite oxide particle having the coating layer of 10 weight parts and by forming the surface layer by the dry-type agitation-mixture.

Sample 9-10

A cylindrical secondary battery is manufactured in a manner similar to that of Sample 9-8 except that it uses the cathode active material manufactured by adding aluminum oxide micro-particle of 0.02 weight part to the composite oxide particle having the coating layer of 10 weight parts and by forming the surface layer by the dry-type agitation-mixture.

Sample 9-11

A cylindrical secondary battery is manufactured in a manner similar to that of Sample 9-8 except that it uses the cathode active material manufactured by adding titanium oxide micro-particle of 0.03 weight part to the composite oxide particle having the coating layer of 10 weight parts and by forming the surface layer by the dry-type agitation-mixture.

Sample 9-12

A cylindrical secondary battery is manufactured in a manner similar to that of Sample 9-8 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 9-13

A cylindrical secondary battery is manufactured in a manner similar to that of Sample 9-2 except that the following points. That is, nickel nitrate of 2.60 weight parts and manganese nitrate of 0.70 weight part are added and the pure water is further added, thereby manufacturing the solution of 10 weight parts. The obtained solution is added for 30 minutes to a solution into which the composite oxide has been dispersed, thereby manufacturing the composite oxide particle having the coating layer. The cathode active material manufactured so as not to form the surface layer is used.

Sample 9-14

A cylindrical secondary battery is manufactured in a manner similar to that of Sample 9-13 except that it uses the cathode active material manufactured by adding silicon oxide micro-particle of 0.01 weight part to the composite oxide particle having the coating layer of 10 weight parts and by forming the surface layer by the dry-type agitation-mixture.

Sample 9-15

A cylindrical secondary battery is manufactured in a manner similar to that of Sample 9-13 except that it uses the cathode active material manufactured by adding aluminum oxide micro-particle of 0.02 weight part to the composite oxide particle having the coating layer of 10 weight parts and by forming the surface layer by the dry-type agitation-mixture.

Sample 9-16

A cylindrical secondary battery is manufactured in a manner similar to that of Sample 9-13 except that it uses the cathode active material manufactured by adding titanium oxide micro-particle of 0.03 weight part to the composite oxide particle having the coating layer of 10 weight parts and by forming the surface layer by the dry-type agitation-mixture.

Sample 9-17

A cylindrical secondary battery is manufactured in a manner similar to that of Sample 9-13 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 9-18

A composite oxide particle is manufactured by a method similar to that of Sample 9-2 except that the composite oxide particle is manufactured by mixing lithium carbonate $Li_2CO_3$ of 38.1 weight parts as a commercially available chemical reagent and cobalt carbonate $CoCO_3$ of 118.9 weight parts. According to this composite oxide particle, the mean diameter measured by the laser scattering method is equal to 12 μm and the analysis values of the mean chemical compositions are $Li_{1.03}CoO_{2.02}$. A cylindrical secondary battery is manufactured in a manner similar to that of Sample 8-2 except that it uses the cathode active material obtained by forming the coating layer and the surface layer made of aluminum oxide by using the lithium cobalt acid particle by a method similar to that of Sample 8-2 and, thereafter, baking.

Sample 9-19

A cylindrical secondary battery is manufactured in a manner similar to that of Sample 9-18 except that a part of the belt-shaped cathode manufactured by being compressed by the roller pressing machine is collected and the compression is further repeated twice under the same conditions by the roller pressing machine.

Sample 9-20

A cylindrical secondary battery is manufactured in a manner similar to that of Sample 9-18 except that the cathode active material manufactured without forming the coating layer and the surface layer is used.

Sample 9-21

A cylindrical secondary battery is manufactured in a manner similar to that of Sample 9-1 except that the cathode active material manufactured without forming the surface layer is used.

Sample 9-22

A cylindrical secondary battery is manufactured in a manner similar to that of Sample 9-2 except that the following points. That is, manganese nitrate $Mn(NO_3)_2 \cdot 6H_2O$ of 6.6 weight parts is added and the pure water is further added, thereby manufacturing the solution of 20 weight parts. The obtained solution is added for 30 minutes to a solution into which the composite oxide has been dispersed, thereby manufacturing the composite oxide particle having the coating layer. The cathode active material manufactured so as not to form the surface layer is used.

Sample 9-23

A cylindrical secondary battery is manufactured in a manner similar to that of Sample 9-8 except that it used the cathode active material manufactured so as not to form the coating layer.

Sample 9-24

A composite oxide particle is manufactured by a method similar to that of Sample 9-1 except that the composite oxide particle is manufactured by mixing lithium carbonate $Li_2CO_3$ of 38.1 weight parts as a commercially available chemical reagent, cobalt carbonate $CoCO_3$ of 89.1 weight parts, and bismuth carbonate $(BiO)_2CO_3$ of 63.8 weight parts. According to this composite oxide particle, the mean diameter measured by the laser scattering method is equal to 11 μm and the analysis values of the mean chemical compositions are $Li_{1.03}Co_{0.75}Bi_{0.25}O_{2.02}$. A cylindrical secondary battery is manufactured in a manner similar to that of Sample 9-1 except that it uses the cathode active material manufactured by using the composite oxide particle and baking by a method similar to that of Sample 8-1 without forming the coating layer and the surface layer.

[Evaluation of Cylindrical Secondary Battery]

(a) The initial capacitance and (b) the capacitance maintaining ratio are evaluated by using a method similar to that in the evaluation of Samples 8-1 to 8-27.

An evaluation result is shown in Table 9.

TABLE 9

| | | COATING LAYER | | | SURFACE LAYER | | COMPRESSION | | |
|---|---|---|---|---|---|---|---|---|---|
| | COMPOSITE OXIDE PARTICLE | MIXTURE AMOUNT OF NICKEL NITRATE [WEIGHT PARTS] | MIXTURE AMOUNT OF MANGANESE NITRATE [WEIGHT PARTS] | Ni:Mn RATIO | MATERIAL | MIXTURE AMOUNT [WEIGHT PARTS] | OF CATHODE ACTIVE MATERIAL LAYER | INITIAL CAPACITANCE [mAh] | CAPACITANCE MAINTAINING RATIO [%] |
| SAMPLE 9-1 | $Li_{1.03}Co_{0.995}Bi_{0.005}O_{2.02}$ | 1.60 | 1.65 | 5:5 | $SiO_2$ | 0.01 | X | 2420 | 83 |
| SAMPLE 9-2 | | | | | $Al_2O_2$ | 0.02 | X | 2430 | 84 |
| SAMPLE 9-3 | | | | | $Al_2O_2$ | 0.02 | ○ | 2420 | 82 |
| SAMPLE 9-4 | | | | | $ZrO_2$ | 0.01 | X | 2420 | 83 |
| SAMPLE 9-5 | | | | | $TiO_2$ | 0.03 | X | 2440 | 82 |
| SAMPLE 9-6 | | 3.20 | 3.30 | 5:5 | $TiO_2$ | 0.03 | X | 2450 | 86 |
| SAMPLE 9-7 | $Li_{1.03}Co_{0.97}Bi_{0.01}Al_{0.01}Mg_{0.01}O_{2.02}$ | 1.60 | 1.65 | 5:5 | $Al_2O_2$ | 0.05 | X | 2410 | 85 |
| SAMPLE 9-8 | $Li_{1.03}Co_{0.975}Bi_{0.005}Al_{0.01}Mg_{0.01}O_{2.02}$ | 1.60 | 1.65 | 5:5 | — | — | X | 2400 | 83 |
| SAMPLE 9-9 | | | | | $SiO_2$ | 0.01 | X | 2420 | 84 |
| SAMPLE 9-10 | | | | | $Al_2O_2$ | 0.02 | X | 2430 | 86 |
| SAMPLE 9-11 | | | | | $TiO_2$ | 0.03 | X | 2410 | 83 |
| SAMPLE 9-12 | | | | | $ZrO_2$ | 0.01 | X | 2440 | 84 |
| SAMPLE 9-13 | | 2.60 | 0.70 | 8:2 | — | — | X | 2410 | 86 |
| SAMPLE 9-14 | | | | | $SiO_2$ | 0.01 | X | 2430 | 87 |
| SAMPLE 9-15 | | | | | $Al_2O_2$ | 0.02 | X | 2450 | 87 |
| SAMPLE 9-16 | | | | | $TiO_2$ | 0.03 | X | 2450 | 84 |
| SAMPLE 9-17 | | | | | $ZrO_2$ | 0.01 | X | 2430 | 87 |
| SAMPLE 9-18 | $Li_{1.03}CoO_{2.02}$ | 1.60 | 1.65 | 5:5 | $Al_2O_2$ | 0.02 | X | 2360 | 76 |
| SAMPLE 9-19 | | | | | $Al_2O_2$ | 0.02 | ○ | 2400 | 76 |
| SAMPLE 9-20 | | — | — | — | — | — | X | 2200 | 80 |
| SAMPLE 9-21 | $Li_{1.03}Co_{0.995}Bi_{0.005}O_{2.02}$ | 1.60 | 1.65 | 5:5 | — | — | X | 2200 | 81 |
| SAMPLE 9-22 | | — | 6.6 | 0:10 | — | — | X | 1750 | 50 |
| SAMPLE 9-23 | $Li_{1.03}Co_{0.975}Bi_{0.005}Al_{0.01}Mg_{0.01}O_{2.02}$ | — | — | — | — | — | X | 2440 | 65 |
| SAMPLE 9-24 | $Li_{1.03}Co_{0.75}Bi_{0.25}O_{2.02}$ | — | — | — | — | — | X | 1300 | 32 |

As will be understood from Table 9, the secondary battery in which both of the large initial capacitance and capacitance maintaining ratio are satisfied can be manufactured by using the cathode active material in which the coating layer made of the oxide containing lithium Li and at least one of nickel Ni and manganese Mn and the surface layer containing at least one kind of silicon oxide, aluminum oxide, zirconium oxide, and titanium oxide have been provided for the composite oxide particle shown by Formula 2 and made of lithium cobalt acid into which bismuth Bi has been dissolved.

Example 10

Samples 10-1 to 10-57

In Example 10, a non-aqueous electrolyte secondary battery is formed by using the cathode active material using the composite oxide formed by dissolving at least one kind selected from magnesium Mg, aluminum Al, titanium, and zirconium Zr into the lithium cobalt acid.

Sample 10-1

First, lithium carbonate $Li_2CO_3$ of 38.1 weight parts as a commercially available chemical reagent, cobalt carbonate $CoCO_3$ of 116.5 weight parts, aluminum hydroxide $Al(OH)_3$ of 7.8 weight parts, and magnesium carbonate $MgCO_3$ of 8.4 weight parts are sufficiently mixed while being pulverized by the ball mill. Subsequently, the obtained mixture is temporarily baked in the air at 650° C. for 5 hours, further held in the air at 950° C. for 20 hours, and thereafter, cooled down to 150° C. at a rate of 7° C. per minute. Subsequently, the mixture is taken out at a room temperature and pulverized, thereby manufacturing the composite oxide particle. According to this composite oxide particle, the mean diameter measured by the laser scattering method is equal to 13 μm and the analysis values of the mean chemical compositions are $Li_{1.03}Co_{0.98}Al_{0.01}Mg_{0.01}O_{2.02}$.

The coating layer and the surface layer made of the silicon oxide micro-particle are provided for such a composite oxide particle by a method similar to that of Sample 8-1, thereby manufacturing a cathode active material. A cylindrical secondary battery is manufactured by using the cathode active material.

Sample 10-2

A cylindrical secondary battery is manufactured in a manner similar to that of Sample 10-1 except that it uses the cathode active material manufactured by adding aluminum oxide micro-particle of 0.01 weight part to the composite oxide particle having the coating layer of 10 weight parts and by forming the surface layer by the dry-type agitation-mixture.

Sample 10-3

A cylindrical secondary battery is manufactured in a manner similar to that of Sample 10-1 except that it uses the cathode active material manufactured by adding titanium oxide micro-particle of 0.01 weight part to the composite oxide particle having the coating layer of 10 weight parts and by forming the surface layer by the dry-type agitation-mixture.

Sample 10-4

A cylindrical secondary battery is manufactured in a manner similar to that of Sample 10-1 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 10-5

A cylindrical secondary battery is manufactured in a manner similar to that of Sample 10-1 except that when the coating layer is provided for the composite oxide particle, nickel nitrate $Ni(NO_3)_2.6H_2O$ of 2.56 weight parts as a commercially available chemical reagent and manganese nitrate $Mn(NO_3)_2.6H_2O$ of 0.32 weight part as a commercially available chemical reagent are added to the composite oxide particle of 20 weight parts.

Sample 10-6

A cylindrical secondary battery is manufactured in a manner similar to that of Sample 10-5 except that it uses the cathode active material manufactured by adding aluminum oxide micro-particle of 0.01 weight part to the composite oxide particle having the coating layer of 10 weight parts and by forming the surface layer by the dry-type agitation-mixture.

Sample 10-7

A cylindrical secondary battery is manufactured in a manner similar to that of Sample 10-5 except that it uses the cathode active material manufactured by adding titanium oxide micro-particle of 0.01 weight part to the composite oxide particle having the coating layer of 10 weight parts and by forming the surface layer by the dry-type agitation-mixture.

Sample 10-8

A cylindrical secondary battery is manufactured in a manner similar to that of Sample 10-5 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 10-9

A cylindrical secondary battery is manufactured in a manner similar to that of Sample 10-1 except that when the coating layer is provided for the composite oxide particle, nickel nitrate $Ni(NO_3)_2.6H_2O$ of 3.20 weight parts as a commercially available chemical reagent is added to the composite oxide particle of 20 weight parts.

Sample 10-10

A cylindrical secondary battery is manufactured in a manner similar to that of Sample 10-9 except that it uses the cathode active material manufactured by adding aluminum oxide micro-particle of 0.01 weight part to the composite oxide particle having the coating layer of 10 weight parts and by forming the surface layer by the dry-type agitation-mixture.

Sample 10-11

A cylindrical secondary battery is manufactured in a manner similar to that of Sample 10-9 except that it uses the cathode active material manufactured by adding titanium oxide micro-particle of 0.01 weight part to the composite oxide particle having the coating layer of 10 weight parts and by forming the surface layer by the dry-type agitation-mixture.

Sample 10-12

A cylindrical secondary battery is manufactured in a manner similar to that of Sample 10-9 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 10-13

Lithium carbonate $Li_2CO_3$ of 38.1 weight parts as a commercially available chemical reagent and cobalt carbonate $CoCO_3$ of 116.5 weight parts are sufficiently mixed to the composite oxide particle while being pulverized by the ball mill. Titanium ethoxide $(C_2H_5O)_4Ti$ of 45.6 weight parts is dissolved into ethyl alcohol anhydride, the obtained material is added and mixed to the obtained composite oxide particle. The obtained mixture is baked and pulverized under conditions similar to those of Sample 8-1, thereby manufacturing the composite oxide particle. According to this composite oxide particle, the mean diameter measured by the laser scattering method is equal to 15 μm and the analysis values of the mean chemical compositions are $Li_{1.03}Co_{0.98}Ti_{0.02}O_{2.02}$.

A cylindrical secondary battery is manufactured in a manner similar to that of Sample 8-1 except that it used the cathode active material manufactured by providing the coating layer and the surface layer made of the silicon oxide micro-particle for such a composite oxide particle by a method similar to that of Sample 8-1.

Sample 10-14

A cylindrical secondary battery is manufactured in a manner similar to that of Sample 10-13 except that it uses the cathode active material manufactured by adding aluminum oxide micro-particle of 0.01 weight part to the composite oxide particle having the coating layer of 10 weight parts and by forming the surface layer by the dry-type agitation-mixture.

Sample 10-15

A cylindrical secondary battery is manufactured in a manner similar to that of Sample 10-13 except that it uses the cathode active material manufactured by adding titanium oxide micro-particle of 0.01 weight part to the composite oxide particle having the coating layer of 10 weight parts and by forming the surface layer by the dry-type agitation-mixture.

Sample 10-16

A cylindrical secondary battery is manufactured in a manner similar to that of Sample 10-13 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 10-17

A cylindrical secondary battery is manufactured in a manner similar to that of Sample 10-13 except that when the coating layer is provided for the composite oxide particle, nickel nitrate $Ni(NO_3)_2.6H_2O$ of 2.56 weight parts as a commercially available chemical reagent and manganese nitrate $Mn(NO_3)_2.6H_2O$ of 0.32 weight part as a commercially available chemical reagent are added to the composite oxide particle of 20 weight parts.

Sample 10-18

A cylindrical secondary battery is manufactured in a manner similar to that of Sample 10-17 except that it uses the cathode active material manufactured by adding aluminum oxide micro-particle of 0.01 weight part to the composite oxide particle having the coating layer of 10 weight parts and by forming the surface layer by the dry-type agitation-mixture.

Sample 10-19

A cylindrical secondary battery is manufactured in a manner similar to that of Sample 10-17 except that it uses the cathode active material manufactured by adding titanium oxide micro-particle of 0.01 weight part to the composite oxide particle having the coating layer of 10 weight parts and by forming the surface layer by the dry-type agitation-mixture.

Sample 10-20

A cylindrical secondary battery is manufactured in a manner similar to that of Sample 10-17 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 10-21

A cylindrical secondary battery is manufactured in a manner similar to that of Sample 10-13 except that when the coating layer is provided for the composite oxide particle, nickel nitrate $Ni(NO_3)_2.6H_2O$ of 3.20 weight parts as a commercially available chemical reagent is added to the composite oxide particle of 20 weight parts.

Sample 10-22

A cylindrical secondary battery is manufactured in a manner similar to that of Sample 10-21 except that it uses the cathode active material manufactured by adding aluminum oxide micro-particle of 0.01 weight part to the composite oxide particle having the coating layer of 10 weight parts and by forming the surface layer by the dry-type agitation-mixture.

Sample 10-23

A cylindrical secondary battery is manufactured in a manner similar to that of Sample 10-21 except that it uses the cathode active material manufactured by adding titanium oxide micro-particle of 0.01 weight part to the composite oxide particle having the coating layer of 10 weight parts and by forming the surface layer by the dry-type agitation-mixture.

Sample 10-24

A cylindrical secondary battery is manufactured in a manner similar to that of Sample 10-21 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 10-25

Lithium carbonate $Li_2CO_3$ of 38.1 weight parts as a commercially available chemical reagent and cobalt carbonate $CoCO_3$ of 116.5 weight parts are sufficiently mixed to the composite oxide particle while being pulverized by the ball mill. Zirconium ethoxide $(C_2H_5O)_4Zr$ of 45.6 weight parts is dissolved into ethyl alcohol anhydride, the obtained material is added and mixed to the obtained composite oxide particle. The obtained mixture is baked and pulverized under conditions similar to those of Sample 8-1, thereby manufacturing the composite oxide particle. According to this composite oxide particle, the mean diameter measured by the laser scattering method is equal to 13 µm and the analysis values of the mean chemical compositions are $Li_{1.03}Cu_{0.98}Zr_{0.02}O_{2.02}$.

A cylindrical secondary battery is manufactured in a manner similar to that of Sample 8-1 except that it used the cathode active material manufactured by providing the coating layer and the surface layer made of the silicon oxide micro-particle for such a composite oxide particle by a method similar to that of Sample 8-1.

Sample 10-26

A cylindrical secondary battery is manufactured in a manner similar to that of Sample 10-25 except that it uses the cathode active material manufactured by adding aluminum oxide micro-particle of 0.01 weight part to the composite oxide particle having the coating layer of 10 weight parts and by forming the surface layer by the dry-type agitation-mixture.

Sample 10-27

A cylindrical secondary battery is manufactured in a manner similar to that of Sample 10-25 except that it uses the cathode active material manufactured by adding titanium oxide micro-particle of 0.01 weight part to the composite oxide particle having the coating layer of 10 weight parts and by forming the surface layer by the dry-type agitation-mixture.

Sample 10-28

A cylindrical secondary battery is manufactured in a manner similar to that of Sample 10-25 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 10-29

A cylindrical secondary battery is manufactured in a manner similar to that of Sample 10-25 except that when the coating layer is provided for the composite oxide particle, nickel nitrate $Ni(NO_3)_2.6H_2O$ of 2.56 weight parts as a commercially available chemical reagent and manganese nitrate $Mn(NO_3)_2.6H_2O$ of 0.32 weight part as a commercially available chemical reagent are added to the composite oxide particle of 20 weight parts.

Sample 10-30

A cylindrical secondary battery is manufactured in a manner similar to that of Sample 10-29 except that it uses the cathode active material manufactured by adding aluminum oxide micro-particle of 0.1 weight part to the composite oxide particle having the coating layer of 10 weight parts and by forming the surface layer by the dry-type agitation-mixture.

Sample 10-31

A cylindrical secondary battery is manufactured in a manner similar to that of Sample 10-29 except that it uses the cathode active material manufactured by adding titanium oxide micro-particle of 0.01 weight part to the composite oxide particle having the coating layer of 10 weight parts and by forming the surface layer by the dry-type agitation-mixture.

Sample 10-32

A cylindrical secondary battery is manufactured in a manner similar to that of Sample 10-29 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 10-33

A cylindrical secondary battery is manufactured in a manner similar to that of Sample 10-25 except that when the coating layer is provided for the composite oxide particle, nickel nitrate $Ni(NO_3)_2.6H_2O$ of 3.20 weight parts as a commercially available chemical reagent is added to the composite oxide particle of 20 weight parts.

Sample 10-34

A cylindrical secondary battery is manufactured in a manner similar to that of Sample 10-33 except that it uses the cathode active material manufactured by adding aluminum oxide micro-particle of 0.01 weight part to the composite oxide particle having the coating layer of 10 weight parts and by forming the surface layer by the dry-type agitation-mixture.

Sample 10-35

A cylindrical secondary battery is manufactured in a manner similar to that of Sample 10-33 except that it uses the cathode active material manufactured by adding titanium oxide micro-particle of 0.01 weight part to the composite oxide particle having the coating layer of 10 weight parts and by forming the surface layer by the dry-type agitation-mixture.

Sample 10-36

A cylindrical secondary battery is manufactured in a manner similar to that of Sample 10-33 except that it uses the cathode active material manufactured by adding zirconium oxide micro-particle of 0.01 weight part to the composite oxide particle having the coating layer of 10 weight parts and by forming the surface layer by the dry-type agitation-mixture.

Sample 10-37

Lithium carbonate $Li_2CO_3$ of 38.1 weight parts as a commercially available chemical reagent, cobalt carbonate $CoCO_3$ of 113.0 weight parts, aluminum hydroxide $Al(OH)_3$ of 23.4 weight parts, and magnesium carbonate $MgCO_3$ of 16.9 weight parts are sufficiently mixed while being pulverized by the ball mill. Subsequently, the obtained mixture is temporarily baked in the air at 650° C. for 5 hours, further held in the air at 950° C. for 20 hours, and thereafter, cooled down to 150° C. at a rate of 7° C. per minute. Subsequently, the mixture is taken out at a room temperature and pulverized, thereby manufacturing the composite oxide particle. According to this composite oxide particle, the mean diameter measured by the laser scattering method is equal to 13 μm and the analysis values of the mean chemical compositions are $Li_{1.03}Co_{0.95}Al_{0.03}Mg_{0.02}O_{2.02}$.

The coating layer and the surface layer made of the aluminum oxide micro-particle are provided for such a composite oxide particle by a method similar to that of Sample 8-2, thereby manufacturing a cathode active material. A cylindrical secondary battery is manufactured by using the cathode active material.

Sample 10-38

A cylindrical secondary battery is manufactured in a manner similar to that of Sample 10-37 except that a part of the belt-shaped cathode manufactured by being compressed by the roller pressing machine is collected and the compression is further repeated twice under the same conditions by the roller pressing machine.

Sample 10-39

A cylindrical secondary battery is manufactured in a manner similar to that of Sample 10-15 except that when the coating layer is formed, the titanium oxide micro-particle of 0.03 weight part is added to the composite oxide particle having the coating layer of 10 weight parts by a method similar to that of Sample 8-2.

Sample 10-40

A cylindrical secondary battery is manufactured in a manner similar to that of Sample 10-26 except that when the coating layer is formed, a method similar to that of Sample 8-2 is used.

Sample 10-41

A cylindrical secondary battery is manufactured in a manner similar to that of Sample 10-37 except that the following points. That is, nickel nitrate $Ni(NO_3)_2.6H_2O$ of 3.20 weight parts and manganese nitrate $Mn(NO_3)_2.6H_2O$ of 3.30 weight parts are added and the pure water is further added, thereby manufacturing the solution of 10 weight parts. The obtained solution is added for 30 minutes to a solution into which the composite oxide has been dispersed, thereby forming the coating layer.

Sample 10-42

A cylindrical secondary battery is manufactured in a manner similar to that of Sample 10-39 except that the following points. That is, nickel nitrate $Ni(NO_3)_2.6H_2O$ of 3.20 weight parts and manganese nitrate $Mn(NO_3)_2.6H_2O$ of 3.30 weight parts are added and the pure water is further added, thereby manufacturing the solution of 10 weight parts. The obtained solution is added for 30 minutes to a solution into which the composite oxide has been dispersed, thereby manufacturing the composite oxide particle having the coating layer. Thereafter, the aluminum oxide micro-particle of 0.02 weight part is added to the composite oxide particle having the coating layer of 10 weight parts. The surface layer is formed by the dry-type agitation-mixture, thereby manufacturing the cathode active material. This cathode active material is used.

Sample 10-43

A cylindrical secondary battery is manufactured in a manner similar to that of Sample 10-40 except that the following points. That is, nickel nitrate $Ni(NO_3)_2.6H_2O$ of 3.20 weight parts and manganese nitrate $Mn(NO_3)_2.6H_2O$ of 3.30 weight parts are added and the pure water is further added, thereby manufacturing the solution of 10 weight parts. The obtained solution is added for 30 minutes to a solution into which the composite oxide has been dispersed, thereby manufacturing the composite oxide particle having the coating layer. Thereafter, the aluminum oxide micro-particle of 0.02 weight part is added to the composite oxide particle having the coating layer of 10 weight parts. The surface layer is formed by the dry-type agitation-mixture, thereby manufacturing the cathode active material. This cathode active material is used.

Sample 10-44

A cylindrical secondary battery is manufactured in a manner similar to that of Sample 10-41 except that the following points. That is, nickel nitrate $Ni(NO_3)_2.6H_2O$ of 0.64 weight part and manganese nitrate $Mn(NO_3)_2.6H_2O$ of 0.66 weight part are added and the pure water is further added, thereby manufacturing the solution of 10 weight parts. The obtained solution is added for 30 minutes to a solution into which the composite oxide has been dispersed, thereby forming the coating layer.

Sample 10-45

A cylindrical secondary battery is manufactured in a manner similar to that of Sample 10-42 except that the following points. That is, nickel nitrate $Ni(NO_3)_2.6H_2O$ of 0.64 weight part and manganese nitrate $Mn(NO_3)_2.6H_2O$ of 0.66 weight part are added and the pure water is further added, thereby manufacturing the solution of 10 weight parts. The obtained solution is added for 30 minutes to a solution into which the composite oxide has been dispersed, thereby forming the coating layer.

Sample 10-46

A cylindrical secondary battery is manufactured in a manner similar to that of Sample 10-43 except that the following points. That is, nickel nitrate $Ni(NO_3)_2.6H_2O$ of 0.64 weight part and manganese nitrate $Mn(NO_3)_2.6H_2O$ of 0.66 weight part are added and the pure water is further added, thereby manufacturing the solution of 10 weight parts. The obtained solution is added for 30 minutes to a solution into which the composite oxide has been dispersed, thereby forming the coating layer.

Sample 10-47

A cylindrical secondary battery is manufactured in a manner similar to that of Sample 10-44 except that the addition amount of aluminum oxide micro-particle is set to 0.01 weight part.

Sample 10-48

A cylindrical secondary battery is manufactured in a manner similar to that of Sample 10-45 except that the addition amount of aluminum oxide micro-particle is set to 0.01 weight part.

Sample 10-49

A cylindrical secondary battery is manufactured in a manner similar to that of Sample 10-46 except that the addition amount of aluminum oxide micro-particle is set to 0.01 weight part.

Sample 10-50

A cylindrical secondary battery is manufactured in a manner similar to that of Sample 10-37 except that the composite oxide particle is manufactured by mixing lithium carbonate $Li_2CO_3$ of 38.1 weight parts as a commercially available chemical reagent and cobalt carbonate $CoCO_3$ of 118.9 weight parts. According to this composite oxide particle, the mean diameter measured by the laser scattering method is equal to 12 μm and the analysis values of the mean chemical compositions are $Li_{1.03}CoO_{2.02}$.

Sample 10-51

A cylindrical secondary battery is manufactured in a manner similar to that of Sample 10-50 except that a part of the belt-shaped cathode manufactured by being compressed by the roller pressing machine is collected and the compression is further repeated twice under the same conditions by the roller pressing machine.

Sample 10-52

A cylindrical secondary battery is manufactured in a manner similar to that of Sample 10-50 except that the coating layer is not provided.

Sample 10-53

A cylindrical secondary battery is manufactured in a manner similar to that of Sample 10-50 except that the coating layer and the surface layer are not provided.

Sample 10-54

A cylindrical secondary battery is manufactured in a manner similar to that of Sample 10-50 except that a mixture amount of cobalt carbonate $CoCO_3$ is set to 118.0 weight parts and the coating layer and the surface layer are not provided. According to this composite oxide particle, the mean diameter measured by the laser scattering method is equal to 13 μm and the analysis values of the mean chemical compositions are $Li_{1.03}CoO_{2.02}$.

Sample 10-55

A cylindrical secondary battery is manufactured in a manner similar to that of Sample 10-13 except that the coating layer and the surface layer are not provided.

Sample 10-56

A cylindrical secondary battery is manufactured in a manner similar to that of Sample 10-25 except that the coating layer and the surface layer are not provided.

Sample 10-57

A cylindrical secondary battery is manufactured in a manner similar to that of Sample 10-37 except for the following points. When the coating layer is provided for the composite oxide particle, the addition amount of nickel nitrate $Ni(NO_3)_2 \cdot 6H_2O$ is set to 1.32 weight parts. The aluminum oxide micro-particle of 0.01 weight part is added to the composite oxide particle having the coating layer of 10 weight parts. The surface layer is formed by the dry-type agitation-mixture, thereby manufacturing the cathode active material. This cathode active material is used.

[Evaluation of Cylindrical Secondary Battery]

(a) The initial capacitance and (b) the capacitance maintaining ratio are evaluated by using the method similar to that in the evaluation of Samples 8-1 to 8-27.

(c) AC resistance

In the cylindrical secondary batteries of Samples 10-4, 10-8, 10-53, and 10-57, the charging and discharging are performed by using the method similar to that in the measurement of the initial capacitance. An AC (alternating current) resistance at the time when an SOD (State Of Discharge)-100%, that is, a full charging state is obtained after the 200 cycles is evaluated.

Evaluation results of the initial capacitance and the capacitance maintaining ratio are shown in Tables 10 to 12.

TABLE 10

| | | COATING LAYER | | | SURFACE LAYER | | COMPRESSION | | |
|---|---|---|---|---|---|---|---|---|---|
| | COMPOSITE OXIDE PARTICLE | MIXTURE AMOUNT OF NICKEL NITRATE [WEIGHT PARTS] | MIXTURE AMOUNT OF MANGANESE NITRATE [WEIGHT PARTS] | Ni:Mn RATIO | MATERIAL | MIXTURE AMOUNT [WEIGHT PARTS] | OF CATHODE ACTIVE MATERIAL LAYER | INITIAL CAPACITANCE [mAh] | CAPACITANCE MAINTAINING RATIO [%] |
| SAMPLE 10-1 | $Li_{1.03}Co_{0.98}Al_{0.01}Mg_{0.01}O_{2.02}$ | 1.60 | 1.65 | 5:5 | $SiO_2$ | 0.01 | X | 2400 | 83 |
| SAMPLE 10-2 | | | | | $Al_2O_2$ | 0.01 | X | 2430 | 83 |

TABLE 10-continued

| | COATING LAYER | | | SURFACE LAYER | | COMPRESSION OF CATHODE ACTIVE MATERIAL LAYER | INITIAL CAPACITANCE [mAh] | CAPACITANCE MAINTAINING RATIO [%] |
|---|---|---|---|---|---|---|---|---|
| COMPOSITE OXIDE PARTICLE | MIXTURE AMOUNT OF NICKEL NITRATE [WEIGHT PARTS] | MIXTURE AMOUNT OF MANGANESE NITRATE [WEIGHT PARTS] | Ni:Mn RATIO | MATERIAL | MIXTURE AMOUNT [WEIGHT PARTS] | | | |
| SAMPLE 10-3 | | | | $TiO_2$ | 0.01 | X | 2430 | 83 |
| SAMPLE 10-4 | | | | $ZrO_2$ | 0.01 | X | 2430 | 83 |
| SAMPLE 10-5 | 2.56 | 0.32 | 8:2 | $SiO_2$ | 0.01 | X | 2430 | 87 |
| SAMPLE 10-6 | | | | $Al_2O_2$ | 0.01 | X | 2430 | 87 |
| SAMPLE 10-7 | | | | $TiO_2$ | 0.01 | X | 2430 | 87 |
| SAMPLE 10-8 | | | | $ZrO_2$ | 0.01 | X | 2430 | 87 |
| SAMPLE 10-9 | 3.20 | — | 10:0 | $SiO_2$ | 0.01 | X | 2430 | 86 |
| SAMPLE 10-10 | | | | $Al_2O_2$ | 0.01 | X | 2430 | 86 |
| SAMPLE 10-11 | | | | $TiO_2$ | 0.01 | X | 2430 | 86 |
| SAMPLE 10-12 | | | | $ZrO_2$ | 0.01 | X | 2430 | 86 |
| SAMPLE 10-13 | $Li_{1.03}Co_{0.98}Ti_{0.02}O_{2.02}$ | 1.60 | 1.65 | 5:5 | $SiO_2$ | 0.01 | X | 2430 | 83 |
| SAMPLE 10-14 | | | | $Al_2O_2$ | 0.01 | X | 2430 | 83 |
| SAMPLE 10-15 | | | | $TiO_2$ | 0.01 | X | 2430 | 83 |
| SAMPLE 10-16 | | | | $ZrO_2$ | 0.01 | X | 2430 | 83 |
| SAMPLE 10-17 | 2.56 | 0.32 | 8:2 | $SiO_2$ | 0.01 | X | 2430 | 86 |
| SAMPLE 10-18 | | | | $Al_2O_2$ | 0.01 | X | 2330 | 86 |
| SAMPLE 10-19 | | | | $TiO_2$ | 0.01 | X | 2430 | 86 |
| SAMPLE 10-20 | | | | $ZrO_2$ | 0.01 | X | 2430 | 86 |
| SAMPLE 10-21 | 3.20 | — | 10:0 | $SiO_2$ | 0.01 | X | 2430 | 85 |
| SAMPLE 10-22 | | | | $Al_2O_2$ | 0.01 | X | 2430 | 85 |
| SAMPLE 10-23 | | | | $TiO_2$ | 0.01 | X | 2430 | 85 |
| SAMPLE 10-24 | | | | $ZrO_2$ | 0.01 | X | 2430 | 85 |

Note: row for SAMPLE 10-13 has composite oxide cell spanning; columns are: Composite Oxide | Nickel Nitrate | Manganese Nitrate | Ni:Mn | Material | Mixture Amount | Compression | Initial Capacitance | Capacitance Ratio.

TABLE 11

| | COATING LAYER | | | SURFACE LAYER | | COMPRESSION OF CATHODE ACTIVE MATERIAL LAYER | INITIAL CAPACITANCE [mAh] | CAPACITANCE MAINTAINING RATIO [%] |
|---|---|---|---|---|---|---|---|---|
| COMPOSITE OXIDE PARTICLE | MIXTURE AMOUNT OF NICKEL NITRATE [WEIGHT PARTS] | MIXTURE AMOUNT OF MANGANESE NITRATE [WEIGHT PARTS] | Ni:Mn RATIO | MATERIAL | MIXTURE AMOUNT [WEIGHT PARTS] | | | |
| SAMPLE 10-25 | $Li_{1.03}Co_{0.98}Zr_{0.02}O_{2.02}$ | 1.60 | 1.65 | 5:5 | $SiO_2$ | 0.01 | X | 2430 | 83 |
| SAMPLE 10-26 | | | | $Al_2O_2$ | 0.01 | X | 2430 | 83 |
| SAMPLE 10-27 | | | | $TiO_2$ | 0.01 | X | 2430 | 83 |
| SAMPLE 10-28 | | | | $ZrO_2$ | 0.01 | X | 2430 | 83 |
| SAMPLE 10-29 | 2.56 | 0.32 | 8:2 | $SiO_2$ | 0.01 | X | 2430 | 86 |
| SAMPLE 10-30 | | | | $Al_2O_2$ | 0.01 | X | 2430 | 86 |
| SAMPLE 10-31 | | | | $TiO_2$ | 0.01 | X | 2430 | 86 |
| SAMPLE 10-32 | | | | $ZrO_2$ | 0.01 | X | 2430 | 86 |
| SAMPLE 10-33 | 3.20 | — | 10:0 | $SiO_2$ | 0.01 | X | 2430 | 85 |
| SAMPLE 10-34 | | | | $Al_2O_2$ | 0.01 | X | 2430 | 85 |
| SAMPLE 10-35 | | | | $TiO_2$ | 0.01 | X | 2430 | 85 |
| SAMPLE 10-36 | | | | $ZrO_2$ | 0.01 | X | 2430 | 85 |
| SAMPLE 10-37 | $Li_{1.03}Co_{0.95}Al_{0.03}Mg_{0.02}O_{2.02}$ | 1.60 | 1.65 | 5:5 | $Al_2O_2$ | 0.02 | X | 2440 | 87 |
| SAMPLE 10-38 | | | | $Al_2O_2$ | 0.02 | ○ | 2410 | 85 |
| SAMPLE 10-39 | $Li_{1.03}Co_{0.98}Ti_{0.02}O_{2.02}$ | 1.60 | 1.65 | 5:5 | $TiO_2$ | 0.03 | X | 2420 | 85 |
| SAMPLE 10-40 | $Li_{1.03}Co_{0.98}Zr_{0.02}O_{2.02}$ | | | | $Al_2O_2$ | 0.01 | X | 2410 | 85 |
| SAMPLE 10-41 | $Li_{1.03}Co_{0.95}Al_{0.03}Mg_{0.02}O_{2.02}$ | 3.20 | 3.30 | 5:5 | $Al_2O_2$ | 0.02 | X | 2430 | 85 |
| SAMPLE 10-42 | $Li_{1.03}Co_{0.98}Ti_{0.02}O_{2.02}$ | | | | $Al_2O_2$ | 0.02 | X | 2420 | 84 |
| SAMPLE 10-43 | $Li_{1.03}Co_{0.98}Zr_{0.02}O_{2.02}$ | | | | $Al_2O_2$ | 0.02 | X | 2430 | 84 |
| SAMPLE 10-44 | $Li_{1.03}Co_{0.95}Al_{0.03}Mg_{0.02}O_{2.02}$ | 0.64 | 0.66 | 5:5 | $Al_2O_2$ | 0.02 | X | 2420 | 83 |
| SAMPLE 10-45 | $Li_{1.03}Co_{0.98}Ti_{0.02}O_{2.02}$ | | | | $Al_2O_2$ | 0.02 | X | 2420 | 83 |
| SAMPLE 10-46 | $Li_{1.03}Co_{0.98}Zr_{0.02}O_{2.02}$ | | | | $Al_2O_2$ | 0.02 | X | 2430 | 83 |
| SAMPLE 10-47 | $Li_{1.03}Co_{0.95}Al_{0.03}Mg_{0.02}O_{2.02}$ | 0.64 | 0.66 | 5:5 | $Al_2O_2$ | 0.01 | X | 2440 | 82 |
| SAMPLE 10-48 | $Li_{1.03}Co_{0.98}Ti_{0.02}O_{2.02}$ | | | | $Al_2O_2$ | 0.01 | X | 2420 | 82 |
| SAMPLE 10-49 | $Li_{1.03}Co_{0.98}Zr_{0.02}O_{2.02}$ | | | | $Al_2O_2$ | 0.01 | X | 2430 | 82 |

TABLE 12

| | COATING LAYER | | | | SURFACE LAYER | | COMPRESSION OF CATHODE ACTIVE MATERIAL LAYER | INITIAL CAPACITANCE [mAh] | CAPACITANCE MAINTAINING RATIO [%] |
|---|---|---|---|---|---|---|---|---|---|
| COMPOSITE OXIDE PARTICLE | MIXTURE AMOUNT OF NICKEL NITRATE [WEIGHT PARTS] | MIXTURE AMOUNT OF MANGANESE NITRATE [WEIGHT PARTS] | Ni:Mn RATIO | MATERIAL | MIXTURE AMOUNT [WEIGHT PARTS] | | | | |
| SAMPLE 10-50 $Li_{1.03}CoO_{2.02}$ | 1.60 | 1.65 | 5:5 | $Al_2O_3$ | 0.02 | X | 2460 | 82 |
| SAMPLE 10-51 | — | — | — | $Al_2O_3$ | 0.02 | ○ | 2450 | 76 |
| SAMPLE 10-52 | — | — | — | $Al_2O_3$ | 0.02 | X | 2450 | 81 |
| SAMPLE 10-53 | — | — | — | — | — | X | 2400 | 78 |
| SAMPLE 10-54 $Li_{1.03}CoO_{2.02}$ | — | — | — | — | — | X | 2460 | 68 |
| SAMPLE 10-55 $Li_{1.03}Co_{0.98}Ti_{0.02}O_{2.02}$ | — | — | — | — | — | X | 2400 | 77 |
| SAMPLE 10-56 $Li_{1.03}Co_{0.98}Zr_{0.02}O_{2.02}$ | — | — | — | — | — | X | 2400 | 77 |
| SAMPLE 10-57 $Li_{1.03}Co_{0.95}Al_{0.03}Mg_{0.02}O_{2.02}$ | — | 1.32 | 0:10 | $Al_2O_3$ | 0.01 | X | 2300 | 52 |

Figure 5:
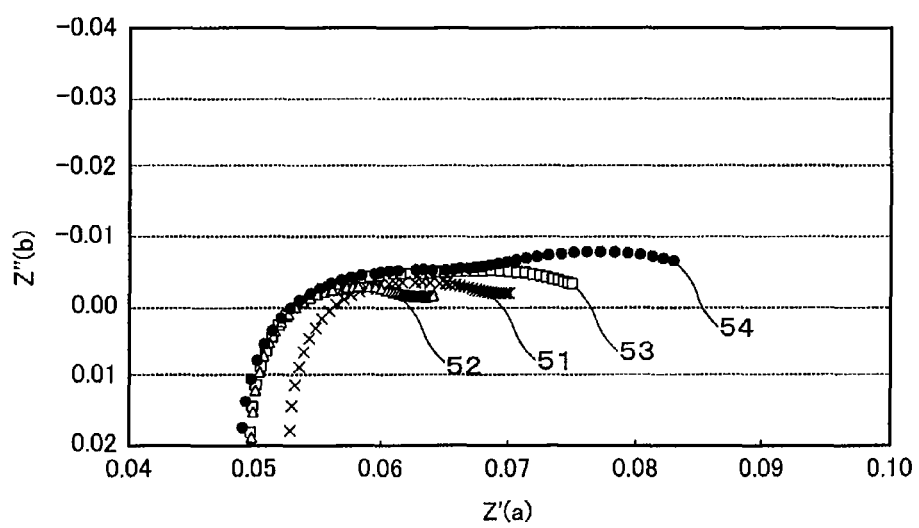
FIG. 5 is a graph showing measurement results of an AC resistance of the secondary batteries.

FIG. 5 shows the AC resistance at the time of SOD—100%. In FIG. 5, reference numeral 51 denotes a measurement result of Sample 10-4; 52 a measurement result of Sample 10-8; 53 a measurement result of Sample 10-53; 54 a measurement result of Sample 10-57; Z'(a) a real part (resistance component) of an impedance; and Z" (b) an imaginary part (reactance component) of the impedance. In the graphs, the larger an arc of the graph is, the larger an internal resistance of the battery is.

As will be understood from Tables 10 to 12, the secondary battery in which both of the large initial capacitance and capacitance maintaining ratio are satisfied can be manufactured by using the cathode active material in which the coating layer made of the oxide containing lithium Li and at least one of nickel Ni and manganese Mn and the surface layer containing at least one kind of silicon oxide, aluminum oxide, zirconium oxide, and titanium oxide have been provided for the composite oxide particle shown by Formula 3 and made of lithium cobalt acid into which at least one kind selected from magnesium Mg, aluminum Al, titanium, and zirconium Zr has been dissolved.

From the above results, it will be understood that the secondary battery having the excellent battery characteristics can be manufactured by using the cathode active material in which both of the coating layer and the surface layer have been formed to the composite oxide particle.

The invention is not limited to the foregoing embodiments of the invention but various modifications and applications are possible within the scope of the invention without departing from the spirit of the invention. For example, a shape of the battery is not particularly limited but can also have any one of a rectangular shape, a coin shape, a button shape, and the like.

Although the first example has been described with respect to the non-aqueous electrolyte secondary battery having the electrolytic solution as an electrolyte and the second example has been described with respect to the non-aqueous electrolyte secondary battery having the gel electrolyte as an electrolyte, the invention is not limited to them.

For example, besides the foregoing materials, a high molecular solid electrolyte using an ion conductive high polymer, an inorganic solid electrolyte using an ion conductive inorganic material, or the like can be also used as an electrolyte. They can be used solely or may be combined with another electrolyte and used. As a high molecular compound which can be used for the high molecular solid electrolyte, for example, polyether, polyester, polyphosphazene, polysiloxane, or the like can be mentioned. As an inorganic solid electrolyte, for example, ion conductive ceramics, ion conductive crystal, ion conductive glass, or the like can be mentioned.

Further, for example, the electrolytic solution of the non-aqueous electrolyte secondary battery is not particularly limited but the non-aqueous solvent system electrolytic solution in the related art or the like is used. Among them, as an electrolytic solution of the secondary battery constructed by a non-aqueous electrolytic solution containing an alkali metal salt, propylene carbonate, ethylene carbonate, γ-butyrolactone, N-methylpyrrolidone, acetonitrile, N,N-dimethyl formamide, dimethyl sulfoxide, tetrahydrofuran, 1,3-dioxorane, methyl formate, sulfolan, oxazolidone, thionyl chloride, 1,2-dimethoxy ethane, diethylene carbonate, their derivatives or mixtures, or the like is preferably used. As an electrolyte contained in the electrolytic solution, an alkali metal, particularly, a halide of calcium, perchlorate, thiocyanic salt, boron fluoride salt, phosphorus fluoride salt, arsenic fluoride salt, aluminum fluoride salt, trifluoromethyl sulfate, or the like is preferably used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cathode active material comprising:
   a composite oxide particle including at least lithium and cobalt;
   a coating layer which is provided in at least a part of said composite oxide particle and includes an oxide containing lithium and a coating element of at least one of nickel and manganese; and
   a surface layer containing silicon,
   wherein a construction ratio of said nickel and the manganese in said coating layer ranges from 100:0 to 30:70 as a mole ratio,
   wherein the surface layer containing silicon is formed on the coating layer containing at least one of nickel and manganese, and wherein the surface layer comprises metal oxide microparticles having a primary mean diameter of 1.0 nm or more or 100 nm or less.

2. The cathode active material according to claim 1, wherein mean compositions of said composite oxide particle are expressed by Formula 1, $$Li_{(1+x)}Co_{(1-y)}M_yO_{(2-z)} \qquad \text{(Formula 1)}$$

in Formula 1, M denotes an element of at least one kind selected from the group consisting of magnesium, aluminum, boron, titanium, vanadium, chromium, manganese, iron, nickel, copper, zinc, molybdenum, tin, and tungsten; x indicates a value within a range of $-0.10 \le x \le 0.10$; y indicates a value within a range of $0 \le y < 0.50$; and z indicates a value within a range of $-0.10 \le z \le 0.20$.

3. The cathode active material according to claim 1, wherein the oxide in said coating layer is an oxide obtained by replacing 40 mol % or less of a total amount of said nickel and said manganese with a metal element of at least one kind selected from the group consisting of magnesium, aluminum, boron, titanium, vanadium, chromium, iron, cobalt, copper, zinc, molybdenum, tin, and tungsten.

4. The cathode active material according to claim 1, wherein a mean diameter ranges from 2.0 μm to 50 μm.

5. The cathode active material according to claim 1, wherein an amount of said coating layer ranges from 0.5 weight % to 50 weight % of said composite oxide particle.

* * * * *